(12) United States Patent
Bailey et al.

(10) Patent No.: US 10,571,274 B2
(45) Date of Patent: Feb. 25, 2020

(54) SYSTEMS, METHODS, AND VEHICLES FOR MAINTAINING SOLAR PANELS

(71) Applicant: Alion Energy, Inc., Richmond, CA (US)

(72) Inventors: Sean Bailey, Emeryville, CA (US); Adam French, San Francisco, CA (US); Luis Francisco Castro Hernandez, Richmond, CA (US); Thomas Goehring, Berkeley, CA (US); Jason Alderman, Duarte, CA (US)

(73) Assignee: Alion Energy, Inc., Richmond, CA (US)

( * ) Notice: Subject to any disclaimer, the term of this patent is extended or adjusted under 35 U.S.C. 154(b) by 0 days.

(21) Appl. No.: 15/643,352

(22) Filed: Jul. 6, 2017

(65) Prior Publication Data

US 2018/0087908 A1    Mar. 29, 2018

Related U.S. Application Data

(60) Provisional application No. 62/359,959, filed on Jul. 8, 2016, provisional application No. 62/399,849, filed on Sep. 26, 2016.

(51) Int. Cl.
*G01C 21/20* (2006.01)
*B25J 5/02* (2006.01)
(Continued)

(52) U.S. Cl.
CPC ............... *G01C 21/20* (2013.01); *B25J 5/007* (2013.01); *B25J 5/02* (2013.01); *E01H 5/04* (2013.01); *Y10S 901/44* (2013.01)

(58) Field of Classification Search
CPC .. G01C 21/20; B25J 5/007; B25J 5/02; E01H 5/04; Y10S 901/44
See application file for complete search history.

(56) References Cited

U.S. PATENT DOCUMENTS

| | | | |
|---|---|---|---|
| 2011/0284057 A1* | 11/2011 | Swahn | H02S 40/10 |
| | | | 136/251 |
| 2012/0152877 A1 | 6/2012 | Tadayon | |

(Continued)

OTHER PUBLICATIONS

Patent Cooperation Treaty, International Search Report for PCT/US2017/040884, dated Nov. 6, 2017 (4 pages).

(Continued)

*Primary Examiner* — Aaron L Troost
(74) *Attorney, Agent, or Firm* — Jones Day

(57) ABSTRACT

A method of locating a maintenance vehicle in a solar power field can include driving the maintenance vehicle on a track. A plurality of flags are coupled to the track at spaced locations. Each flag can include an ID tag and a contact target or a non-contact target. The maintenance vehicle can include an ID tag reader and a sensor configured to detect the contact target or the non-contact target. The method also can include driving the maintenance vehicle along the track to a position adjacent to a flag of the plurality of flags, reading by the ID tag reader the ID tag of that flag, and sensing by the sensor the contact target or the non-contact target. The method also can include, based on the reading and the sensing, identifying a unique location of the maintenance vehicle in the solar power field.

18 Claims, 41 Drawing Sheets

(51) Int. Cl.
*E01H 5/04* (2006.01)
*B25J 5/00* (2006.01)

(56) References Cited

U.S. PATENT DOCUMENTS

| | | | |
|---|---|---|---|
| 2014/0174315 A1 | 6/2014 | Camp et al. | |
| 2014/0361077 A1* | 12/2014 | Davidson | G06Q 10/08 235/385 |
| 2015/0144156 A1 | 5/2015 | French et al. | |
| 2015/0229265 A1 | 8/2015 | Morita et al. | |
| 2015/0241458 A1* | 8/2015 | Pollack | G01N 35/00623 700/230 |
| 2015/0309394 A1* | 10/2015 | Janze | F16M 11/18 348/211.99 |

OTHER PUBLICATIONS

Patent Cooperation Treaty, Written Opinion of the International Searching Authority for PCT/US2017/040884, dated Nov. 6, 2017 (10 pages).

\* cited by examiner

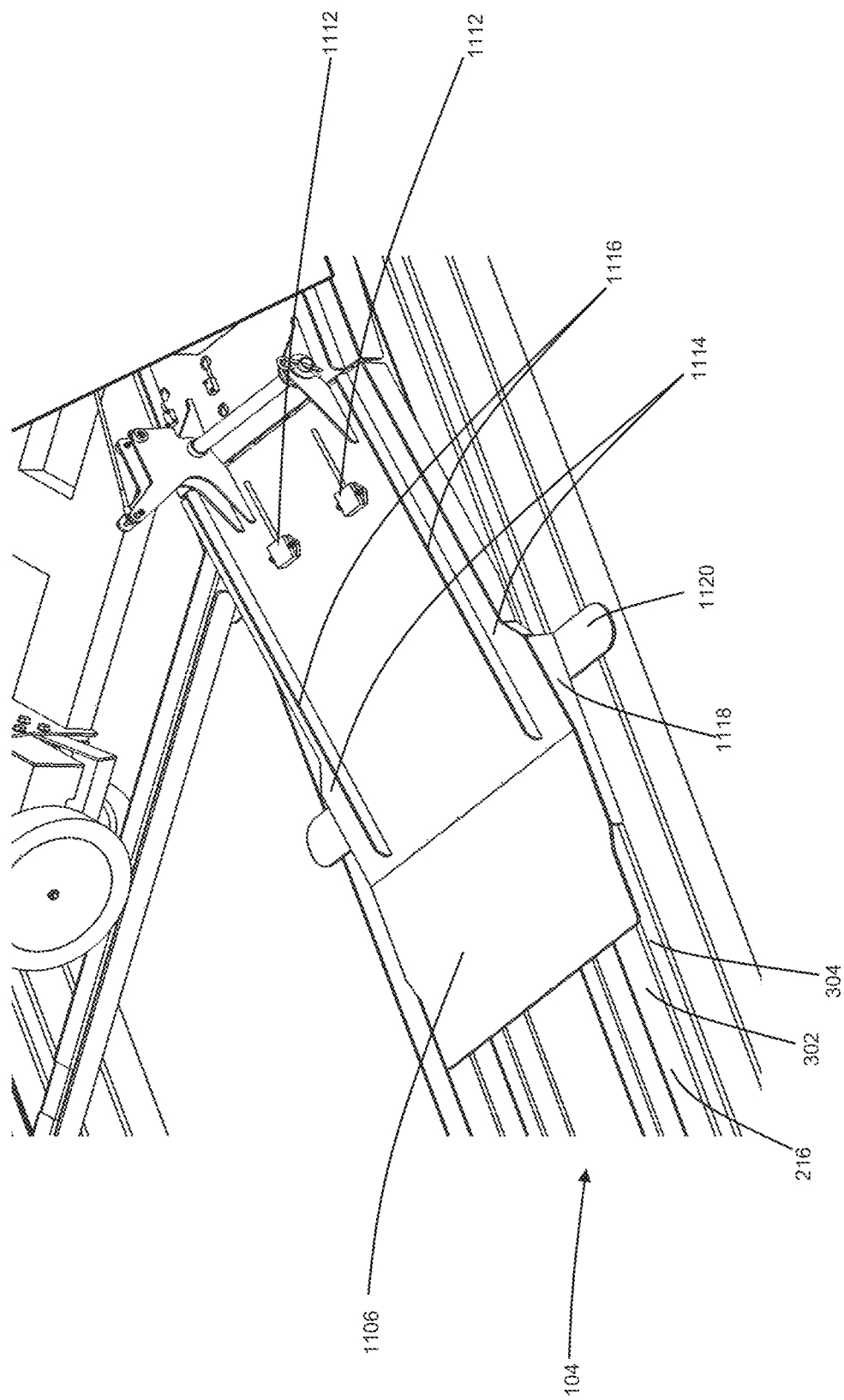

Foundation (e.g., pre-cast)   Purlin for mounting modules   Vehicle support surface for MV

SYSTEMS, METHODS, AND VEHICLES FOR MAINTAINING SOLAR PANELS

CROSS-REFERENCE TO RELATED APPLICATIONS

This application claims the benefit of the following application, the entire contents of which are incorporated by reference herein:

U.S. Provisional Application No. 62/359,959, filed Jul. 8, 2016 and entitled "Systems and Methods for Assembly, Operation, and Maintenance of Photovoltaic Modules."

FIELD

This application relates to maintaining solar panels, such as photovoltaic panels.

BACKGROUND

Solar power plants, e.g., solar photovoltaic (PV) power plants, which also can be referred to as fields, solar fields, or power plants, can occupy relatively large tracts of land and can include tens or even hundreds of thousands of solar panels. Some maintenance or diagnostic tasks can be done from time to time throughout the entire power plant. These tasks can include one or more maintenance tasks such as cleaning the solar panels, clearing snow off the panels, trimming vegetation between rows, depositing herbicide, insecticide, or animal repellant, solar panel inspection, structural inspection, identifying individual solar panels by bar code, spraying protective coatings on electrical connection points on the backs of panels, depositing coatings on solar panels, applying a material on the ground to increase reflectivity, or other suitable task(s).

SUMMARY

Systems, methods, and vehicles are provided herein for maintaining solar panels. For example, the present subject matter pertains to a system, method, and vehicle for performing maintenance operations on relatively large, ground-mounted solar power plants, e.g., solar photovoltaic power plants.

Under one aspect, a method of locating a maintenance vehicle in a solar power field is provided. The method can include driving the maintenance vehicle on a track of the solar panel field, a plurality of flags being coupled to the track at spaced locations along the track. Each flag can include an identification (ID) tag and a contact target or a non-contact target. The maintenance vehicle can include an ID tag reader and a sensor configured to detect the contact target or the non-contact target. The method also can include driving the maintenance vehicle along the track to a position adjacent to a flag of the plurality of flags, reading by the ID tag reader the ID tag of that flag, and sensing by the sensor the contact target or the non-contact target. The method also can include, based on the reading and the sensing, identifying a unique location of the maintenance vehicle in the solar power field.

Optionally, the maintenance vehicle comprises drive wheels and guide wheels, and the track comprises first and second rails. Each of the first and second rails can include a top surface and a side surface. The top surface receives at least one of the drive wheels and supports the weight of the vehicle; and the side surface receives at least one of the guide wheels and inhibits derailment of the maintenance vehicle.

Additionally, or alternatively, the contact target optionally can include an upright structure, and the sensor can include a trigger arm configured to rotate upon impact with the upright structure and to trigger a signal based upon the rotation.

Additionally, or alternatively, the non-contact target can include a magnet, and the sensor can include a proximity sensor configured to trigger a signal based upon the sensor being immediately adjacent to the magnet.

Additionally, or alternatively, the method optionally can include identifying the unique location can include using a look-up table of ID tag numbers to determine an approximate location of the maintenance vehicle in the solar power field and using a look-up table of an accurate location of the contact or non-contact target associated with the ID tag.

Under another aspect, a system for locating a maintenance vehicle in a solar power field is provided. The system can include a track on which the maintenance vehicle drives; and a plurality of flags being coupled to the track at spaced locations along the track. Each flag can include an identification (ID) tag and a contact target or a non-contact target. An ID tag reader and a sensor each can be located on the maintenance vehicle and configured to detect the contact target or the non-contact target. The maintenance vehicle can be configured to: drive along the track to a position adjacent to a flag of the plurality of flags; read by the ID tag reader the ID tag of that flag; sense by the sensor the contact target or the non-contact target; and based on the reading and the sensing, identify a unique location of the maintenance vehicle in the solar power field.

Optionally, the maintenance vehicle can include drive wheels and guide wheels; and the track can include first and second rails. Each of the first and second rails can include a top surface and a side surface. The top surface can be configured to receive at least one of the drive wheels and to support the weight of the vehicle; and the side surface can be configured to receive at least one of the guide wheels and to inhibit derailment of the maintenance vehicle.

Additionally, or alternatively, the contact target optionally can include an upright structure, and the sensor can include a trigger arm configured to rotate upon impact with the upright structure and to trigger a signal based upon the rotation.

Additionally, or alternatively, the non-contact target optionally can include a magnet, and the sensor can include a proximity sensor configured to trigger a signal based upon the sensor being immediately adjacent to the magnet.

Additionally, or alternatively, identifying the unique location can include using a look-up table of ID tag numbers to determine an approximate location of the maintenance vehicle in the solar power field and using a look-up table of an accurate location of the contact or non-contact target associated with the ID tag.

Under yet another aspect, a method of constraining movement of a maintenance vehicle in a solar power field is provided. The method can include driving the maintenance vehicle along a track of the solar panel field. The maintenance vehicle can include drive wheels and guide wheels. The track can include first and second rails. Each of the first and second rails can include a top surface and a side surface. The top surface receives at least one of the drive wheels and supports the weight of the vehicle; and the side surface receives at least one of the guide wheels and inhibits derailment of the maintenance vehicle.

Optionally, the track can include at least one elongated piece of slip-formed concrete. As a further option, each of the first and second rails can include a different discrete piece of the elongated piece of slip-formed concrete. As another option, the track can include a single elongated piece of slip formed concrete within which each of the first and second rails can be formed.

Under yet another aspect, a system for constraining movement of a maintenance vehicle in a solar power field is provided. The system can include a track on which the maintenance vehicle drives, and the maintenance vehicle can include drive wheels and guide wheels. The track can include first and second rails. Each of the first and second rails can include a top surface and a side surface. The top surface can be configured to receive at least one of the drive wheels and to support the weight of the vehicle; and the side surface can be configured to receive at least one of the guide wheels and to inhibit derailment of the maintenance vehicle.

Optionally, the track can include at least one elongated piece of slip-formed concrete. As a further option, each of the first and second rails can include a different discrete piece of the elongated piece of slip-formed concrete. As another option, the track can include a single elongated piece of slip formed concrete within which each of the first and second rails can be formed.

Under still another aspect, a method of moving a maintenance vehicle from a first track to a second track of a solar power field is provided. The method can include driving the maintenance vehicle along the first track of the solar panel field toward a shuttle track, the shuttle track intersecting the first track and the second track. The method also can include driving a shuttle vehicle along the shuttle track to the first track. The method also can include deploying by the shuttle vehicle a ramp onto the first track. The method also can include driving the maintenance vehicle onto the ramp. The method also can include retracting by the shuttle vehicle the ramp. The method also can include driving the shuttle vehicle to the second track. The method also can include deploying by the shuttle vehicle the ramp onto the second track. The method also can include driving the maintenance vehicle down the ramp onto the second track.

Optionally, the shuttle vehicle can include an actuator configured to deploy and retract the ramp, and an inclinometer configured to sense an angle of the ramp.

Additionally, or alternatively, the maintenance vehicle can include drive wheels and guide wheels. As a further option, the first track can include first and second rails. Each of the first and second rails can include a top surface and a side surface. The top surface receives at least one of the drive wheels and supports the weight of the vehicle; and the side surface receives at least one of the guide wheels and inhibits derailment of the maintenance vehicle. As a further option, the ramp can include a main structure and at least one of: first and second wheel paths coupled to the main structure, first and second splays coupled to the main structure, and first and second paddles coupled to the main structure. As a further option, when the ramp is deployed, the first and second splays and first and second paddles respectively fall outside of the side surfaces of the first and second rails; and the main structure rests on the top surfaces of the first and second rails. Additionally, or alternatively, when the maintenance vehicle drives onto the ramp, the drive wheels drive up the wheel paths. Additionally, or alternatively, when the maintenance vehicle drives onto the ramp, the guide wheels transition from respectively contacting the side surfaces of the first and second rails to respectively contacting the first and second splays.

Under yet another aspect, a system for moving a maintenance vehicle from a first track to a second track of a solar power field is provided. The system can include a shuttle track intersecting the first track and the second track, the maintenance vehicle can be configured to drive along the first track of the solar panel field toward the shuttle track; and a shuttle vehicle. The shuttle vehicle can be configured to drive along the shuttle track to the first track; deploy a ramp onto the first track; retract the ramp; drive to the second track; and deploy the ramp onto the second track. The maintenance vehicle can be configured to drive onto the ramp from the first track responsive to the shuttle vehicle deploying the ramp onto the first track; and drive off of the ramp to the second track responsive to the shuttle vehicle deploying the ramp onto the second track.

Optionally, the shuttle vehicle can include an actuator configured to deploy and retract the ramp, and an inclinometer configured to sense an angle of the ramp.

Additionally, or alternatively, the maintenance vehicle can include drive wheels and guide wheels. The first track can include first and second rails. Each of the first and second rails can include a top surface and a side surface. The top surface can be configured to receive at least one of the drive wheels and to support the weight of the vehicle; and the side surface can be configured to receive at least one of the guide wheels and to inhibit derailment of the maintenance vehicle. As a further option, the ramp can include a main structure and at least one of: first and second wheel paths coupled to the main structure, first and second splays coupled to the main structure, and first and second paddles coupled to the main structure. As a further option, the first and second splays and first and second paddles are configured so as to respectively fall outside of the side surfaces of the first and second rails based upon the ramp being deployed. As a further option, the main structure can be configured so as to rest on the top surfaces of the first and second rails based upon the ramp being deployed. Additionally, or alternatively, the drive wheels are configured so as to drive up the wheel paths based upon the maintenance vehicle driving onto the ramp. As a further option, the guide wheels are configured so as to transition from respectively contacting the side surfaces of the first and second rails to respectively contacting the first and second splays based upon the maintenance vehicle driving onto the ramp.

Under another aspect, a method of securing a vehicle in a solar power field is provided. The method can include mounting a vehicle lock on a track of the solar panel field. The vehicle can include drive wheels. The track can include first and second rails, each of the first and second rails can include a top surface receiving at least one of the drive wheels and supporting the weight of the vehicle. The vehicle lock can include first and second overhangs that protrude above the top surface. The method can include driving the vehicle along the track and over the vehicle lock. The method also can include stopping the vehicle over the vehicle lock with portions of the vehicle respectively under the overhangs.

Optionally, at least one of the drive wheels can be disposed under one of the first and second overhangs and, responsive to a wind force on the vehicle, contacts that overhang.

Additionally, or alternatively, the vehicle lock further can include a flag, and the vehicle stops over the vehicle lock based on sensing the flag.

Additionally, or alternatively, the vehicle lock can be formed substantially of metal.

Under yet another aspect, a system for securing a vehicle in a solar power field is provided. The system can include a vehicle lock mounted on a track of the solar panel field. The vehicle includes drive wheels; and the track can include first and second rails. Each of the first and second rails can include a top surface receiving at least one of the drive wheels and supporting the weight of the vehicle. The vehicle lock can include first and second overhangs that protrude above the top surface. The vehicle can be configured so as to drive along the track and over the vehicle lock. The vehicle can be configured so as to stop over the vehicle lock with portions of the vehicle respectively under the overhangs.

Optionally, at least one of the drive wheels can be disposed under one of the first and second overhangs and, responsive to a wind force on the vehicle, contacts that overhang.

Additionally, or alternatively, the vehicle lock further can include a flag, and the vehicle can be configured so as to stop over the vehicle lock based on sensing the flag.

Additionally, or alternatively, the vehicle lock can be formed substantially of metal.

Under still another aspect, a method of maintaining a solar power field is provided. The method can include automatically driving the maintenance vehicle on a first track of the solar power field, a solar array being coupled to the first track. The method also can include automatically maintaining, by the maintenance vehicle during the driving, the solar array, the maintaining can include depositing a fluid at the solar array. The method also can include automatically determining, by the maintenance vehicle during the maintaining, that the maintenance vehicle requires refill of the fluid. The method also can include, responsive to the determining, automatically driving a first shuttle vehicle toward the first track on a first shuttle track of the solar power field that intersects the first track and driving the maintenance vehicle toward the first shuttle track. The method also can include automatically driving the maintenance vehicle onto the first shuttle vehicle. The method also can include automatically transporting the maintenance vehicle by the first shuttle vehicle to a refill station disposed along the first shuttle track. The method also can include automatically refilling the fluid into the maintenance vehicle while the maintenance vehicle is on the first shuttle vehicle. The method also can include, responsive to the refilling, automatically transporting the maintenance vehicle by the first shuttle vehicle to a second track. The method also can include automatically driving the maintenance vehicle off of the first shuttle vehicle at the second track.

Optionally, the method further can include automatically deploying by the first shuttle vehicle a ramp at the intersection between the first shuttle track and the first track, the maintenance vehicle automatically drives onto the first shuttle vehicle via the ramp.

Additionally, or alternatively, the method further can include automatically retracting by the first shuttle vehicle the ramp after the maintenance vehicle automatically drives onto the first shuttle vehicle via the ramp.

Additionally, or alternatively, the maintenance vehicle optionally uses the fluid to wash solar panels of the solar array.

Additionally, or alternatively, a plurality of flags can be coupled to each of the first and second tracks and to the first shuttle track, and the maintenance vehicle and the shuttle vehicle determine their respective positions based on sensing flags of the plurality.

Additionally, or alternatively, upon reaching an end of the first track away from the first shuttle track, the maintenance vehicle optionally automatically reverses direction and returns to the first shuttle track. Optionally, prior to reversing direction, the maintenance vehicle automatically stops the maintaining, and after reversing direction, the maintenance vehicle passes over the solar array without maintaining the solar array.

Additionally, or alternatively, the method optionally further can include, responsive to the maintenance vehicle reaching an end of the first track away from the first shuttle track, automatically driving a second shuttle vehicle toward the first track on a second shuttle track of the solar power field that intersects the first track; automatically driving the maintenance vehicle onto the second shuttle vehicle; automatically transporting the maintenance vehicle by the second shuttle vehicle to a third track; and automatically driving the maintenance vehicle off of the second shuttle vehicle at the third track.

Under yet another aspect, a system for maintaining a solar power field is provided. The system can include a maintenance vehicle; a first shuttle vehicle; a first shuttle track; and a refill station disposed along the first shuttle track. The maintenance vehicle can be configured to automatically drive on a first track of the solar power field, a solar array being coupled to the first track. The maintenance vehicle can be configured to automatically maintain the solar array during the driving, the maintaining can include depositing a fluid at the solar array. The maintenance vehicle can be configured to automatically determine, during the maintaining, that the maintenance vehicle requires refill of the fluid. The first shuttle vehicle can be configured to automatically drive, responsive to the determining, toward the first track on the first shuttle track of the solar power field, the first shuttle track intersects the first track. The maintenance vehicle can be configured to automatically drive, responsive to the determining, toward the first shuttle track. The maintenance vehicle can be configured to automatically drive onto the first shuttle vehicle. The first shuttle vehicle can be configured to automatically transport the maintenance vehicle to the refill station. The refill station can be configured to automatically refill the fluid into the maintenance vehicle while the maintenance vehicle is on the first shuttle vehicle. The first shuttle vehicle can be configured to automatically transport the maintenance vehicle to a second track responsive to the refilling. The maintenance vehicle can be configured to automatically drive off of the first shuttle vehicle at the second track.

Optionally, the first shuttle vehicle can be configured to automatically deploy a ramp at the intersection between the first shuttle track and the first track, the maintenance vehicle can be configured to automatically drive onto the first shuttle vehicle via the ramp. As a further option, the first shuttle vehicle can be configured to automatically retract the ramp after the maintenance vehicle automatically drives onto the first shuttle vehicle via the ramp.

Additionally, or alternatively, the maintenance vehicle optionally can be configured to use the fluid to wash solar panels of the solar array.

Additionally, or alternatively, a plurality of flags are coupled to each of the first and second tracks and to the first shuttle track, and the maintenance vehicle and the shuttle vehicle are configured to determine their respective positions based on sensing flags of the plurality.

Additionally, or alternatively, the maintenance vehicle can be configured to automatically reverse direction and return to the first shuttle track upon reaching an end of the first track away from the first shuttle track. As a further option, the maintenance vehicle can be configured to automatically stop the maintaining prior to reversing direction and to pass over the solar array without maintaining the solar array after reversing direction.

Additionally, or alternatively, the system further can include, a second shuttle vehicle configured to automatically drive toward the first track on a second shuttle track of the solar power field that intersects the first track responsive to the maintenance vehicle reaching an end of the first track away from the first shuttle track. The maintenance vehicle can be configured to automatically drive onto the second shuttle vehicle. The second shuttle vehicle can be configured to automatically transport the maintenance vehicle to a third track. The maintenance vehicle can be configured to automatically drive off of the second shuttle vehicle at the third track.

Under yet another aspect, a method of maintaining a solar power field is provided. The method can include automatically driving the maintenance vehicle on a first track of the solar power field, a solar array being coupled to the first track. The method also can include automatically maintaining, by the maintenance vehicle during the driving, the solar array, the maintaining can include depositing a fluid at the solar array. The method also can include automatically determining, by the maintenance vehicle during the maintaining, that the maintenance vehicle requires refill of the fluid. The method also can include, responsive to the determining, automatically driving the maintenance vehicle to a refill station disposed along a first transfer track, the first transfer track can be coupled to the first track via a first switch. The method also can include automatically refilling the fluid into the maintenance vehicle. The method also can include, responsive to the refilling, automatically driving the maintenance vehicle to a second track, the first transfer track can be coupled to the second track via a second switch.

Optionally, the method further can include, prior to automatically driving the maintenance vehicle to the second track, setting the first switch to a through position and setting the second switch to a divergent position. As a further option, the method can include, prior to automatically driving the maintenance vehicle to the first transfer track, setting the first switch to the divergent position.

Additionally, or alternatively, the maintenance vehicle optionally uses the fluid to wash solar panels of the solar array.

Additionally, or alternatively, a plurality of flags optionally are coupled to each of the first and second tracks and to the transfer track, and the maintenance vehicle determines its position based on sensing flags of the plurality.

Additionally, or alternatively, upon reaching an end of the first track away from the first transfer track, the maintenance vehicle optionally automatically reverses direction and returns to the first transfer track. As a further option, prior to reversing direction, the maintenance vehicle automatically stops the maintaining, and after reversing direction, the maintenance vehicle passes over the solar array without maintaining the solar array.

Additionally, or alternatively, the method optionally further can include, responsive to the maintenance vehicle reaching an end of the first track away from the first shuttle track, automatically driving the maintenance vehicle onto a second transfer track of the solar power field that intersects the first track; automatically driving the maintenance vehicle onto the second transfer track via a third switch; and automatically driving the maintenance vehicle from the second transfer track to a third track of the solar power field that intersects the first track.

Under still another aspect, a system for maintaining a solar power field is provided. The system can include a maintenance vehicle; a first transfer track; a first switch; a second switch; and a refill station. The maintenance vehicle can be configured to automatically drive on a first track of the solar power field, a solar array being coupled to the first track. The maintenance vehicle can be configured to automatically maintain, during the driving, the solar array, and the maintaining can include depositing a fluid at the solar array. The maintenance vehicle can be configured to automatically determine, during the maintaining, that the maintenance vehicle requires refill of the fluid. The maintenance vehicle can be configured to, responsive to the determining, automatically drive to a refill station disposed along the first transfer track, the first transfer track can be coupled to the first track via the first switch. The refill station can be configured to automatically refill the fluid into the maintenance vehicle. The maintenance vehicle can be configured to, responsive to the refilling, automatically drive to a second track, the first transfer track can be coupled to the second track via the second switch.

Optionally, the system can be configured to, prior to the maintenance vehicle automatically driving to the second track, set the first switch to a through position and set the second switch to a divergent position.

Additionally, or alternatively, the system optionally can be configured to, prior to automatically driving the maintenance vehicle to the first transfer track, set the first switch to the divergent position.

Additionally, or alternatively, optionally the maintenance vehicle can be configured to use the fluid to wash solar panels of the solar array.

Additionally, or alternatively, optionally a plurality of flags are coupled to each of the first and second tracks and to the transfer track, and the maintenance vehicle can be configured to determine its position based on sensing flags of the plurality.

Additionally, or alternatively, optionally the maintenance vehicle can be configured to, upon reaching an end of the first track away from the first transfer track, automatically reverse direction and return to the first transfer track. As a further option, the maintenance vehicle can be configured to, prior to reversing direction, automatically stop the maintaining, and after reversing direction, pass over the solar array without maintaining the solar array.

Additionally, or alternatively, optionally the maintenance vehicle can be configured to, responsive to the maintenance vehicle reaching an end of the first track away from the first shuttle track, automatically drive onto a second transfer track of the solar power field that intersects the first track; the maintenance vehicle can be configured to automatically drive onto the second transfer track via a third switch; and the maintenance vehicle can be configured to automatically drive from the second transfer track to a third track of the solar power field that intersects the first track.

BRIEF DESCRIPTION OF DRAWINGS

FIG. 11C schematically illustrates a detailed perspective view of a portion of an exemplary shuttle vehicle that includes an exemplary ramp, according to some examples.

DETAILED DESCRIPTION

Systems, methods, and vehicles are provided herein for maintaining solar panels. For example, solar plant (field) maintenance tasks can be relatively expensive or impractical to conduct manually, e.g., by workers on foot or in trucks, for example because of the cost of human labor, because of the management challenge of deploying relatively large numbers of people to service relatively large solar plants, and/or because of the risk that people can damage panels or injure themselves, especially since some maintenance tasks may be performed at night. Using special-purpose tractors or trucks potentially can improve productivity over manual maintenance, but can add the risk of collisions with solar panels. The rows between panels tend not to be paved so driving the tractor or truck on uneven, potentially muddy terrain can increase risk with such a method.

An unmanned driving vehicle, such as a robotic system (which also can be referred to as a robot), can be used to conduct maintenance tasks so as to avoid or reduce problems that can be associated with manual maintenance or truck-based maintenance. A challenge with implementing a robotic system can be providing a way for the robot to move about the solar field in a way that is relatively reliable, safe, and inexpensive. For example, it can be useful for the robot to be accurately positioned and controlled to move along a row of solar panels. As another example, it can be useful for the robot to be accurately moved from one row of solar panels to another. As another example, various maintenance processes can use consumable fluids, such as cleaning fluids, so it can be useful for the robot to be refillable with such a consumable fluid. As another example, it can be useful for the robotic system to be relatively simple so as to provide or ensure reliable operation.

The present subject matter provides, among other things, robotic solar field maintenance systems and methods in which such systems can be used. As provided herein, the present maintenance systems can include robotic maintenance machines (which also can be referred to as robots, maintenance robots, machines, maintenance machines, robotic machines, or maintenance vehicles) configured so as to drive along tracks that are disposed under and/or supporting the solar panels of the solar field, as well as an infrastructure of other suitable components configured so as to move the robotic maintenance machines from row to row and/or to refill them with consumable fluids. A control system can be configured so as to direct the operation of the components of the system. The system can provide, among other things, a structured environment for automation of maintenance on a solar power plant site.

Figure 1:
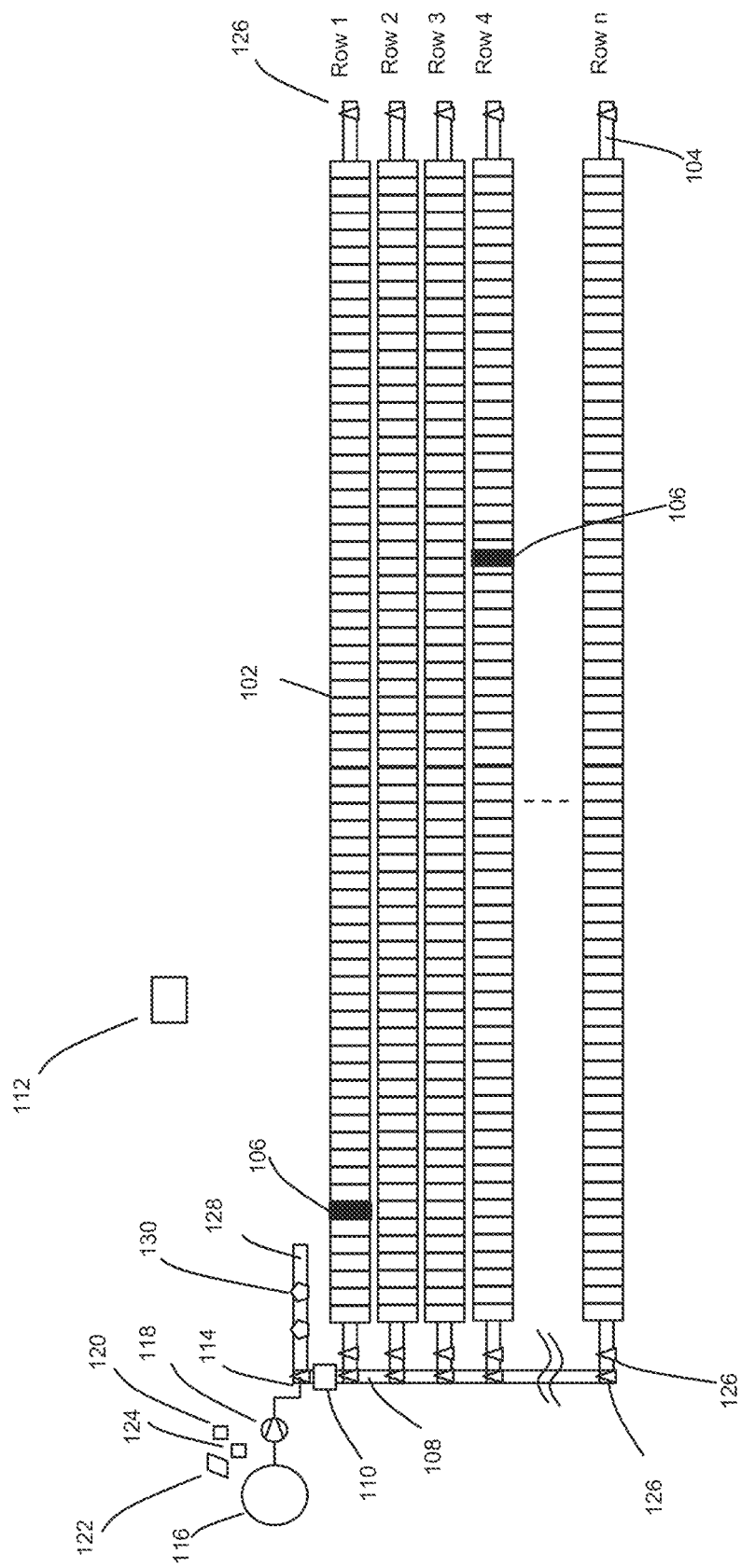
FIG. 1 schematically illustrates a plan view of an exemplary solar power plant, e.g., PV power plant, including an exemplary maintenance vehicle system such as provided herein, according to some examples.

FIG. 1 schematically illustrates a plan view of an exemplary solar power plant, e.g., PV power plant, including an exemplary maintenance vehicle system such as provided herein. The system can include one or more maintenance vehicles 106. A plurality of solar photovoltaic panels 102 can be arranged in respective rows (e.g., rows 1, 2, 3, 4, . . . n such as illustrated in FIG. 1, and each row can include a set of tracks 104 configured to support maintenance vehicle(s) 106. The tracks can serve a second purpose as a ballast foundation for the solar panels, or the foundation for the solar panels can be separate from the tracks. The tracks 104 can be substantially aligned with one another in and along the rows. The tracks 104 can include one or more vehicle support surfaces configured so as to allow the maintenance vehicle(s) 106 to drive along the tracks in a direction parallel to the respective row. As such, in certain configurations provided herein, a maintenance vehicle 106 can travel along a row of solar panels on the tracks 104 and perform one or more maintenance tasks as it travels and/or a maintenance vehicle 106 can use the track 104 to move from one location to another without performing a maintenance task.

In one nonlimiting configuration, tracks 104 are formed of or include slip-formed concrete that provides first and second vehicle support surfaces, which can be referred to as rails. These surfaces each can be substantially flat, substantially parallel to one another and to the ground, and spaced apart from the ground at substantially the same height as one another. Optionally, the first vehicle support surface can be provided by a first rail formed of or including slip formed concrete, and the second vehicle support surface can be provided by a second discrete rail formed of or including slip formed or extruded concrete, and the first and second rails can be spaced apart from one another and each can extend along one of the rows. As another option, the first and second rails can be provided within an integrated piece of slip formed or extruded concrete that extends along one of the rows. Optionally, one or more grooves are formed within the concrete into which one or more feet of support systems of the solar panels 102 can be disposed and optionally adhered so as to securely support the solar panels 102. As another option, first and second rails can be separate members fastened onto a structure or foundation that supports the solar panels where the structure or foundation may not use or include concrete.

Continuing with FIG. 1, in some configurations, at one end of the rows of solar panels 102, the tracks 104 optionally intersect with a second track 108, which can be referred to as a shuttle track. In one nonlimiting configuration, the track 108 include two vehicle support surfaces or rails that are parallel to one another and set apart from the ground. Optionally, the rails of track 108 can be metal rails that rest on and are supported by the ends of the tracks 104. As another option, these rails of track 108 can be metal and supported by concrete or wooden supports. As another option, these rails of track 108 can be formed of or include slip-formed concrete. In some configurations, a shuttle vehicle 110 (which also can be referred to as a shuttle) travels on and along the shuttle track 108, and this shuttle vehicle 110 can be used to move the maintenance vehicles 106 from one row of solar panels to another row of solar panels, e.g., from row 1 to row 2, from row 1 to row 3, from row 2 to row n, and so on. For example, in some configurations, the shuttle vehicle 110 can be positioned at the intersection of a solar panel track 104 and the shuttle track 108, at which position the maintenance vehicle 106 can drive on top of or inside of the shuttle vehicle 108 and stop. Then the shuttle vehicle 110 can move itself and the maintenance vehicle 106 to another row, and then the maintenance vehicle 106 can disembark so as to travel along that row.

Continuing with FIG. 1, each maintenance vehicle 106 and the shuttle vehicle 110 can include a control system and a wireless communication system which can be configured so as to communicate with a gateway 112, which can include a special-purpose computer with memory, a wireless communication system configured for communication with the solar plant vehicles, and a second communication system configured for communication offsite, such as a cellular modem, a satellite modem, a wired communication system, or another communication system. In some configurations, the gateway 112 can be programmed from any suitable device connected to the Internet (or connected directly to the gateway 112) so the control of the maintenance system can be done remotely or locally with an Internet-connected device.

Continuing with FIG. 1, a subsystem optionally can be included that is configured to automatically refill one or more consumable fluids in a maintenance vehicle 106. For example, some maintenance processes can use a consumable fluid. As one example, cleaning solar panels can use water or another cleaning fluid. In some configurations, the maintenance vehicle 106 is configured so as to carry a finite amount of a consumable fluid, such as for cleaning or otherwise maintaining solar panels 102 as it travels along a row, and the fluid can be refilled from time to time. In one configuration, the fluid can be refilled using a refill subsystem that can include a fluid refill spout 114, which can include a pipe with an open end pointing down, which end can be located above part of the system's tracks in an area that the maintenance vehicle can navigate to, for example above the shuttle track 108. This spout 114 can be supplied by a fluid reservoir tank 116, and fluid can be pushed to the spout 114 by a pump 118. The tank can alternatively be elevated so that the fluid can be driven by gravity and regulated by a valve. In either case, the pump or valve can be controlled by a control system 120, which can communicate wirelessly to the gateway 112. The pump or valve can alternatively be controlled manually by an operator on site. Power can be supplied by a solar panel 122 with a battery for energy storage 124.

Continuing with FIG. 1, a plurality of flags 126 (flags 126 denoted by respective triangles) optionally can be provided so as to assist with control the maintenance vehicle 106 and the shuttle vehicle 110. In some configurations, each flag 126 can be or include a device that can be located on or adjacent to one or more of the tracks 104, 108 such that, when a vehicle 106 or 110 reaches that location on the track, a signal is generated by a sensor of that vehicle and the signal is sent to the vehicle's control system. In some configurations, a flag 126 can be located at each end of each solar panel track 104 such that when the maintenance vehicle 106 travels past the last solar panel in a row, it arrives at a flag 126 which causes a signal to be generated by a sensor of vehicle 106 and provided to the vehicle's control system. The vehicle control system can use this signal to trigger a different operation. For example, if the maintenance vehicle 106 had been conducting a maintenance process along a row of panels from left to right in FIG. 1, the vehicle's control system can stop the maintenance process upon sensing the flag 126 and then reverse the travel direction to return vehicle 106 to the shuttle track 108. In another example, based upon maintenance vehicle 106 encountering a flag 126 on the end of the solar panel track 104 near the shuttle track 108, the maintenance vehicle's control system can be controlled to stop and wait for the shuttle vehicle 110 to be in the correct position before continuing to move the vehicle to the shuttle track 108 intersection. Signals optionally can be transmitted between the different vehicles and the gateway 112 to coordinate such actions. The shuttle track 108 also can include a series of flags 126 to help confirm the position of shuttle vehicle 110 along the track 108, for example when the shuttle vehicle is properly positioned at the intersection of the solar panel track 104 and the shuttle track 108.

Continuing with FIG. 1, in some configurations the shuttle track 108 intersects with another track, which can be referred to as a home track 128. The home track 128 can be formed such that the maintenance vehicles 106 can drive on it similarly as they do on the solar panel tracks 104. For example, the home track 128 can be formed with substantially the same material and with the rails of substantially the same configuration and in substantially the same spacing as with the solar panel tracks 104. The shuttle vehicle 110 can be configured so as to move a maintenance vehicle 106 from a solar panel track 104 to the home track 128 just as if it were moving it from one solar panel row to another solar panel row. The home track 128 can be used to store maintenance vehicles 106 when they are not in use. Located on the home track optionally are one or more vehicle locks 130 (denoted in FIG. 1 by a pentagon); alternatively, the vehicle lock(s) 130 can be located at another suitable location within the system, e.g., at ends of the tracks 104 opposite to the shuttle track 108. As described herein with reference to FIGS. 10A-10B, a vehicle lock 130 can include a strong piece of metal that prevents or inhibits a strong wind or seismic event from derailing the maintenance vehicle 106 when the maintenance vehicle is positioned above the vehicle lock. The vehicle lock 130 optionally also includes a flag that can initiate triggering of a signal in the maintenance vehicle 106 to alert the vehicle of its position relative to the vehicle lock, similar to the flags 126 on the solar panel tracks 104.

Figure 2A:
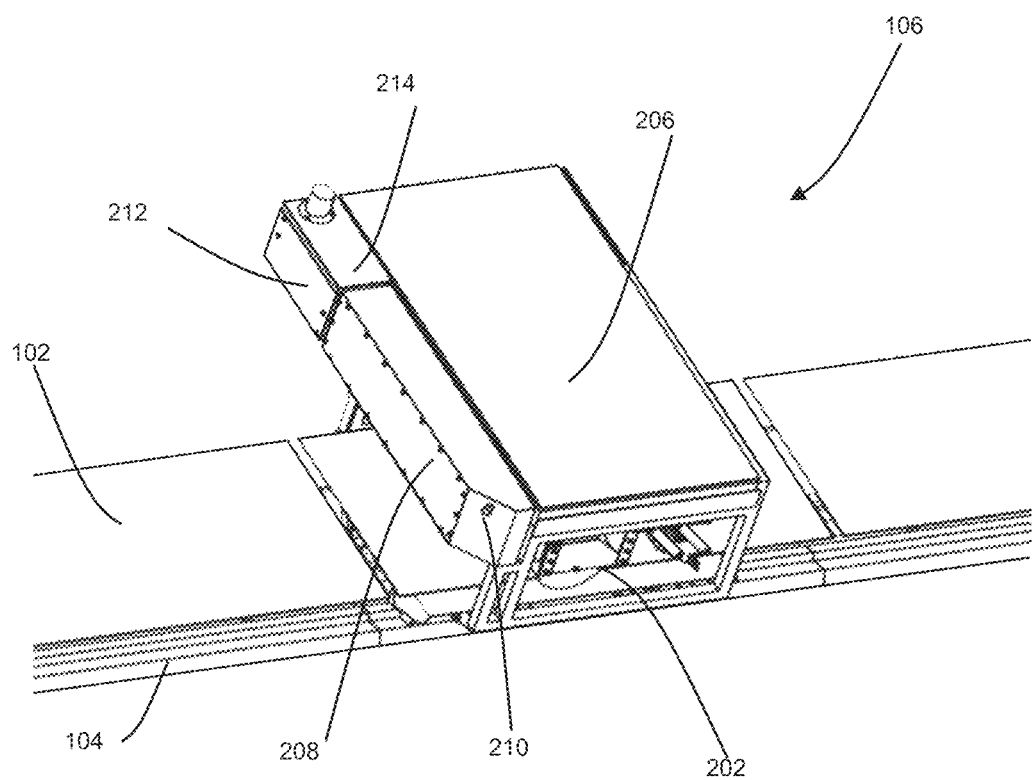
FIGS. 2A and 2B schematically illustrate different views of an exemplary configuration of a maintenance vehicle, according to some examples.
Figure 2B:
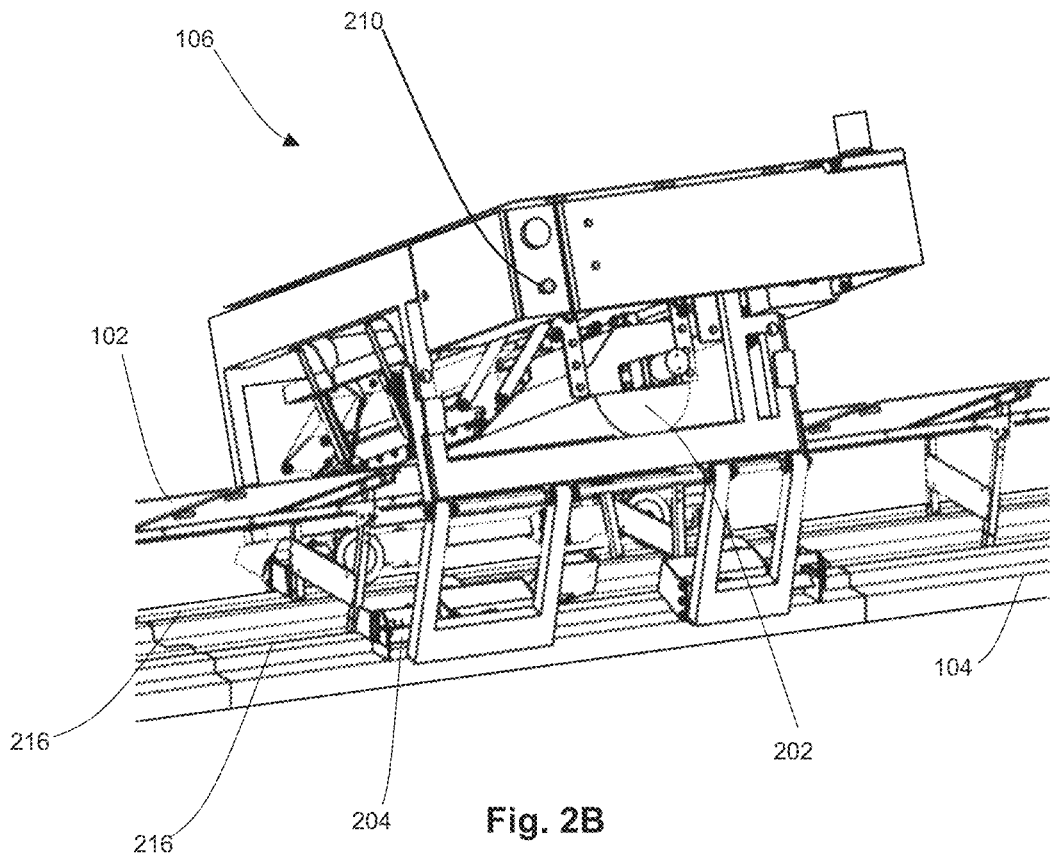

FIGS. 2A and 2B schematically illustrate different views of an exemplary configuration of a maintenance vehicle 106. The vehicle illustrated in FIGS. 2A and 2B can be configured for cleaning solar panels, but it should be appreciated that the vehicle architecture can be similar for other maintenance tasks with the process implements being suitably modified. In the configuration illustrated in FIGS. 2A and 2B, the maintenance vehicle 106 can be configured to drive on and along track(s) 104 in such a manner that process implements 202, for example a cleaning brush and wiper in this case, can be positioned over a series of solar panels 102 as the vehicle drives over and past those panels. In one nonlimiting configuration, the maintenance vehicle 102 drives on the track 104 with four wheel sets 204, with two wheel sets on each side of the track. The wheels can be driven electrically, driven by a combustion engine, driven by fluid pressure, or by another suitable means of propulsion. Optionally, a solar panel 206 provides power for the maintenance vehicle 106, and a battery (not shown) provides energy storage. The vehicle 106 also can include a controller and wireless communication system (not shown) to control its actions and to send and receive data from the gateway 112. The battery and controller can be located in a housing 208 on the vehicle. The vehicle 106 also optionally includes any suitable number, e.g., two, emergency stop buttons 210 on either side of the vehicle. The buttons can be configured such that, when pressed manually, the vehicle stops all processes. For example, the controller can be configured so as to stop movement and all processes of the vehicle responsive to one of the stop buttons 210 being pressed.

Figure 41A:
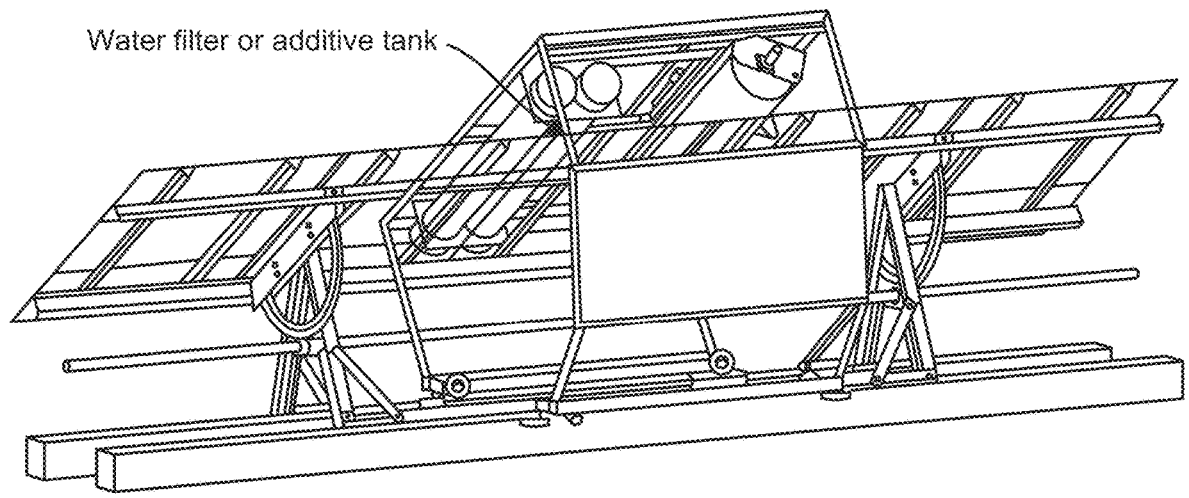
Figure 41B:
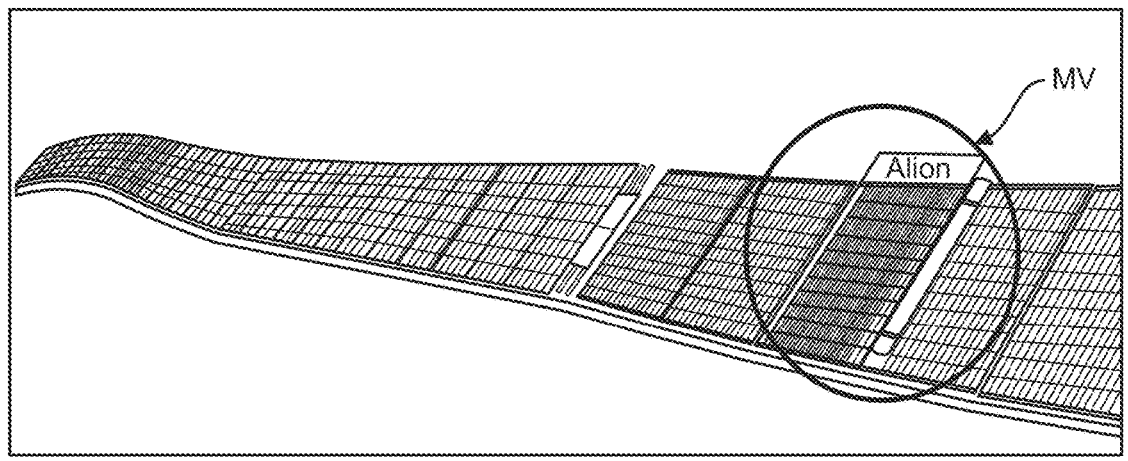
Figure 42A:
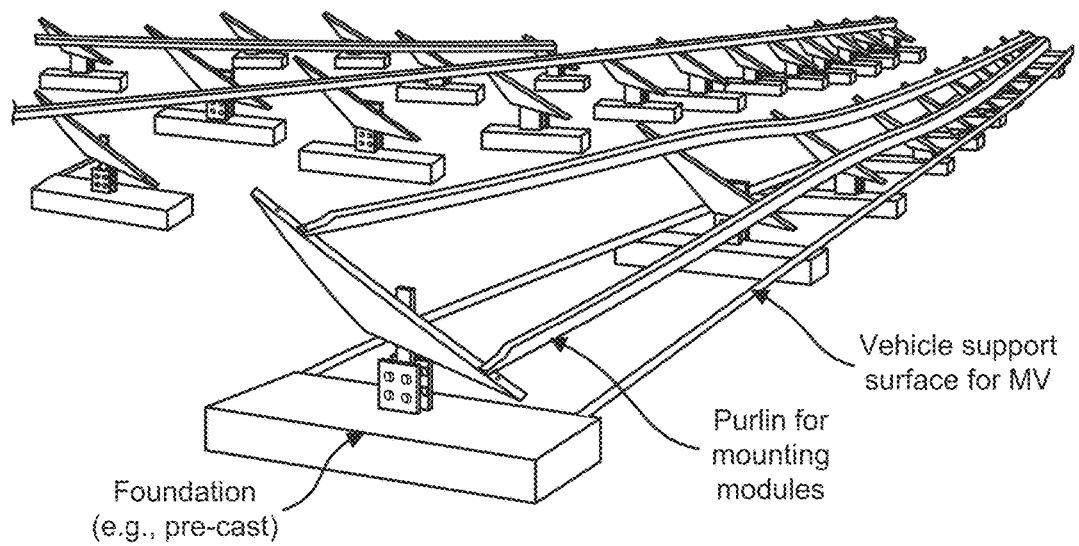
Figure 42B:
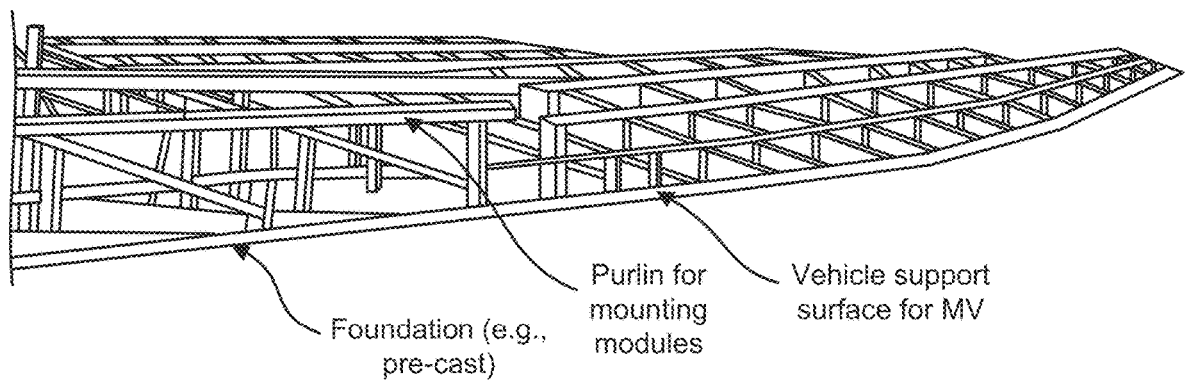
Figure 42C:
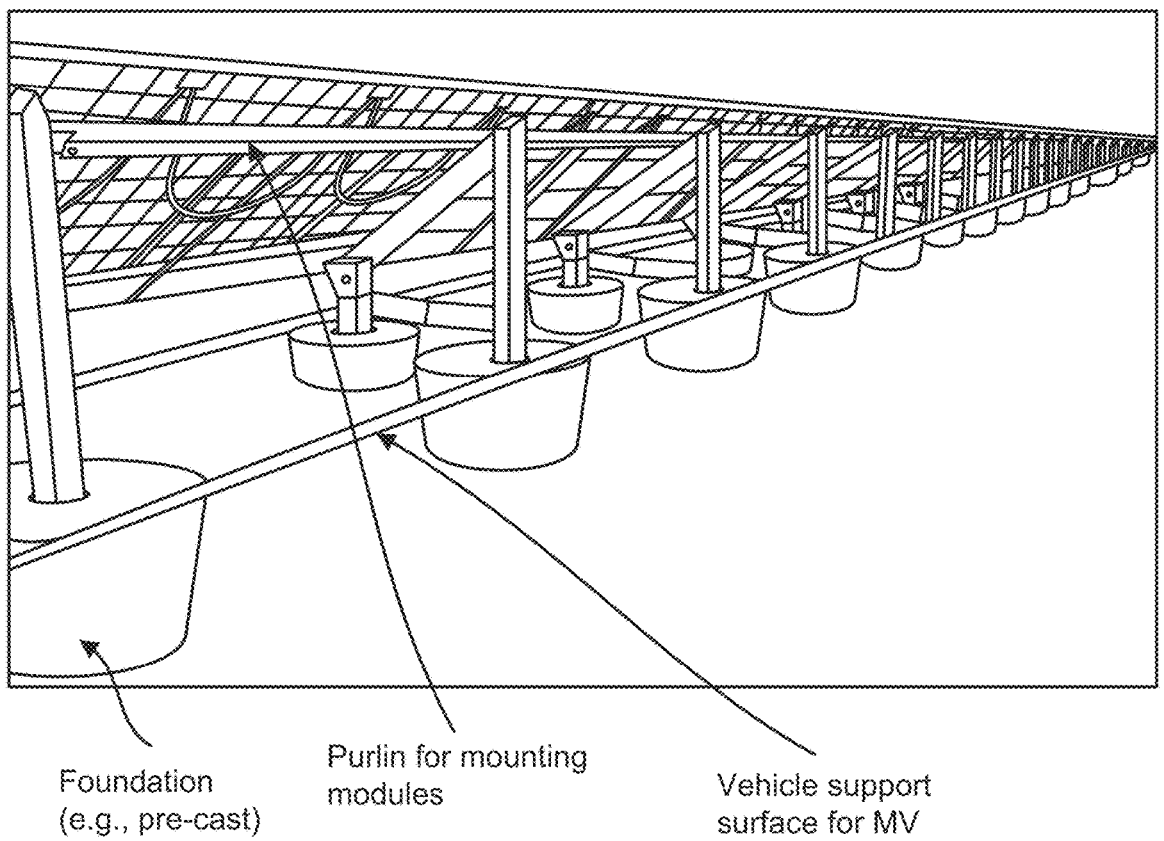

Additionally, as noted herein, some maintenance processes can use consumable fluids. In the nonlimiting configuration shown in FIGS. 2A-2B, the vehicle 106 can include a fluid reservoir tank 212 configured so as to carry one or more fluids while the vehicle travels about the solar field. The tank 212 can include an access port or door 214, optionally located on the top, configured so as to allow refill of the one or more fluids. In some configurations, this door 214 can be opened automatically for automatic refill and/or can be opened manually for manual refill. The maintenance vehicle 106 can optionally include an on-board fluids treatment system to process or improve the consumable fluid before using the fluid for a maintenance process. If the consumable fluid is or includes water, for example, an on-board fluid treatment system can include a water treatment system that reduces the salt content of the water, changes the pH of the water, reduces the water hardness (e.g., level of $CaCO_4$ or $CaSO_4$), or reduces the concentration of dissolved gases in the water. As another example, the fluid treatment system can add a suitable dose of detergent to the cleaning water. As another example, the fluid treatment system can conduct temperature control, e.g., heat or cool the fluid so that it flows and deposits correctly for its process. As another example, the fluid treatment system can agitate, stir, or shake the stored fluid to ensure that it is sufficiently mixed before use. A further example would be to pressurize the fluid before use. Another exemplary configuration is illustrated in FIGS. 41A-41B, which schematically illustrate a MV that includes a water filter or additive tank. The MV can be equipped with one or more water filters. For example, if the water source for the MV provides water that contains particulate matter or other material, the filters on the MV will or can capture this material and inhibit or prevent the MV water emitter from being clogged and/or the modules from being soiled or damaged. In FIG. 41B, which illustrates an exemplary MV on a tracker row, a water filter or additive tank is visible under the MV module. In some configurations, the track 204 can include two rails (e.g., vehicle support surfaces) 216, and the wheel sets 204 ride on the rails 216. In one nonlimiting example, the maintenance vehicle can include one or more maintenance implements configured similarly to those described in U.S. Patent Publication No. 2015/0144156 to French et al., the entire contents of which are incorporated by reference herein. In another nonlimiting example, the maintenance vehicle can include one or more maintenance implements configured similarly to those described in U.S. Patent Publication No. 2017/0163209 to Bailey et al., the entire contents of which are incorporated by reference herein.

Figure 43:
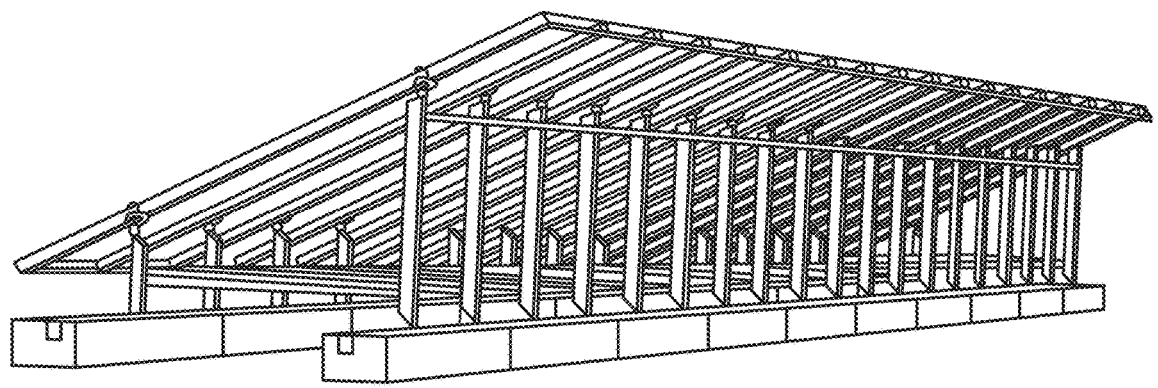

In another exemplary configuration such as schematically illustrated in FIG. 43, the maintenance vehicle can be configured so as to apply a suitable fluid, such as vegetation control material, to an area 4300 between track sections in the case of a split-track foundation. Vegetation control materials that the maintenance vehicle can apply to the ground around and between rows includes herbicide and/or seeds for beneficial plants. Materials other than vegetation control substances can include animal repellants or control substances. For example, repellant substances can minimize or reduce rodents chewing wires or deer breaking panels. According to certain embodiments, on a site with "split track" foundations in which the track is composed of or includes separate parts with exposed ground in-between, the present maintenance vehicles can be used to apply vegetation control or other materials to this area.

Figure 3A:
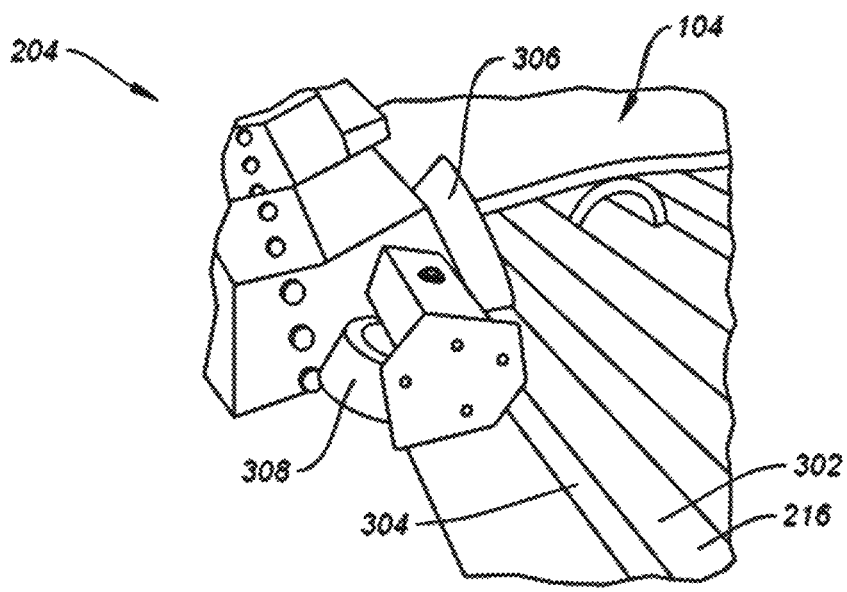
FIGS. 3A and 3B schematically illustrate detailed perspective views of an exemplary maintenance vehicle wheel set, according to some examples.
Figure 3B:
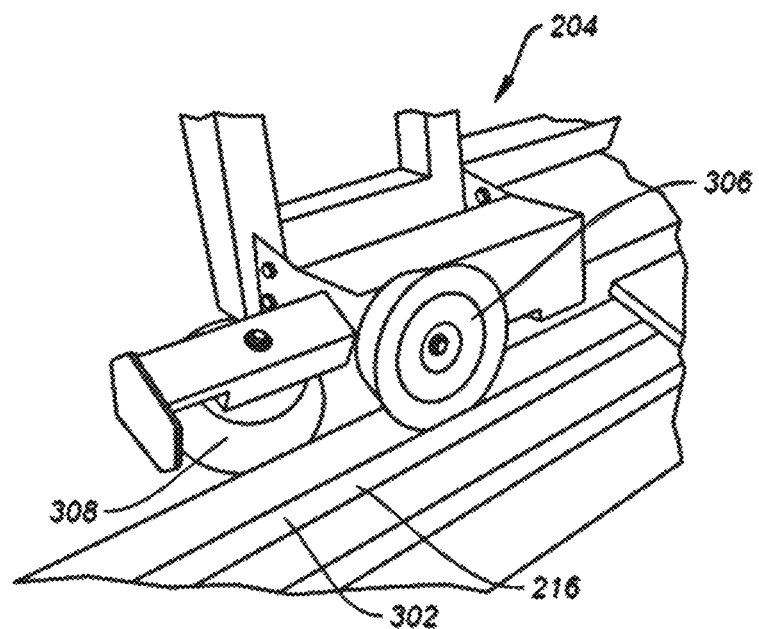

FIGS. 3A and 3B schematically illustrate detailed perspective views of an exemplary maintenance vehicle wheel set 204 on one rail 216 of the track 104. Other wheel sets of the vehicle 106 can be configured similarly as shown in FIGS. 3A-3B. In the illustrated configuration, the rail 216 can include a top surface 302 that is substantially parallel to the ground, and an outside surface 304, which can be at an angle to the ground, e.g., at about 90 degrees relative to the ground. The wheel set 204 can include a drive wheel 306 and a guide wheel 308, and the drive wheel and guide wheel can be disposed at an angle to one another, e.g., at about 90 degrees to one another. In some configurations, the drive wheel 306 contacts the top surface 302 of the rail 216 so as to support the weight of the vehicle. In this configuration, motor-gearbox combinations optionally can be used so as to drive the drive wheel 306. Other suitable mechanisms for providing power to a drive can be provided instead. Optionally, not all of the drive wheels need to be powered; some can simply support the weight of the vehicle. The guide wheel 308 contacts the outside surface 304 of the rail 216. In some configurations, guide wheels 308 of multiple wheel sets of the vehicle contact the respective outside surfaces 304 of both rails, thereby keeping the vehicle 106 substantially aligned with the track and inhibiting derailment. In some configurations, the guide wheels 308 on the maintenance vehicle are located in front of the drive wheels 306 in the front of the vehicle and behind the drive wheels in the rear of the vehicle. The vehicle wheel sets can be configured differently as well.

Figure 4:
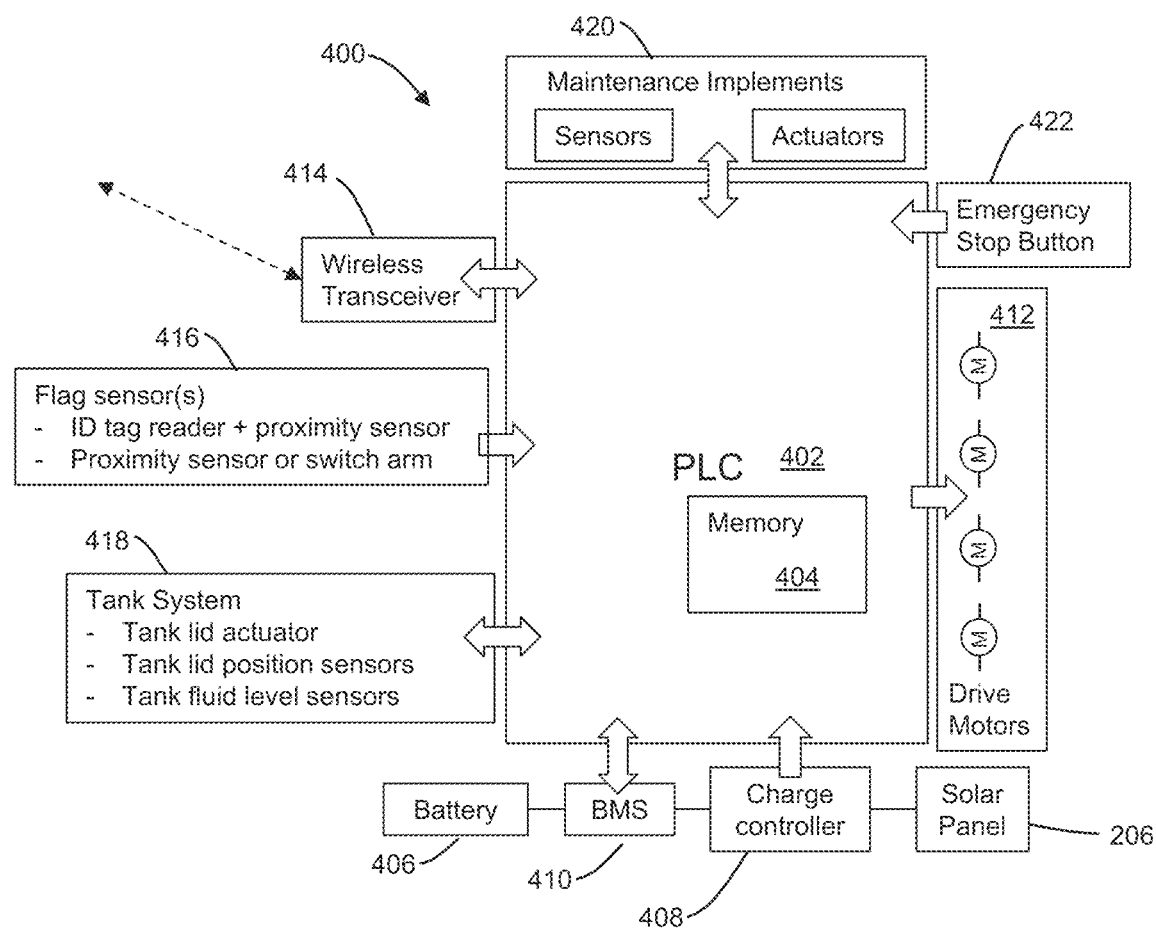
FIG. 4 schematically illustrates a diagram of a maintenance vehicle's on-board electronics system, according to some examples.

FIG. 4 schematically illustrates a diagram of the maintenance vehicle's 106 on-board electronics system 400. The system can include a programmable logic controller (PLC) 402 that includes memory 404 to store some data on board. System 400 optionally can include a solar panel 206, as schematically illustrated in FIGS. 2A and 2B, for power. System 400 can include a battery 406 for energy storage, and a charge controller 408 configured to keep the battery suitably charged. System 400 can include a battery management system (BMS) 410 configured so as to provide further control of the battery and so as to provide suitable data to the PLC, such as battery state of charge. The PLC 402 can be configured so as to control power to the drive motors 412. System 400 can include a wireless transceiver 414 configured to send and receive data wirelessly. System 400 include can include one or more flag sensors 416, which can be configured so as to send signals to the PLC 402 responsive to interaction with flags 126 such as described herein with reference to FIG. 1. As described in greater detail herein with reference to FIGS. 5A-5B and 6A-6B, flag sensors 416 can be or include any suitable combination of an ID tag reader, a proximity sensor, a switch arm, or other suitable sensor of a mechanical, electrical, or magnetic flag. The vehicle's tank 212, schematically illustrated in FIGS. 2A and 2B, can include an actuator to open the tank lid 214, sensors to confirm the position of the lid, and a measurement system to determine the fluid level, and system 400 can include a tank system 418 for controlling such elements. The maintenance vehicle's electronics system 400 also can include any suitable sensors and/or actuators configured so as to control maintenance implements 420, such as a subsystem configured so as to deploy and retract a maintenance implement and sensors to confirm that it is in position. Such maintenance implement can include any suitable subsystem or combination of subsystems such as a spray system, a motor-driven rotating brush, a water deposition system, a wiper, a camera system, a cutting blade to trim vegetation, a snow blower, and/or any other suitable implement(s).

Figure 5A:
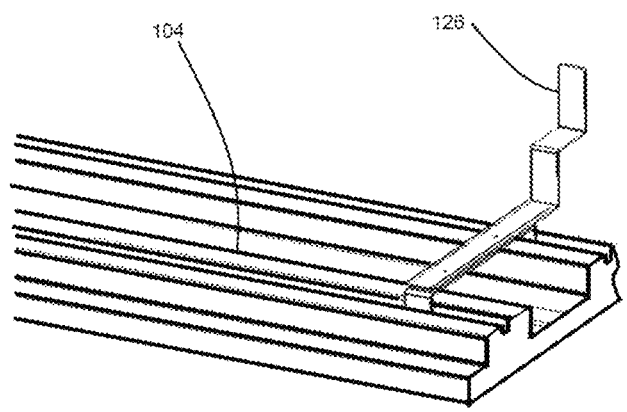
FIG. 5A schematically illustrates an exemplary configuration of a flag mounted on a track, according to some examples.
Figure 5B:
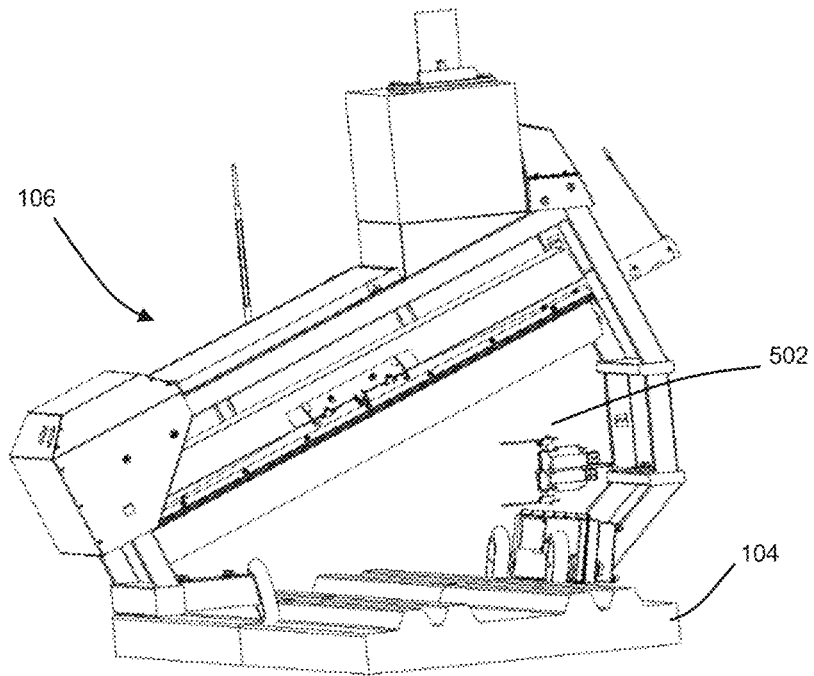
FIG. 5B schematically illustrates a maintenance vehicle on a track and configured to detect the flag of FIG. 5A, according to some examples.
Figure 33:
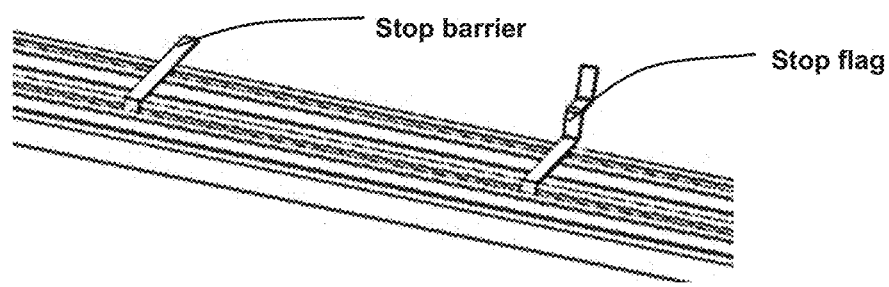

FIG. 5A schematically illustrates an exemplary configuration of a flag 126 mounted on a track 104, and FIG. 5B schematically illustrates a maintenance vehicle 106 on a track 104 and configured to detect flag 126. In this configuration, the flag 126 can be or include an upright structure, such as a vertical piece of metal or other suitable material that can be coupled/mounted to the track. The maintenance vehicle 106 can include two trigger arms 502 that are positioned and configured so as to hit the vertical part of the flag when the vehicle drives to the flag's location. The trigger arms 502 can be configured so as to rotate upon impact with flag 126 and include a sensor mechanism configured so as to trigger an electrical signal responsive to such impact. The nonlimiting configuration illustrated in FIG. 5B includes two trigger arms 502 for redundancy, but it should be appreciated that one trigger arm or more than two trigger arms alternatively can be used. In some configurations, two sensors, e.g., two trigger arms 502, are activated when the vehicle 106 reaches a flag. For example, the vehicle 106 can operate even with a bad sensor. In another example, if only one sensor is operating, the vehicle can be automatically flagged for maintenance. Redundant sensors can enable additional confidence in MV performance, according to certain embodiments. Optionally, flag 126 illustrated in FIG. 5A can include an ID tag such as described herein with reference to FIG. 6A, and the vehicle 106 can include an ID tag reader such as described herein with reference to FIG. 6B. A similar flag and sensor system such as illustrated in FIGS. 5A-5B suitably can be adapted for use with shuttle track 108 and shuttle vehicle 110. Another exemplary configuration is illustrated in FIG. 33, which includes a stop barrier (e.g., a horizontal metal piece coupled to the track) and a stop flag (e.g., a vertical metal piece coupled to the track) corresponding to flag 126. The stop barrier on the track can provide a physical barrier to maintenance vehicle (MV) movement. The stop flag can engage with MV sensors to notify the MV robot that the end of row has been reached. Stop flag sensors on the MV can be contact or non-contact (e.g., RFID, visual, magnetic, etc.). Non-contact sensors also can be referred to as proximity sensors. In one example, the stop flag can be attached to the rail using epoxy or other mechanical mechanisms.

Figure 6A:
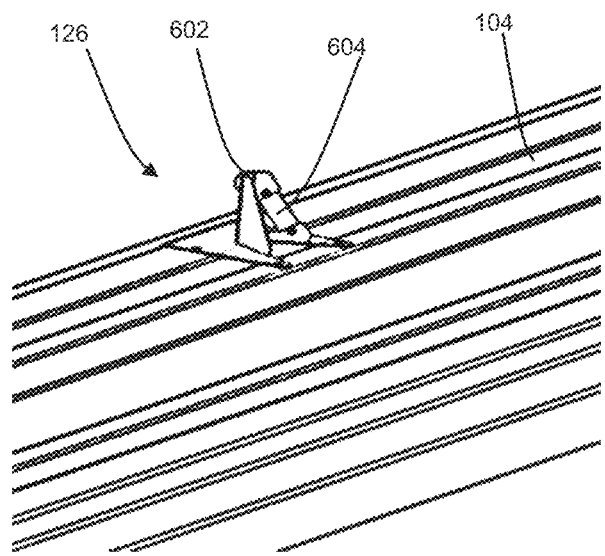
FIG. 6A schematically illustrates an example track section with a flag that includes a non-contact switch target and an identification (ID) tag mounted on a holder on a track, according to some examples.
Figure 6B:
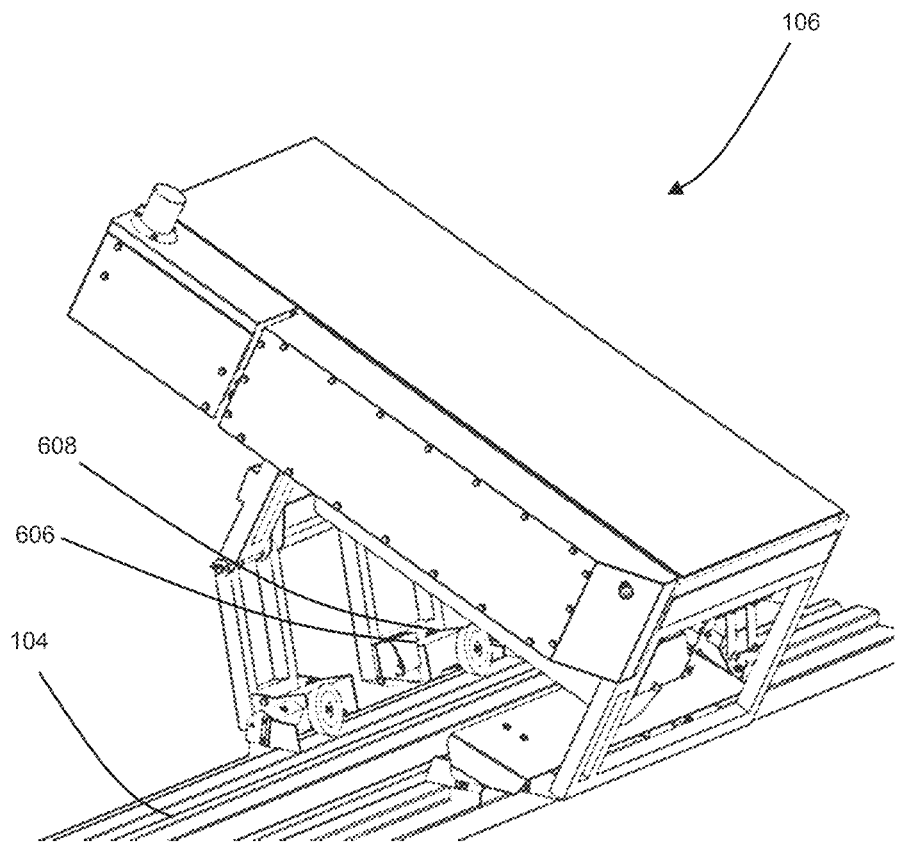
FIG. 6B schematically illustrates a maintenance vehicle on a track with a non-contact switch and ID tag reader configured to detect the flag of FIG. 6B, according to some examples.

FIGS. 6A and 6B illustrate another exemplary configuration for the flags 126 schematically illustrated in FIG. 1. FIG. 6A schematically illustrates an example track section with flag 126 that include a non-contact switch target 602 and an identification (ID) tag 604 mounted on a holder on the track. FIG. 6B schematically illustrates a maintenance vehicle 106 on a track 104 with such a non-contact switch 606 and ID tag reader 608. Two examples of non-contact switches (proximity switches) are Hall effect sensors or reed switches, although other kinds of non-contact switches could be used as well. Both Hall effect sensors and reed switches use magnets as a target. The magnet target induces a voltage in the Hall effect sensor, and the magnet target moves a reed to close a circuit in a reed switch. Non-contact switches can also use a detector that senses a target by inductive or optical means. One example of an ID tag and ID tag reader are a radio frequency identification tag (RFID) and RFID tag reader. Another example of an ID tag and ID tag reader system is an optical quick read code and quick read code reader. A quick read code can include a bar code, a matrix bar code, or another unique readable image, and these images can be observed and processed by an optical reader device such as a bar code reader. When the vehicle 106 passes by the non-contact switch target 602 and ID tag 604, both such flags can trigger respective signals on the vehicle by corresponding sensors (readers) disposed on the vehicle. For example, the non-contact switch 606 can have a relatively short range such that the corresponding sensor of vehicle 106 generates a signal when the sensor is substantially lined up with the switch 606, thus allowing the vehicle's position to be determined with relatively high accuracy. The ID tag reader of the vehicle 106 can have a longer range than does the sensor for non-contact switch 606 and so potentially can provide less accurate position information, but each ID tag in the maintenance vehicle system can be unique. As such, when the ID tag reader on the vehicle 106 reads a particular ID tag, the resulting signal can be used to confirm which row and which end of the row is the vehicle's position. Optionally, flag 126 illustrated in FIG. 6A can exclude the ID tag and the vehicle 106 can exclude an ID tag reader such as described herein with reference to FIG. 6B. As another option, flag 126 illustrated in FIG. 6A can exclude the non-contact switch target and the vehicle 106 can exclude non-contact switch such as described herein with reference to FIG. 6B. A similar flag and sensor system such as illustrated in FIGS. 6A-6B suitably can be adapted for use with shuttle tracks 108 and shuttle vehicle 110.

Each of the exemplary flag systems schematically illustrated in FIGS. 5A, 5B, 6A, and 6B suitably can tolerate long interruptions in wireless communication since data are stored on the maintenance vehicle; the position of the maintenance vehicle or shuttle vehicle need not be known at all times; and the rails constrain the vehicle(s) locations. This maintenance system's arrangement greatly simplifies task of vehicle position and therefore can provide reduced cost, relatively high reliability, and relatively simple field service.

Figure 7:
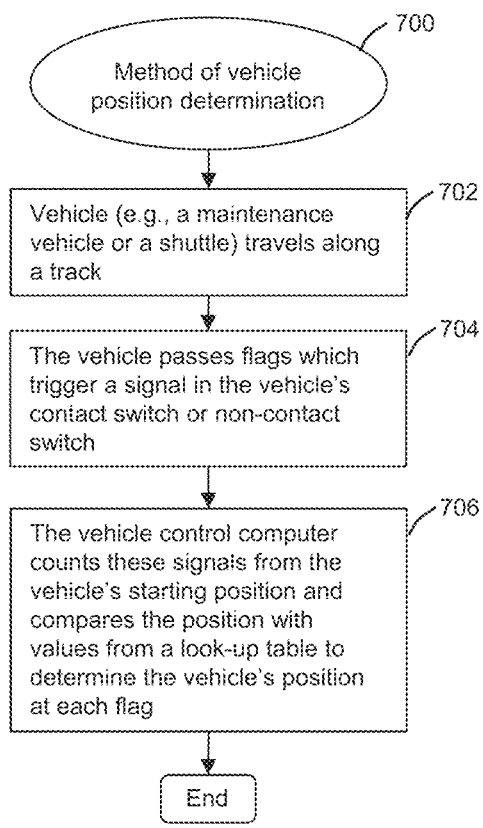
FIG. 7 illustrates a flow of operations in an exemplary method for a maintenance vehicle or a shuttle vehicle determining its position, according to some examples.

FIG. 7 illustrates a flow of operations in an exemplary method for a maintenance vehicle 106 or a shuttle vehicle 110 determining its position using only a contact switch or a non-contact switch without using an ID tag system. In method 700 illustrated in FIG. 7, a vehicle (such as a maintenance vehicle or a shuttle) travels along a track (operation 702). For example, maintenance vehicle 106 can travel along track 104 or shuttle vehicle 110 can travel along track 108 in a manner such as described herein with reference to FIG. 1. In method 700 illustrated in FIG. 7, the vehicle passes flags which trigger a signal in the vehicle's contact switch or non-contact switch (operation 704). For example, as maintenance vehicle 106 travels along track 104 or shuttle vehicle 110 travels along track 108, that vehicle can pass a plurality of flags 126 that each includes, consists essentially of, or consists of a contact switch or a non-contact switch and that does not include an ID tag system or global positioning system (GPS) tag. For example, the flags can be or include mechanical structures configured similarly as described herein with reference to FIG. 5A, and the vehicle can include a contact switch (e.g., one or more trigger arms 502) that triggers a signal responsive to contact with the mechanical structures and is configured similarly as described herein with reference to FIG. 5B. As another example, the flags can be or include a non-contact switch target 602 configured similarly as described herein with reference to FIG. 6A, and the vehicle can include a non-contact switch 606 that triggers a signal responsive to proximity or alignment with the non-contact switch target with the non-contact switch 606. In method 700 illustrated in FIG. 7, the vehicle control computer counts these signals beginning from the vehicle's starting position and compares the position with values from a look-up table to determine the vehicle's position at each flag (operation 706). For example, memory 404 of vehicle 106 or corresponding memory of shuttle 110 can store a look-up table that stores the locations on the solar plant of the flags. The computer program controlling vehicle movements can plan out what each action to do when the vehicle encounters each flag, knowing ahead of time where all of the flags are on the field.

Figure 8:
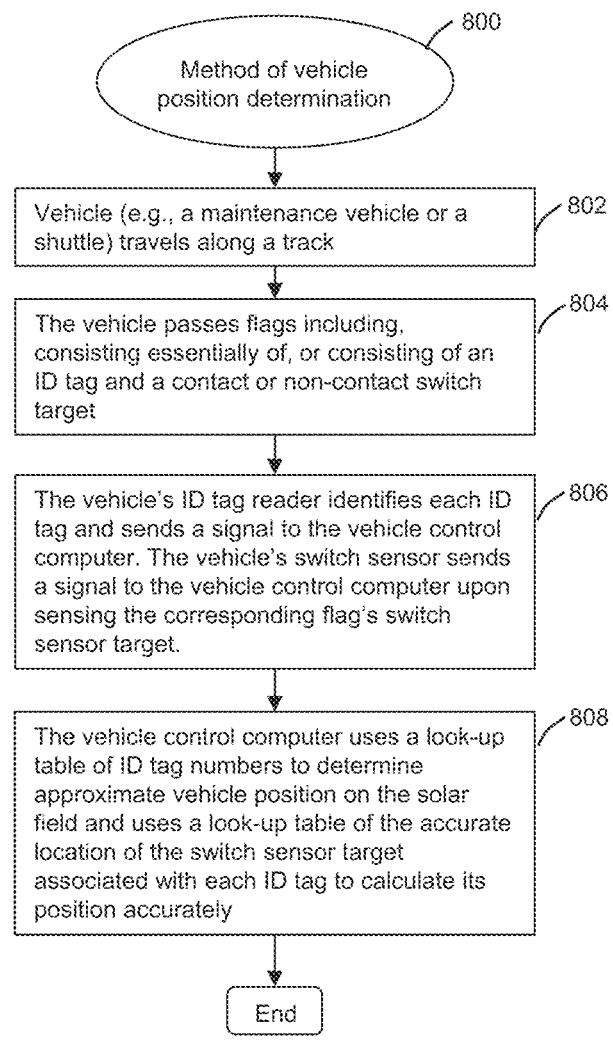
FIG. 8 illustrates a flow of operations in an exemplary method for a maintenance vehicle or a shuttle vehicle determining its position, according to some examples.

FIG. 8 illustrates a flow of operations in an exemplary method for a maintenance vehicle 106 or a shuttle vehicle 110 determining its position using a flag system that uses both switches (such as contact switches and/or non-contact switches) and ID tags. In method 800 illustrated in FIG. 8, a vehicle (such as a maintenance vehicle or a shuttle) travels along a track (operation 802). For example, maintenance vehicle 106 can travel along track 104 or shuttle vehicle 110 can travel along track 108 in a manner such as described herein with reference to FIG. 1. In method 800 illustrated in FIG. 8, the vehicle passes flags that include, consist essentially of, or consist of an ID tag and a contact or non-contact switch target (operation 804). For example, as maintenance vehicle 106 travels along track 104 or shuttle vehicle 110 travels along track 108, that vehicle can pass a plurality of flags 126 that each includes, consists essentially of, or consists of an ID tag and a contact switch or a non-contact switch and that optionally does not include a global positioning system (GPS) tag. For example, the tags can include ID tags such as described herein with reference to FIG. 6A, and the vehicle can include an ID tag reader. Additionally, the flags can include mechanical structures configured similarly as described herein with reference to FIG. 5A and the vehicle can include a contact switch (e.g., one or more trigger arms 502) that triggers a signal responsive to contact with the mechanical structures and is configured similarly as described herein with reference to FIG. 5B; and/or the flags can include a non-contact switch target 602 configured similarly as described herein with reference to FIG. 6A and the vehicle can include a non-contact switch 606 that triggers a signal responsive to proximity or alignment with the non-contact switch target with the non-contact switch 606.

In method 800 illustrated in FIG. 8, the vehicle's ID tag reader identifies each ID tag and sends a signal to the vehicle control computer, e.g., as the vehicle passes each of the flags; and the vehicle's contact or non-contact switch sensor sends a signal to the vehicle control computer upon sensing the corresponding flag's switch sensor target, e.g., contact or non-contact switch target (operation 806). Such respective signals can be generated and provided to the vehicle control computer in a manner similar to that described herein with reference to FIGS. 5A-5B and 6A-6B. In method 800 illustrated in FIG. 8, the vehicle control computer uses a look-up table of ID tag numbers to determine the approximate vehicle position on the solar field and uses a look-up table of the accurate location of the switch sensor target associated with each ID tag to calculate the vehicle's position accurately (operation 808).

Figure 9:
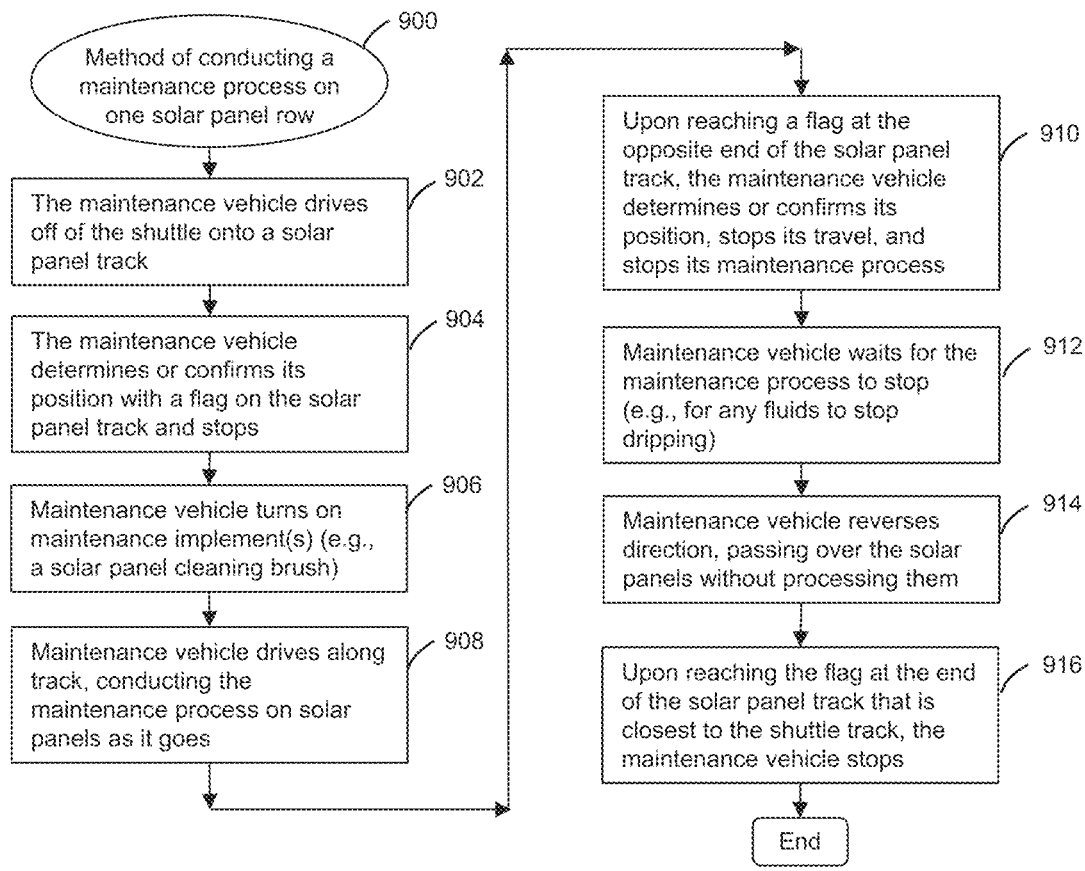
FIG. 9 illustrates a flow of operations in an exemplary method of conducting a maintenance process on one solar panel row, according to some examples.

FIG. 9 illustrates a flow of operations in an exemplary method of conducting a maintenance process on one solar panel row. For example, method 900 illustrated in FIG. 9 includes a flow of operations in an exemplary method for conducting a maintenance process as a maintenance vehicle moves away from a shuttle track and then returns to the shuttle track without conducting a maintenance process. In method 900 illustrated in FIG. 9, the maintenance vehicle drives off of the shuttle onto a solar panel track (operation 902). For example, at a first end of one of the rows described herein with reference to FIG. 1, shuttle vehicle 110 can transport maintenance vehicle 106 to that row and the maintenance vehicle can drive off of the shuttle vehicle and enter that row. In method 900 illustrated in FIG. 9, the maintenance vehicle determines or confirms its position with a flag on the solar panel track and stops (operation 904). For example, the maintenance vehicle 106 described herein with reference to FIG. 1 can determine its location using method 700 such as described herein with reference to FIG. 7, can determine its location using method 800 such as described herein with reference to FIG. 8, or otherwise can suitably determine its location, such as using a flag on the solar panel track. In operation 904, stopping can be optional.

In method 900 illustrated in FIG. 9, the maintenance vehicle turns on its maintenance implement(s) (e.g., a solar panel cleaning brush) (operation 906). For example, vehicle 106 described herein with reference to FIG. 1 can turn on its maintenance implement(s) after driving off of the shuttle and onto the track, or can turn on its maintenance implement(s) at another suitable time. In one nonlimiting example, the maintenance vehicle can include one or more maintenance implements configured similarly to those described in U.S. Patent Publication No. 2015/0144156 to French et al., the entire contents of which are incorporated by reference herein. In another nonlimiting example, the maintenance vehicle can include one or more maintenance implements configured similarly to those described in U.S. Patent Publication No. 2017/0163209 to Bailey et al., the entire contents of which are incorporated by reference herein.

In method 900 illustrated in FIG. 9, the maintenance vehicle drives along the track, conducting the maintenance process on the solar panels as it goes (operation 908). For example, maintenance implement(s) of vehicle 106 described herein with reference to FIG. 1 sequentially can conduct a maintenance process on the solar panels 102 of a row of solar panels as it drives along the track of that row. It should be appreciated that the maintenance process additionally or alternatively can be conducted on other portions of the array, such as on the track 104, support structures of the solar panels 102, or on regions of the ground between tracks 104. In method 900 illustrated in FIG. 9, upon reaching a flag at the opposite (second) end of the solar panel track, the maintenance vehicle determines or confirms its position (such as using method 700 such as described herein with reference to FIG. 7, using method 800 such as described herein with reference to FIG. 8, or otherwise can suitably determine its location, such as using a flag on the solar panel track), stops its travel, and stops its maintenance process (operation 910). In operation 910, stopping the vehicle travel and/or stopping the vehicle maintenance process each independently can be optional. In method 900 illustrated in FIG. 9, the maintenance vehicle waits for the maintenance process to stop (e.g., for any fluids to stop dripping) (operation 912). In method 900 illustrated in FIG. 9, the maintenance vehicle reverses direction, passing over the solar panels without processing them (operation 914). In method 900 illustrated in FIG. 9, upon reaching the flag at the first end of the solar panel track that is closest to the shuttle track, the maintenance vehicle stops (operation 916).

It should be appreciated that certain operations described herein with reference to FIG. 9 can be optional and/or can be performed in a different order. For example, operations 912, 914, and/or 916 can be optional. Illustratively, an exemplary modified process to that described herein with reference to FIG. 9 can include moving the vehicle to the far end of the solar panel track and then conducting the maintenance process as the maintenance vehicle returns to the shuttle track. Another exemplary modified process to that described herein with reference to FIG. 9 can include conducting a maintenance process both while the maintenance vehicle moves away from the shuttle track and when the maintenance vehicle moves back toward the shuttle track, for example, processing the panels twice for potentially greater effect. In a further modification of this, one area of the panels can be processed on the way out and a different area of the panels can be processed on the way back. In the same or a different modification, a process can be performed in one direction and then a diagnostic method can be performed in the other direction, or two different processes can be performed, one in each direction.

Figure 10A:
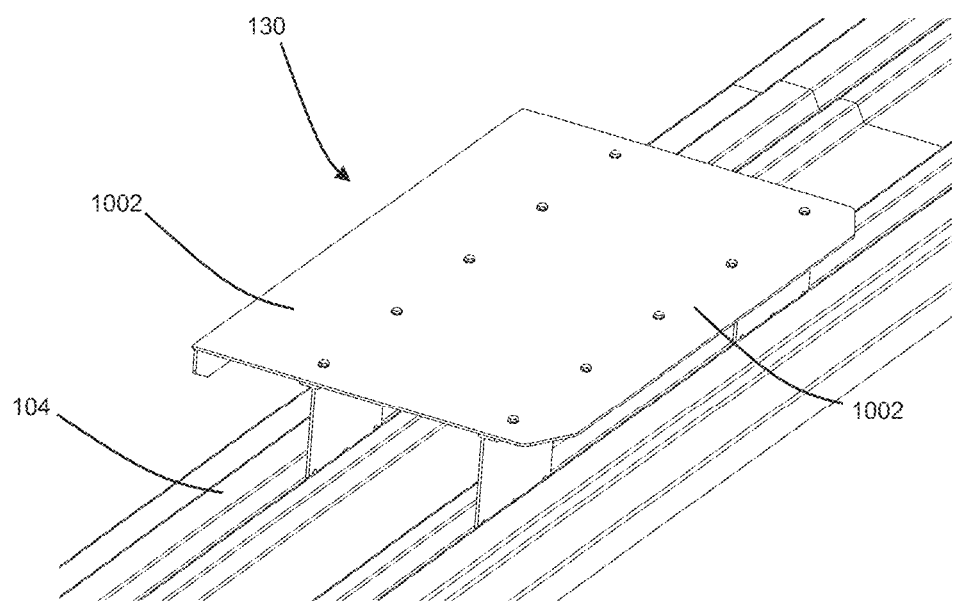
FIGS. 10A and 10B schematically illustrate an exemplary configuration of an optional vehicle lock, respectively with and without a maintenance vehicle positioned over and about it, according to some examples.
Figure 10B:
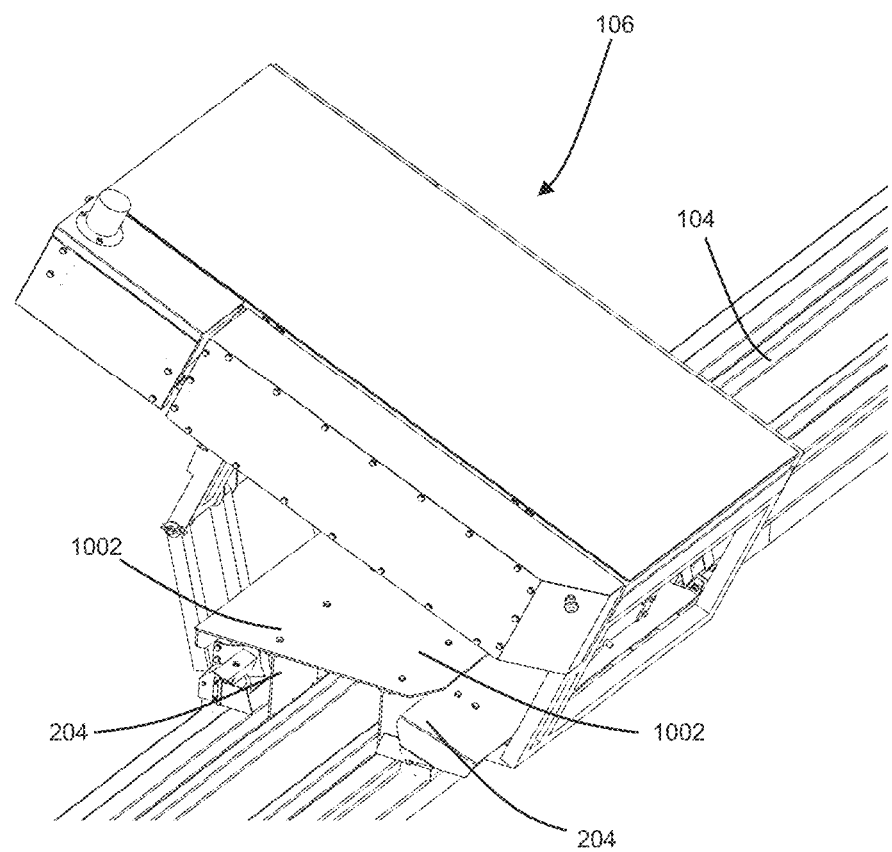
Figure 34A:
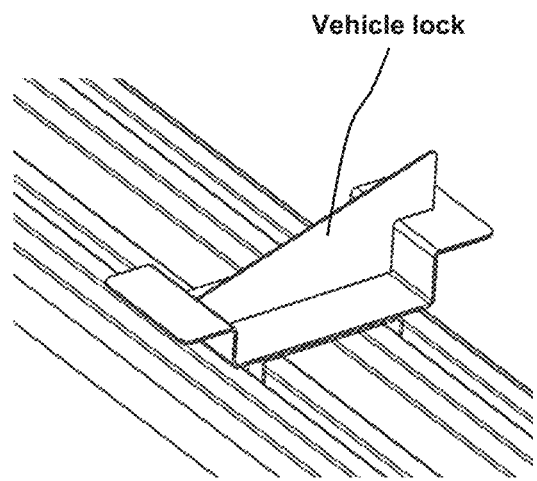
Figure 34B:
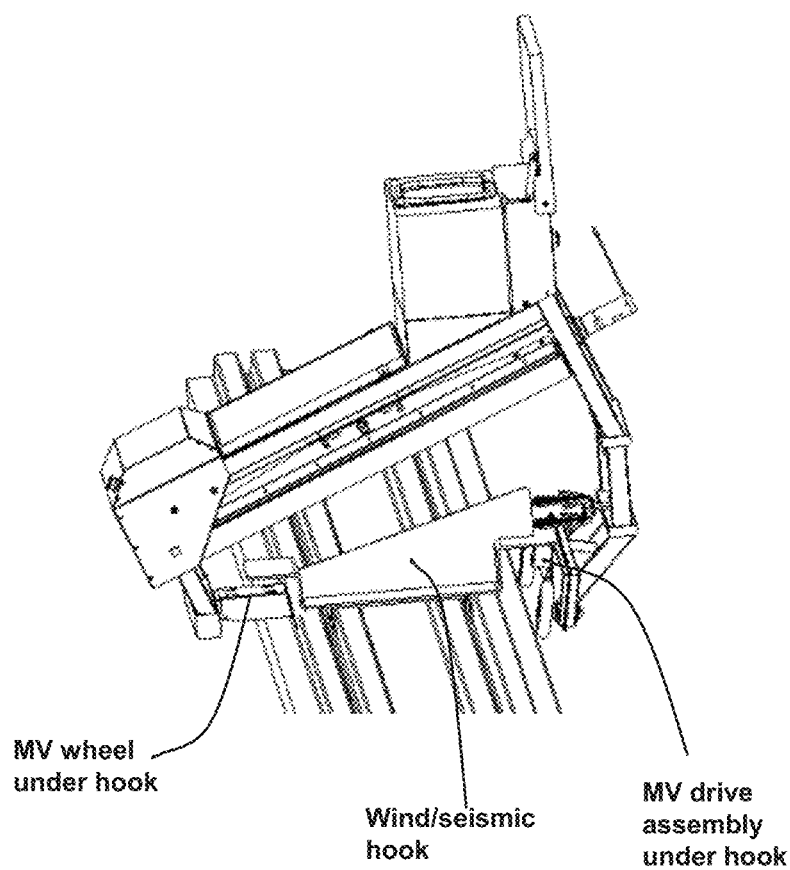
Figure 34C:
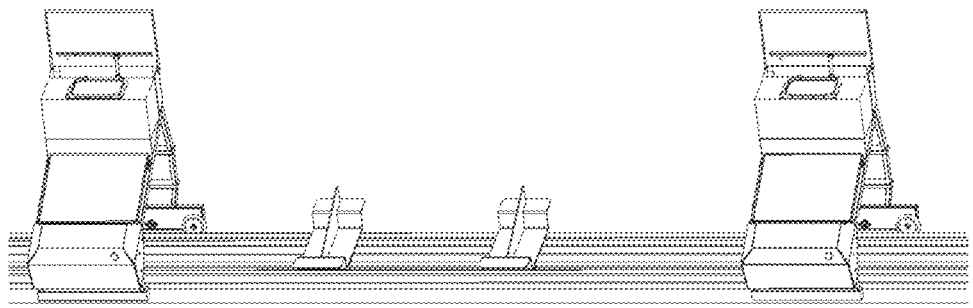

FIGS. 10A and 10B schematically illustrate an exemplary configuration of an optional vehicle lock 130, respectively with and without a maintenance vehicle positioned over and about it. As schematically illustrated in FIG. 10A, the vehicle lock 130 can be or include a metal part mounted on a suitable location of the home track 128, or of track 104, e.g., at or near an opposite end of the track from shuttle track 108, or at any other suitable location. The vehicle lock 130 can include any suitable number of overhangs 1002, e.g., two overhangs, that respectively protrude above where the vehicle's wheels travel. The vehicle lock 130 also optionally can include a flag (e.g., a flag configured similarly to flag 126, for example such as described herein with reference to FIG. 5A-5B or 6A-6B), configured such that the vehicle can confirm that the vehicle is positioned at the vehicle lock. In one exemplary configuration, when the maintenance vehicle 106 drives over the vehicle lock 130, the vehicle can stop with the wheel sets 204 (which can be configured such as described herein with reference to FIGS. 2A-2B and 3A-3B) positioned under the overhangs 1002. In such a position, a strong wind substantially cannot push the vehicle 106 over and off the track because the wheel sets 204 can hit the underside of the overhangs 1002 responsive to force from the wind. Optionally, a similarly configured vehicle lock 130 can be provided so as to secure shuttle vehicle 110 at a suitable location of shuttle track 108 or the home track 128. Another exemplary configuration is illustrated in FIGS. 34A-34C. For example, FIG. 34A schematically illustrates an exemplary wind/seismic hook coupled to a track, such as a home track, shuttle track, or track configured to support the maintenance vehicle. FIG. 34B schematically illustrates an exemplary maintenance vehicle (MV) over the wind/seismic hook. In this exemplary configuration, a MV wheel is under the hook, e.g., a first overhanging portion of the hook, and the MV drive assembly is under the hook, e.g., a second overhanging portion of the hook. The MV can park over a wind/seismic hook, such as illustrated in FIG. 34A, that will physically prevent or inhibit the MV from tipping over in the event of a seismic or high wind event. Elements of the wind/seismic hook can contact MV wheels or drive assembly to prevent or inhibit tipping. FIG. 34C schematically illustrates an MV parking area (such as a home track or a region of the track configured to support the maintenance vehicles). For example, the project site can include one or more sections of track that are dedicated parking areas for MVs. The programming of each MV can enable the coordinated activity of multiple MV units on the project site. Communication between MVs, row-to-row vehicles (shuttles), and water refill controllers can be wireless. Vehicles in the parking area may be all the same or they may be differentiated by function.

Figure 11A:
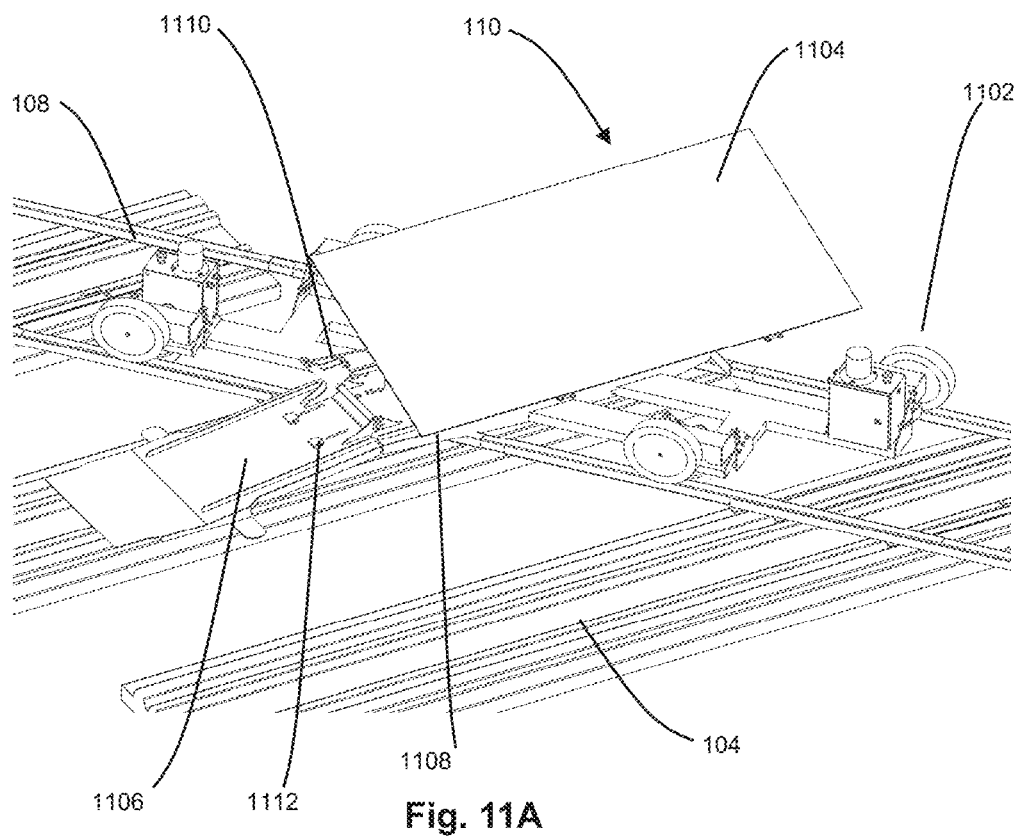
FIGS. 11A and 11B schematically illustrate perspective views of an exemplary configuration of a shuttle vehicle, according to some examples.
Figure 11B:
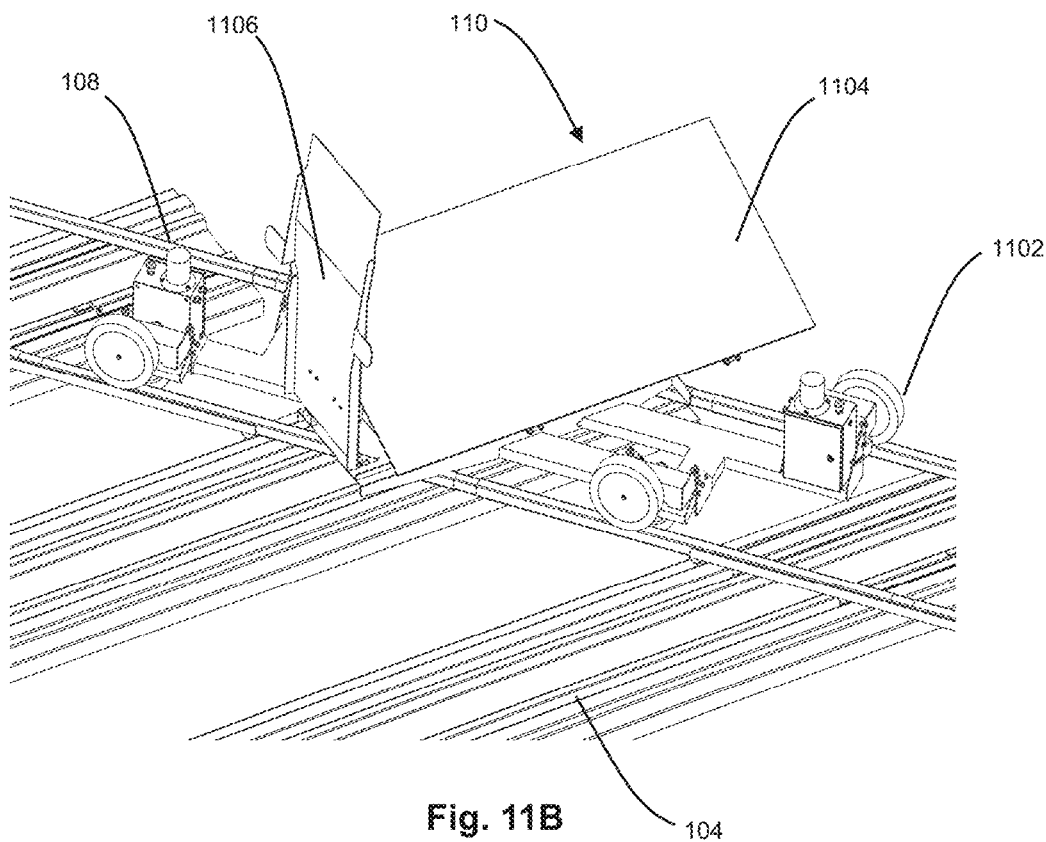

FIGS. 11A and 11B schematically illustrate perspective views of an exemplary configuration of shuttle vehicle 110, which also can be referred to as a shuttle. In FIGS. 11A-11B, the shuttle is schematically illustrated on a portion of the shuttle track 108 that is positioned at the intersection of a solar panel track 104. The shuttle vehicle 110 can include any suitable number of wheels, e.g., two sets of wheels 1102, with one or both sets driven by electric motors. Shuttle vehicle 110 can alternatively be driven by a combustion engine, pulled by a cable, or can be pushed or pulled manually, or moved by other suitable mechanism for propulsion. In the nonlimiting configuration illustrated in FIGS. 11A-11B, the shuttle 110 can be powered by a solar panel 1104, and the energy can be stored in a battery (not shown). A controller can be located on board as well for control and communication with the gateway 112, e.g., in a manner such as described with reference to FIG. 13. The shuttle 110 can include a ramp 1106 that is configured so as to be deployed onto the solar panel track 104 and retracted. In FIG. 11A, the ramp 1106 is illustrated as being deployed. In FIG. 11B, the ramp 1106 is illustrated as being retracted for movement of the shuttle 110 from row to row. In some configurations, this ramp 1106 can enable the maintenance vehicle 106 to drive from the solar panel track 104 up the ramp 1106 and onto a platform or a suitable number of platforms, e.g., a pair of platforms 1108, where the maintenance vehicle can park. In some configurations, responsive to the maintenance vehicle being parked on the platforms 1108, the ramp 1106 can be retracted, and the shuttle 110 can move the maintenance vehicle from one solar panel track 104 to another. In some configurations, linear actuator 1110 can be used to deploy or retract the ramp 1106, but it should be appreciated that other kinds of actuators, such as rotary motors, or motors that act as a winch, can be used to move the ramp. The ramp 1106 optionally can include one or more inclinometers 1112 that sense the angle of the ramp and provide corresponding signals to the control system of shuttle 110. The control system can use such signals to determine and control the rotational or angular position of the ramp. The shuttle vehicle 110 optionally also can include a flag on it so that when the maintenance vehicle drives onto it, the maintenance vehicle senses the flag and stops accordingly. The flag of shuttle vehicle 110 can be configured similarly as flag 126, e.g., for example such as described herein with reference to FIG. 5A-5B or 6A-6B.

FIG. 11C schematically illustrates a detailed perspective view of a portion of an exemplary shuttle vehicle 110 that includes an exemplary ramp 1106. In the nonlimiting configuration illustrated in FIG. 11C, each side of the ramp 1106 includes a wheel path 1114, a fence 1116, a splay 1118, and a paddle 1120. In the illustrated configuration, when the ramp 1106 is deployed, the two splays 1118 and paddles 1120 can fall on the outside of the outside surfaces 304 of the two rails 216 and ensure alignment between the rails 216 and the ramp 1106. The main structure of the ramp 1106 can rest on the top surfaces 302 of the two rails 216. When the maintenance vehicle 106 drives up the ramp, the guide wheels 308 of the maintenance vehicle can transition from contacting the outside surfaces 302 of the rails 216 to contacting the splays 1118 of ramp 1106. The drive wheels 306 drive up the wheel paths 1114 on the ramp. The angle of the ramp can be such that the guide wheels of vehicle 106 rise above the level of the paddles 1120 and do not contact the paddles. When the maintenance vehicle 106 wheels are sufficiently far along the ramp, further alignment of the maintenance vehicle and the ramp can be accomplished, for example, by the drive wheels 306 of the maintenance vehicle being guided by the fences 1116 rather than by the guide wheels of the maintenance vehicle contacting the splays 1118 on the sides of the ramp 1106. Optionally, ramp 1106 includes a section where these two guide structures overlap.

Figure 35A:
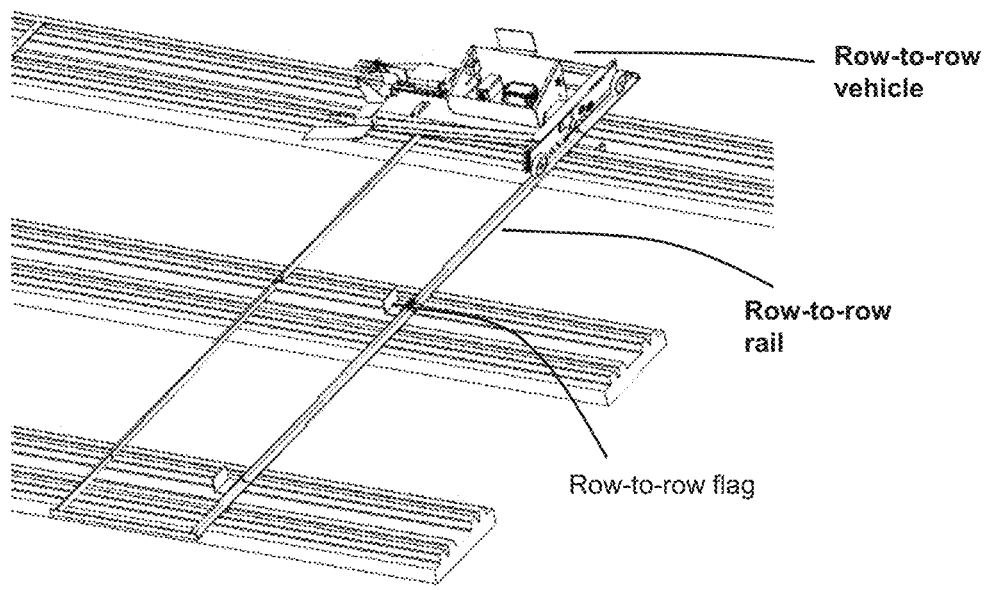
Figure 35B:
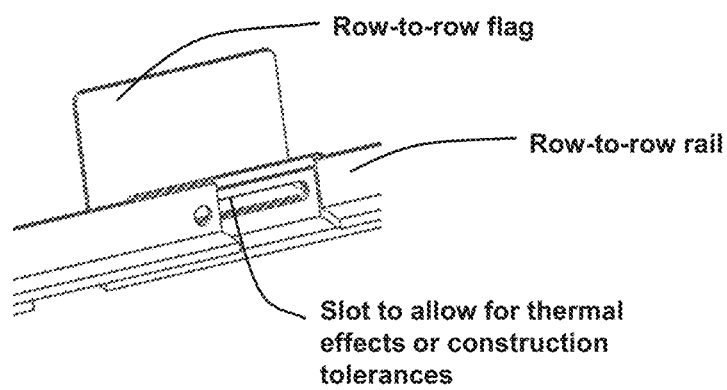

Other exemplary configurations are shown in FIGS. 35A-35B, which schematically illustrate an exemplary configuration of row-to-row rails, a row-to-row vehicle (shuttle), and row-to-row flags. Row-to-row (R2R) rails can travel between tracks to provide a path for the R2R vehicle. The R2R vehicle can transport MV units between rows of track. R2R flags can provide position information to the R2R vehicle. The R2R vehicle can have batteries that are charged by an on-board solar panel. As shown in greater detail in FIG. 35B, the R2R rail can include a R2R flag and a slot to allow for thermal effects or construction tolerances. For example, with regards to R2R tolerances, R2R rails can include slotted connections and allow for thermal expansion, contraction, or construction tolerances of the R2R rail and other system components.

Figure 36A:
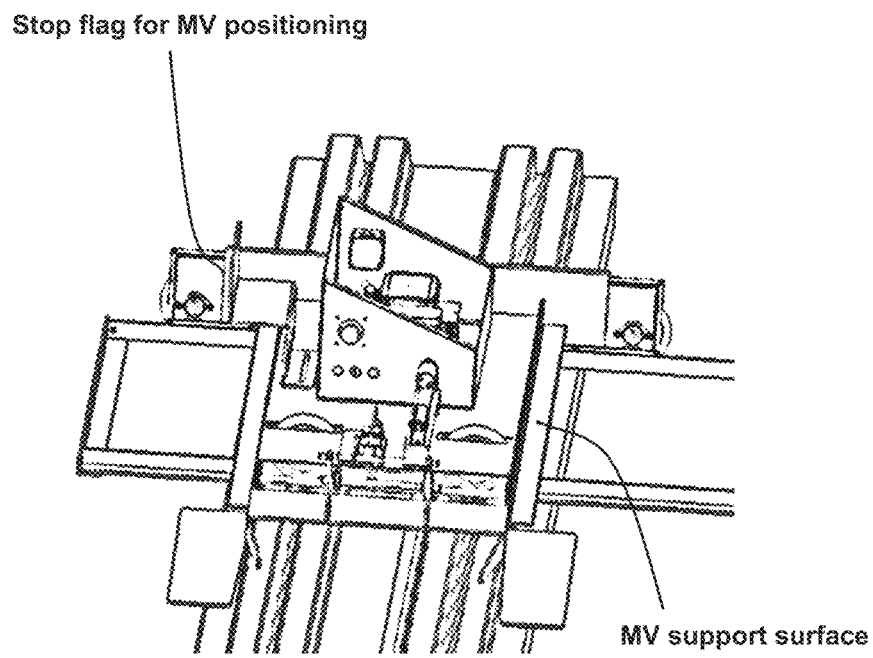
Figure 36B:
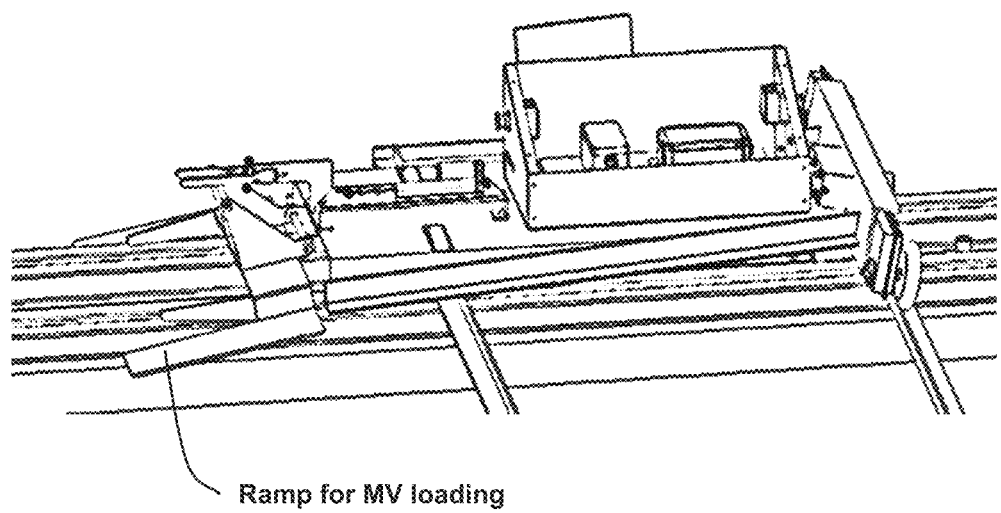
Figure 37A:
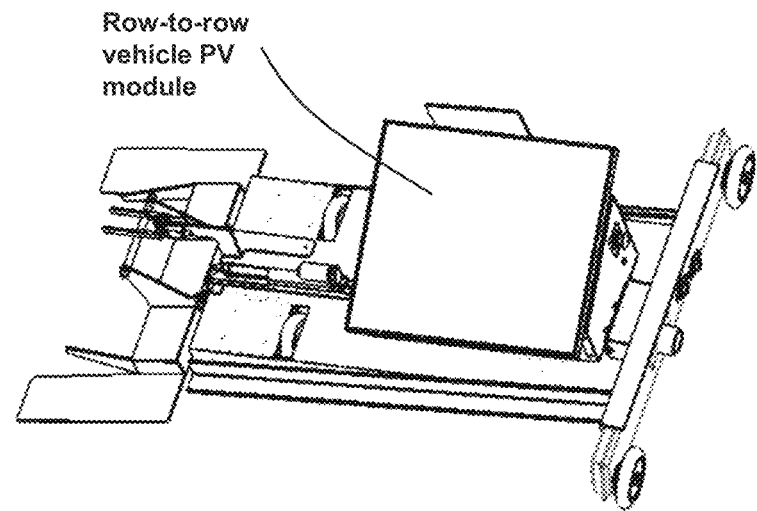
Figure 37B:
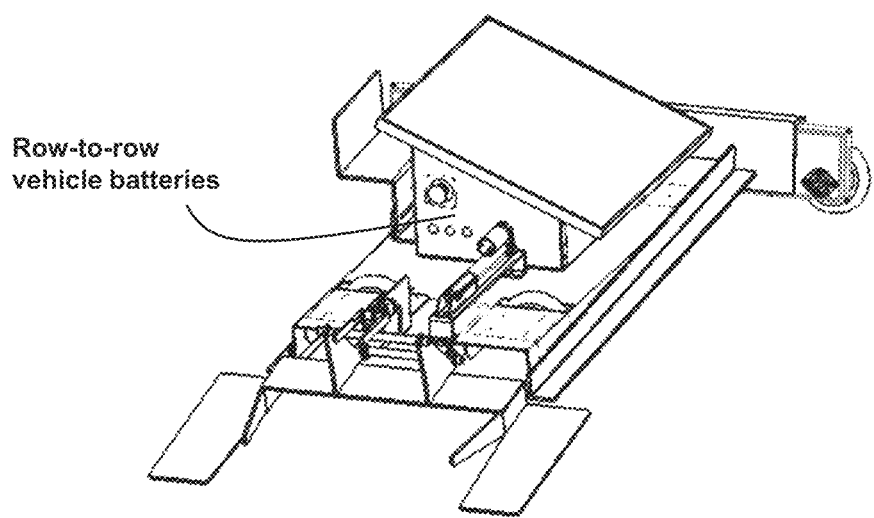
Figure 37C:
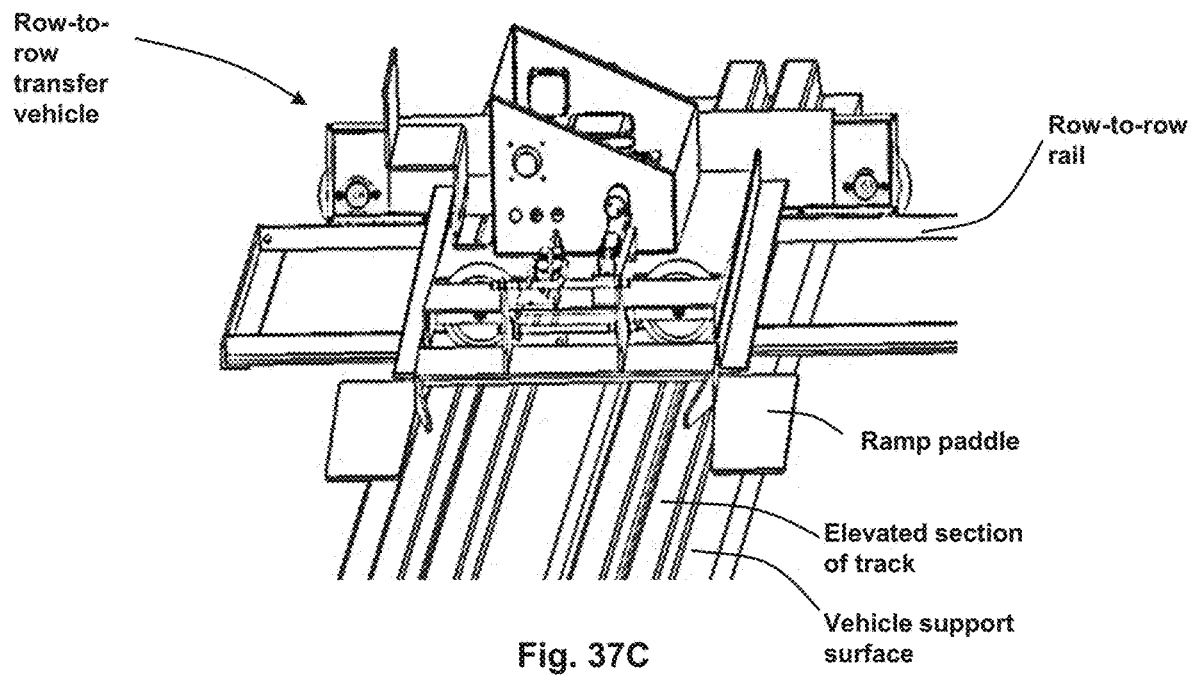
Figures 40A, 40B:
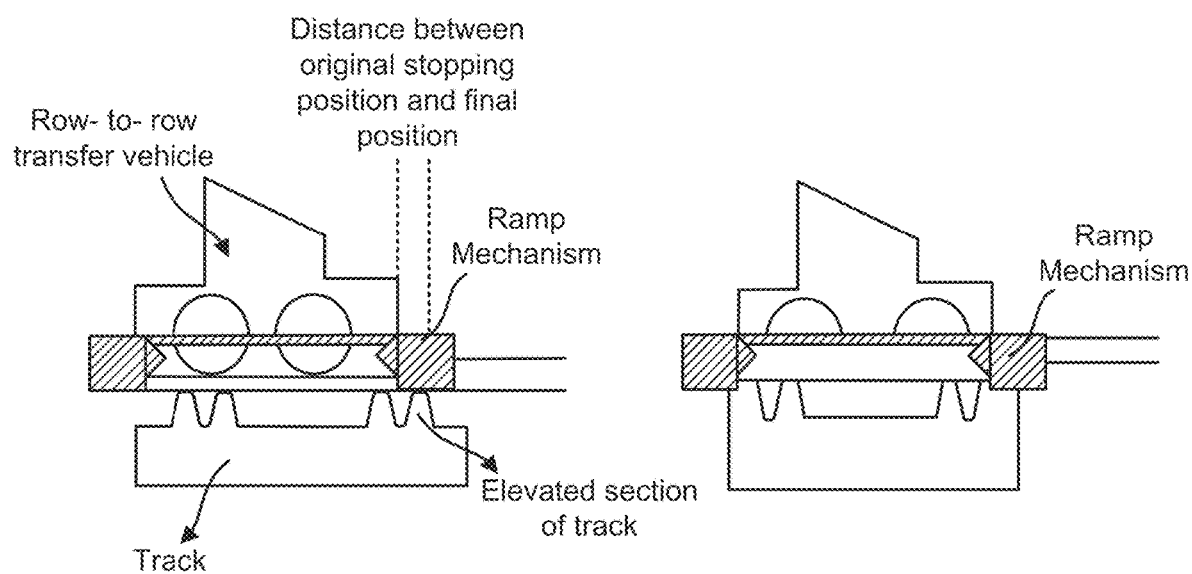

Other exemplary configurations are shown in FIGS. 36A-36B, 37A-37C, and 40A-40B. FIGS. 36A-36B schematically illustrate another row-to-row vehicle that includes an MV support surface or surfaces, a stop flag for MV positioning, a ramp or ramps for MV loading, and a hook for MV stabilization. As schematically illustrated in FIG. 37A, the R2R vehicle can be equipped with a photovoltaic (PV) module to charge its batteries. For example, as schematically illustrated in FIG. 37B, the batteries that provide power to the R2R vehicle may be located in the enclosure beneath the PV module. As schematically illustrated in FIG. 37C, a R2R transfer vehicle (shuttle) can be located on a R2R rail on an elevated section of track over a vehicle support surface, and can include a ramp paddle. In this configuration of MV R2R transfer, including row finding, the R2R vehicle is positioned to receive an MV when the ramp paddles are resting on or near the vehicle support surfaces of the track. As schematically illustrated in FIGS. 40A-40B, a low-tolerance mechanism for positioning an R2R transfer vehicle on a track can include an elevated section of the track and a ramp mechanism. An exemplary distance between the R2R transfer vehicle's stopping position and final position is schematically shown in FIG. 40A. According to one configuration, there is a precise position of the R2R vehicle (relative to the R2R rail) where the ramp mechanism will be able to drop down onto the track vehicle support surfaces properly. According some configurations, proper positioning of the R2R vehicle for ramp deployment can be accomplished by a low tolerance mechanism/process. For example, the R2R vehicle can stop over the track in a position that is shifted to one side. This is not a precise position. The ramp can be deployed and drop down onto an elevated section of the track. The R2R vehicle moves to the side until the ramp mechanism drops down onto the vehicle support surfaces due to its own weight. For example, this dropping action activates a switch that stops the movement of the R2R vehicle. The vehicle is now in place for MV loading/unloading.

Figure 38:
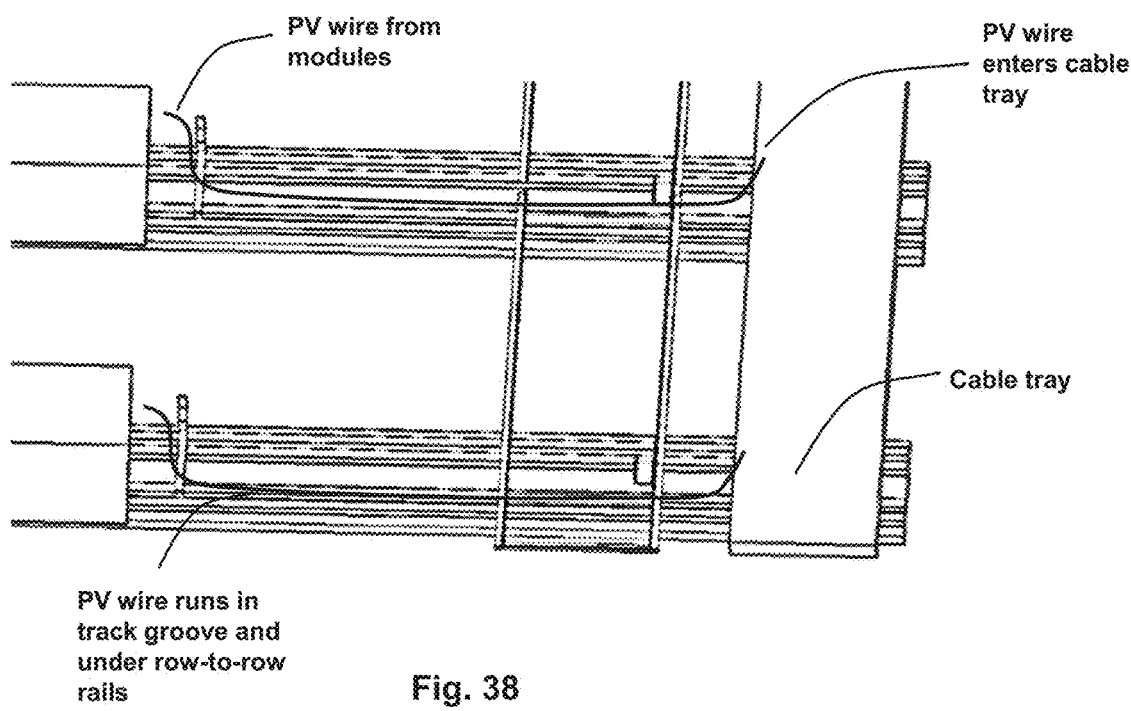

Another exemplary configuration is schematically illustrated in FIG. 38, which illustrates a nonlimiting example of wire management. The system can include PV wire from modules, and the PV wire can run in track groove(s) and under row-to-row rails. The PV wire can enter a cable tray. For example, the system can include cable trays for wire management. Between modules and the cable tray, wire can run in the track groove and under row-to-row rails. For example, the cable tray can include a cover to protect wires and cables.

Figure 12A:
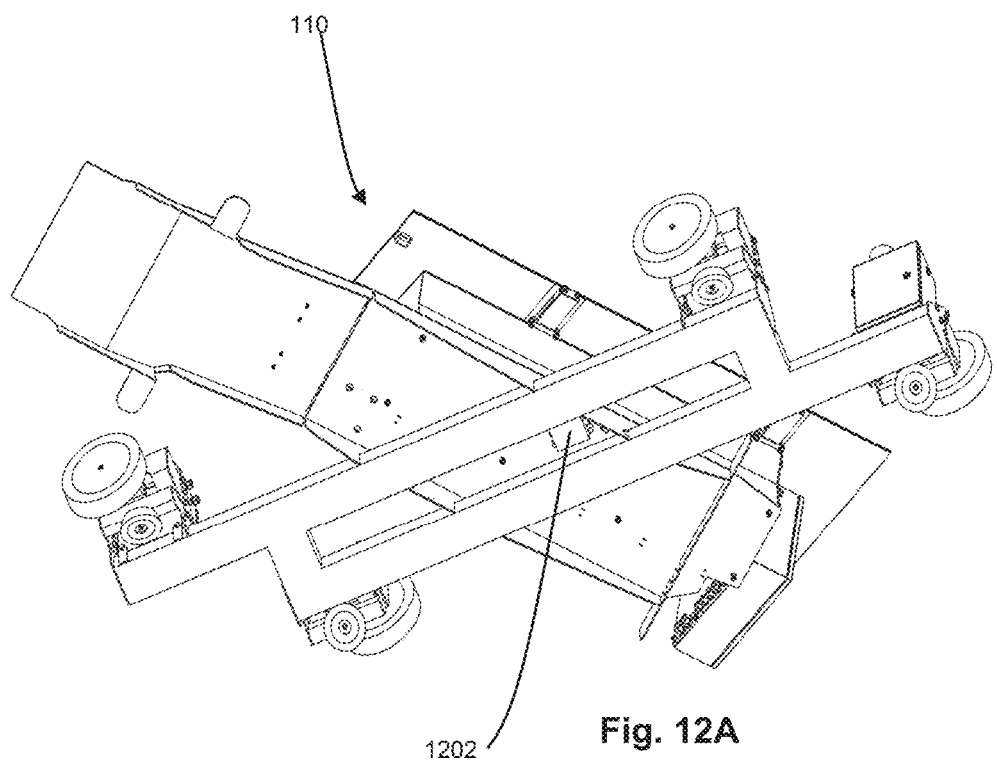
FIG. 12A schematically illustrates a perspective view of an exemplary configuration of the underside of a shuttle vehicle, according to some examples.
Figure 12B:
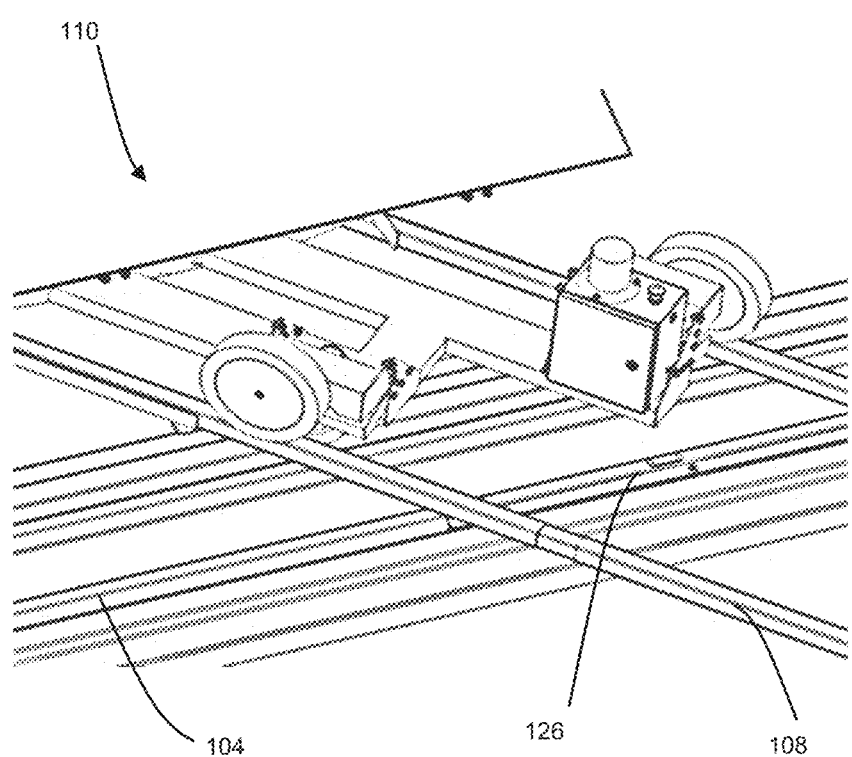
FIG. 12B schematically illustrates an exemplary flag at the intersection of a shuttle track and a solar panel track, according to some examples.

FIG. 12A schematically illustrates a perspective view of an exemplary configuration of the underside of the shuttle vehicle 110. A flag sensor 1202 can be located on the bottom of the vehicle to sense flags located on the shuttle track. The flag sensor 1202 can be or include a contact switch configured to generate a signal based on contact with a mechanical flag 126 or a non-contact switch configured to generate a signal based on proximity or alignment with a flag 126 including a non-contact switch target, e.g., such as described herein with reference to FIGS. 5A-5B and 6A-6B, and/or the flag sensor can include an ID tag reader configured to read an ID tag of a flag 126, e.g., such as described herein with reference to FIGS. 6A-6B. FIG. 12B schematically illustrates an exemplary flag 126 at the intersection of the shuttle track 108 and a solar panel track 104, responsive to which a sensor of shuttle vehicle 110 can generate a signal based on which the location of the shuttle vehicle can be determined in a manner similar to that described herein with reference to FIG. 7 or 8.

In some configurations, the shuttle vehicle 108 and interface between the shuttle 108 and maintenance vehicle 106 are configured so as to provide sufficient mechanical constraints to provide a substantially structured environment for robot operation. For example, by using mechanical constraints (e.g., track rails and features of ramp 1106 such as described herein with reference to FIGS. 11A-11C) for much of the navigational control, the vehicle control systems and sensing systems can be relatively simple. As one example, track rails can constrain the distance between the vehicle and the solar panels in the vertical direction and in the direction transverse to the direction of travel. The rails can reduce or eliminate the need for independently steering the vehicle. Simplifying the shuttle and maintenance vehicles can assist in keeping costs down, increasing reliability in the face of randomness inherent to an outdoor environment, and/or easing maintenance in the field.

Figure 13:
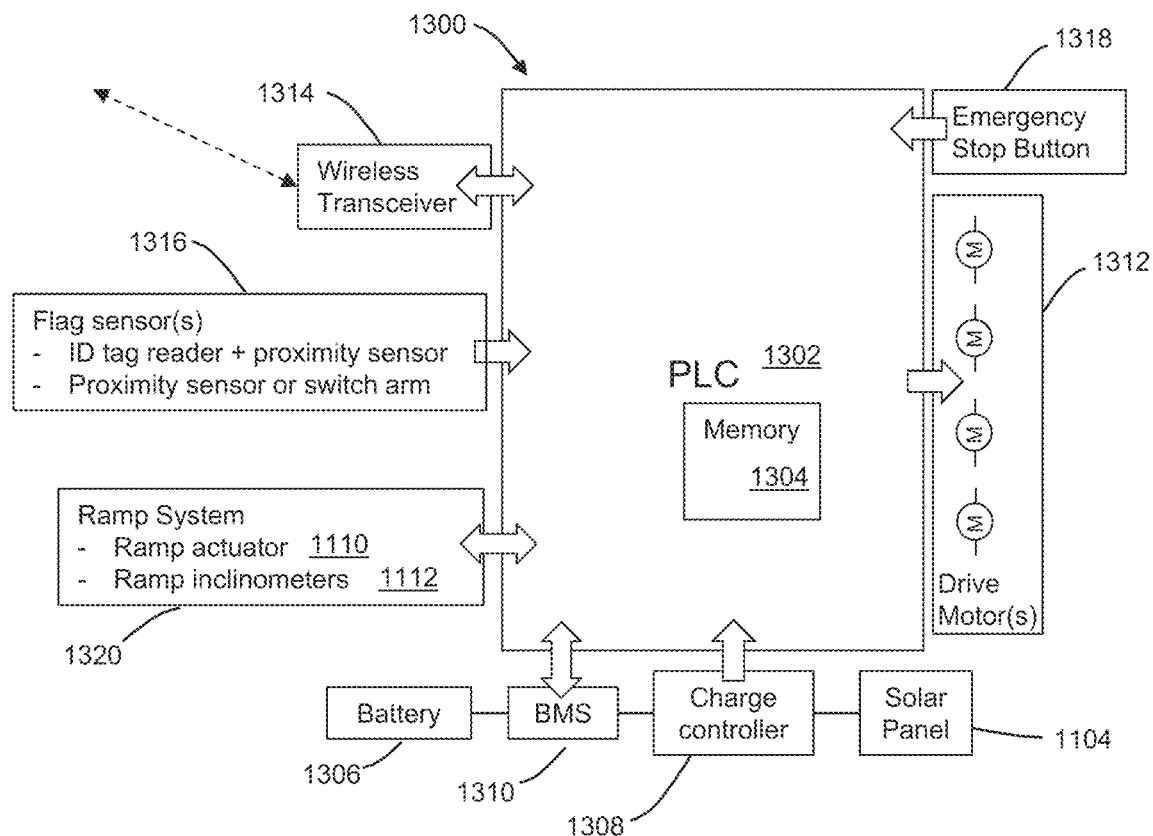
FIG. 13 schematically illustrates an exemplary electronics system of a shuttle vehicle, according to some examples.

FIG. 13 schematically illustrates an exemplary electronics system 1300 of the shuttle vehicle 110. System 1300 can include PLC 1302 as the main controller, which can include memory 1304 to store data. The shuttle 110 and electronic components thereof can be powered by a solar panel 1104, and energy can be stored in a battery 1306. System 1300 can include a charge controller 1308 configured so as to keep the battery charged. System 1300 can include a battery management system (BMS) 1310 configured so as to provide further control of the battery and provides data to the PLC 1302, such as battery state of charge. The PLC 1302 can be configured so as to control power to the drive motor(s) 1312 that drive the wheel(s) of shuttle 110. System 1300 can include wireless transceiver 1314 configured so as to allow commands to be sent to the shuttle's PLC 1302 and data to be transmitted from PLC 1302. System 1300 can include flag sensors 1316 configured so as to generate signals responsive to sensing of flags that the shuttle 110 encounters, and these flag sensors can be contact or non-contact proximity sensors, RID tag readers plus proximity sensors, or another flag system sensor. System 1300 can include ramp system 1320 which can include a ramp actuator 1110 configured so as to deploy and retract the shuttle's ramp 1106, and one or more inclinometers 1112 or other position sensors configured so as to generate signals based on an angle or position of ramp 1106. System 1300 can include an emergency stop button 1318 configured so as to enable a person to manually stop the shuttle's movements in a similar manner to the emergency stop button described herein for maintenance vehicle 110.

Figure 14:
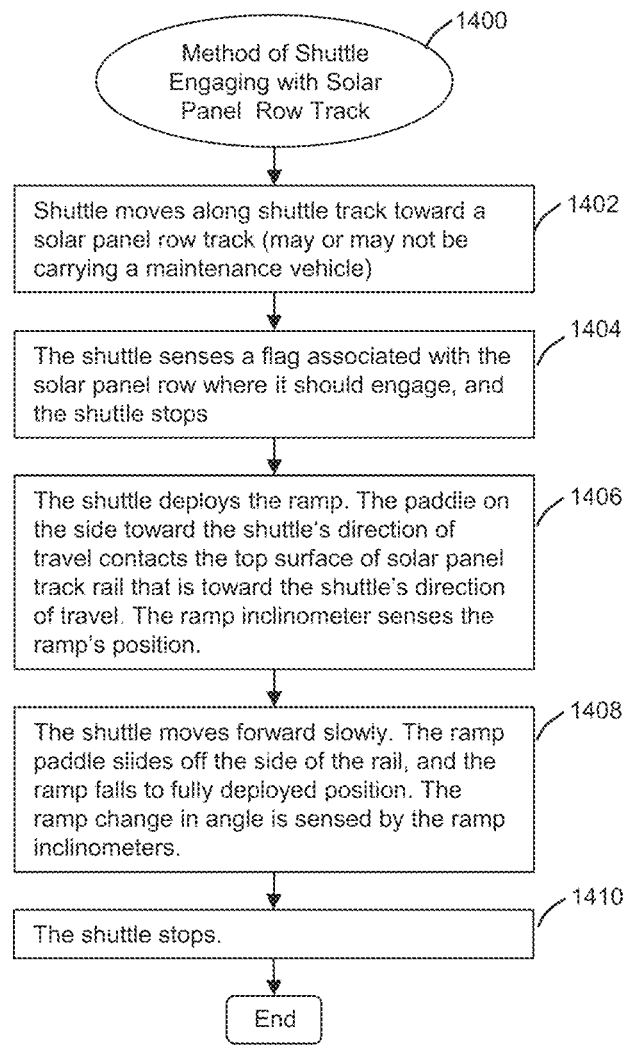
FIG. 14 illustrates a flow of operations in an exemplary method of a shuttle vehicle engaging with a solar panel row track, according to some examples.

FIG. 14 illustrates a flow of operations in an exemplary method of engaging a shuttle vehicle (e.g., the shuttle vehicle 110 in FIG. 7A-7C) with a solar panel row track 104. In method 1400 illustrated in FIG. 14, the shuttle can either be carrying or not carrying a maintenance vehicle 106 such as in FIG. 2A or 2B. In method 1400 illustrated in FIG. 14, the shuttle moves along the shuttle track toward the solar panel row track (operation 1402). In method 1400 illustrated in FIG. 14, responsive to the shuttle sensing a flag associated with the solar panel row track, the shuttle stops (operation 1404) and then deploys the ramp of the shuttle (1406). For example, the flag can be positioned such that when the ramp deploys, the paddle at the side of the ramp in the direction of the shuttle's travel contacts the top surface of the solar panel track rail, e.g., of the rail that is toward the shuttle's direction of travel. The inclinometers on the ramp can sense the angle of the ramp and, based on signals from the inclinometers, the vehicle can determine that the ramp is not in a fully deployed position. In method 1400 illustrated in FIG. 14, the shuttle vehicle slowly moves forward (operation 1408) until the paddle resting on the top surface of the rail falls off the side of the rail. In method 1400 illustrated in FIG. 14, the inclinometers sense a change in ramp angle, based on which the vehicle can determine that the ramp is now in its fully deployed position, and the shuttle vehicle stops (operation 1410).

Figure 15:
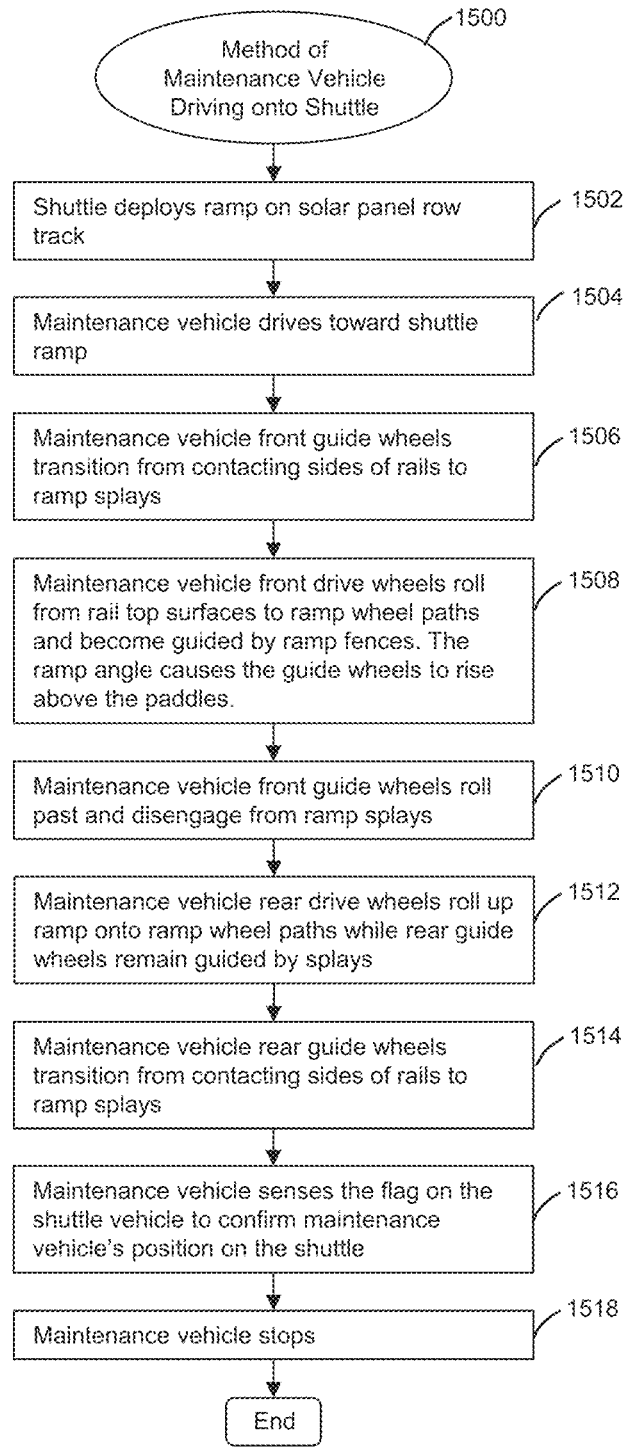
FIG. 15 illustrates a flow of operations in an exemplary method of a maintenance vehicle driving from a solar panel row track onto a shuttle, according to some examples.

FIG. 15 illustrates a flow of operations in an exemplary method of the maintenance vehicle 106 driving from a solar panel row track 104 onto the shuttle 110. In method 1500 illustrated in FIG. 15, the shuttle deploys its ramp 1106 on a solar panel row track (operation 1502); one exemplary way in which the shuttle can deploy the ramp is using operations such as described herein with reference to FIG. 14. In method 1500 illustrated in FIG. 15, the maintenance vehicle drives toward the shuttle (operation 1504). In method 1500 illustrated in FIG. 15, the front guide wheels of the maintenance vehicle 308 transition from rolling along the outside surfaces 304 of the rails to rolling along the ramp splays 1118 (operation 1506). In method 1500 illustrated in FIG. 15, following the guide wheels, the maintenance vehicle front drive wheels transition from rolling on the top surfaces 302 of the rails to rolling on the wheel paths of the ramp 1114 (operation 1508). The ramp angles upward such that the guide wheels can be raised to a level that is higher than the paddles. Before the guide wheels roll past the end of the splays, the front drive wheels of the maintenance vehicle become in contact with, and guided by the ramp fences 1116 (operation 1508). In method 1500 illustrated in FIG. 15, the maintenance vehicle front guide wheels roll past and disengage from the ramp splays (operation 1510). In such a manner, navigational control of the maintenance vehicle can be transitioned from the splays and guide wheels to the ramp fences and drive wheels. The maintenance vehicle continues driving. In method 1500 illustrated in FIG. 15, the rear drive wheels transition from rolling on the rail top surfaces to rolling on the ramp wheel paths, while the rear guide wheels transition from rolling along the rail outside surfaces to rolling along the ramp splays (operation 1512). Before the rear guide wheels roll past the splays, the rear drive wheels become in contact and become guided by the fences, thus transitioning from contacting the sides of the rails to the ramp splays (operation 1514). The maintenance vehicle continues driving until the maintenance senses a flag on the shuttle to confirm the maintenance vehicle's position on the shuttle (operation 1516), at which point the maintenance vehicle stops (operation 1518).

Figure 16:
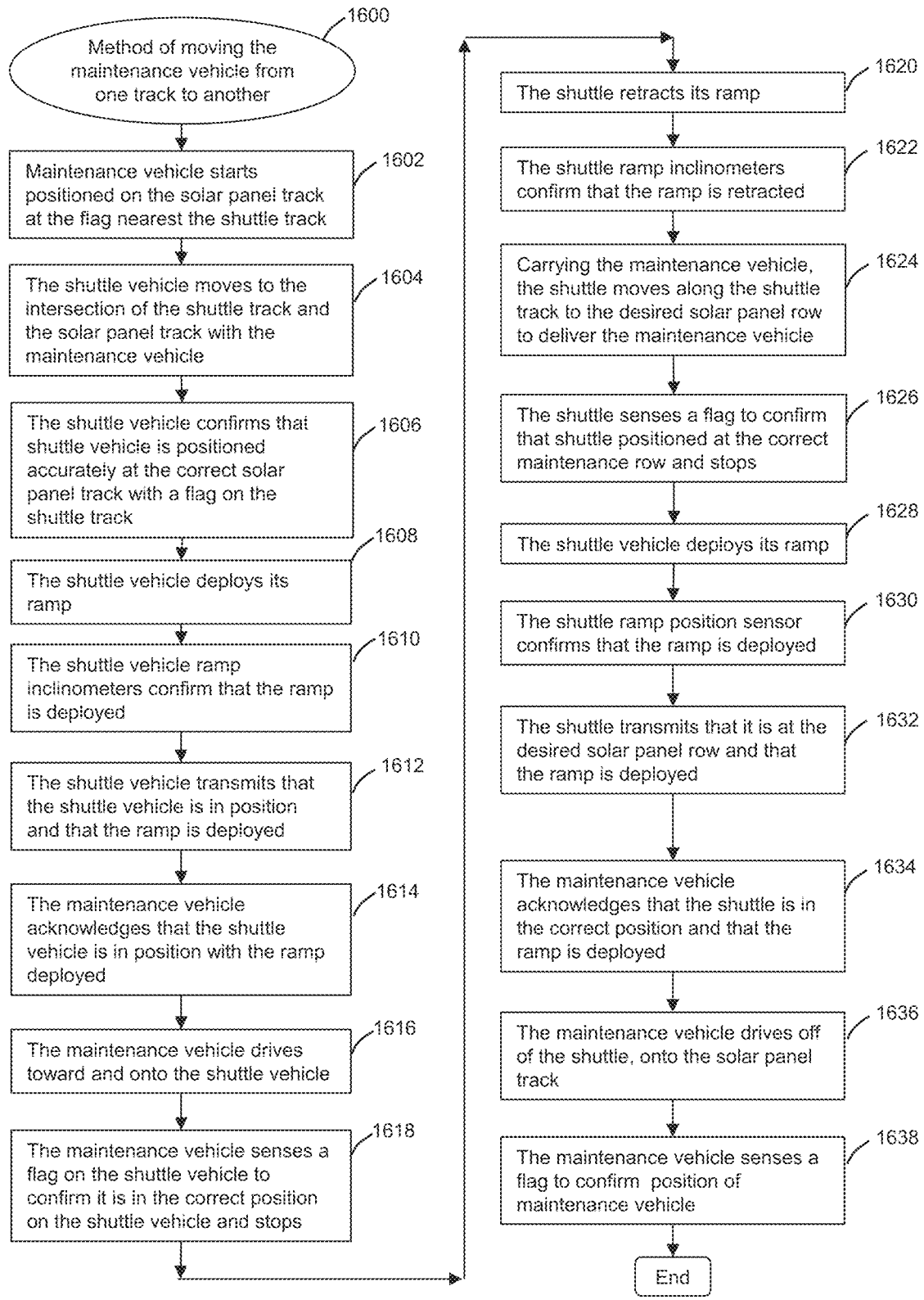
FIG. 16 illustrates a flow of operations in an exemplary method moving a maintenance vehicle from one solar panel row to another, using a shuttle vehicle, according to some examples.

FIG. 16 illustrates a flow of operations in an exemplary method moving the maintenance vehicle 106 from one solar panel row to another, using the shuttle vehicle 110. In method 1600 illustrated in FIG. 16, the maintenance vehicle can start positioned on the solar panel track 104 at the flag nearest the shuttle track 108 (operation 1602). In method 1600, the shuttle vehicle 110 moves to the intersection of the shuttle track 108 and the solar panel track 104 on which the maintenance vehicle 106 is located (operation 1604). In method 1600, the shuttle vehicle confirms that the shuttle vehicle is positioned accurately at the correct solar panel track with a flag on the shuttle track (operation 1606), e.g., in a manner such as described with reference to FIG. 14. The shuttle vehicle control system knows to move the shuttle to the track that the maintenance vehicle is on because the maintenance vehicle has identified its location view flags and communicated it to the gateway and to the shuttle vehicle. In method 1600, the shuttle vehicle deploys its ramp (operation 1608); as one option, the ramp can be deployed in a similar manner as described herein with reference to FIG. 14. In method 1600, the shuttle vehicle ramp inclinometers confirm that the ramp is deployed (operation 1610); as one option, the confirmation can be made in a similar manner as described herein with reference to FIG. 14. In method 1600 illustrated in FIG. 16, the shuttle vehicle control system transmits to the control systems of the maintenance vehicle and to the gateway that the shuttle vehicle is in position and that the ramp is deployed (operation 1612). In method 1600, the maintenance vehicle control system transmits an acknowledgement to the shuttle and gateway control systems that the shuttle vehicle is in position with the ramp deployed (operation 1614). This transmission and acknowledgement can reduce or avoid errors, for example such that the maintenance vehicle avoids attempting to drive onto the shuttle when the shuttle is not present or when the ramp is not deployed.

In method 1600, the maintenance vehicle drives forward and onto the shuttle vehicle (operation 1616); as one option, the maintenance vehicle 106 can be driven onto the shuttle vehicle 110 in a similar manner as described herein with reference to FIG. 15. In method 1600 illustrated in FIG. 16, the maintenance vehicle senses a flag on the shuttle to confirm that the maintenance vehicle is in the correct position on the shuttle vehicle and stops (operation 1618). In method 1600, the shuttle retracts its ramp (operation 1620). In method 1600, the shuttle ramp inclinometers confirm that the ramp is retracted (operation 1622). In method, carrying the maintenance vehicle, the shuttle moves along the shuttle track to the desired solar panel row to deliver the maintenance vehicle (operation 1624). This solar panel row can be specified as a part of an overall computer program that determines the schedule of the maintenance system and that is executed by the control systems of the gateway, vehicles, and fluid refill system. In method 1600, the shuttle senses a flag to confirm that the shuttle is positioned at the correct maintenance row (solar panel track) and stops (operation 1626). In method 1600, the shuttle vehicle deploys its ramp (operation 1628). In method 1600, the shuttle ramp position sensor confirms that the ramp is deployed (operation 1630). In method 1600, the shuttle control system transmits to the control systems of the maintenance vehicle and gateway that the shuttle is at the desired solar panel row and that the ramp is deployed (operation 1632). In method 1600, the maintenance vehicle control system transmits an acknowledgement to the control systems of the shuttle vehicle and gateway that the shuttle is in the correct position and that the ramp is deployed (operation 1634). In method 1600, the maintenance vehicle drives off of the shuttle, onto the solar panel track (operation 1636). In method 1600, the maintenance vehicle senses a flag to confirm position of the maintenance vehicle (operation 1638).

Figure 17:
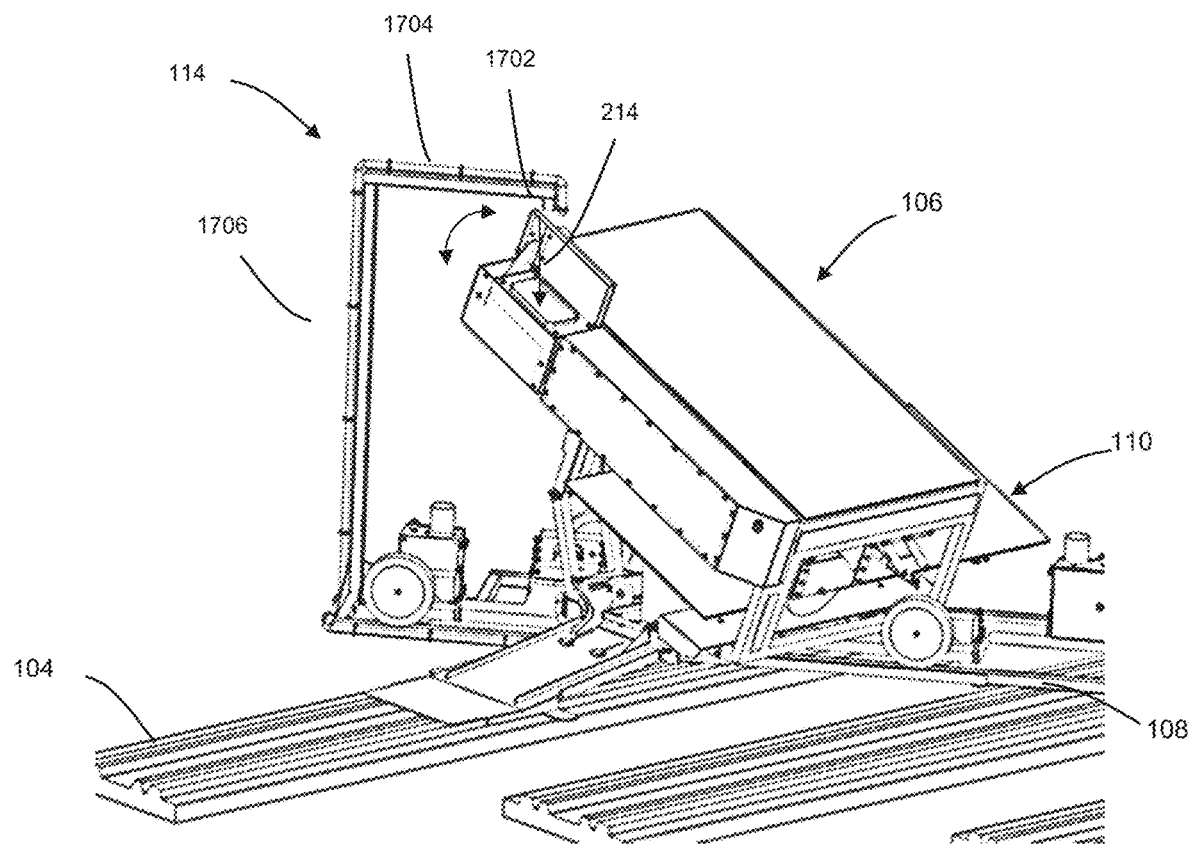
FIG. 17 schematically illustrates a perspective view of an exemplary shuttle vehicle carrying an exemplary maintenance vehicle, according to some examples.

FIG. 17 schematically illustrates a perspective view of an exemplary shuttle vehicle 110 carrying an exemplary maintenance vehicle 106, e.g., following operation 1518 described herein with reference to method 1500 of FIG. 15, or during operation 1624 described herein with reference to method 1600 of FIG. 16. In the nonlimiting example shown in FIG. 17, the maintenance and shuttle vehicles are located at the intersection of a solar panel track 104 and the shuttle track 108. Optionally, a fluid refill station 114 can be positioned adjacent to such intersection. The fluid refill station 114 can include a spout 1702 positioned above the maintenance and shuttle vehicles 106, 110 and over the two tracks 104, 108. The spout can be or include an open end of a pipe that can be pointed downward. The spout can be connected to a boom horizontal pipe section 1704, which can be connected to a vertical pipe section 1706. FIG. 17 schematically illustrates that the fluid tank door 214 of the maintenance vehicle 106 is rotated into the open position so that fluid from the spout will fall into the tank.

Figure 31:
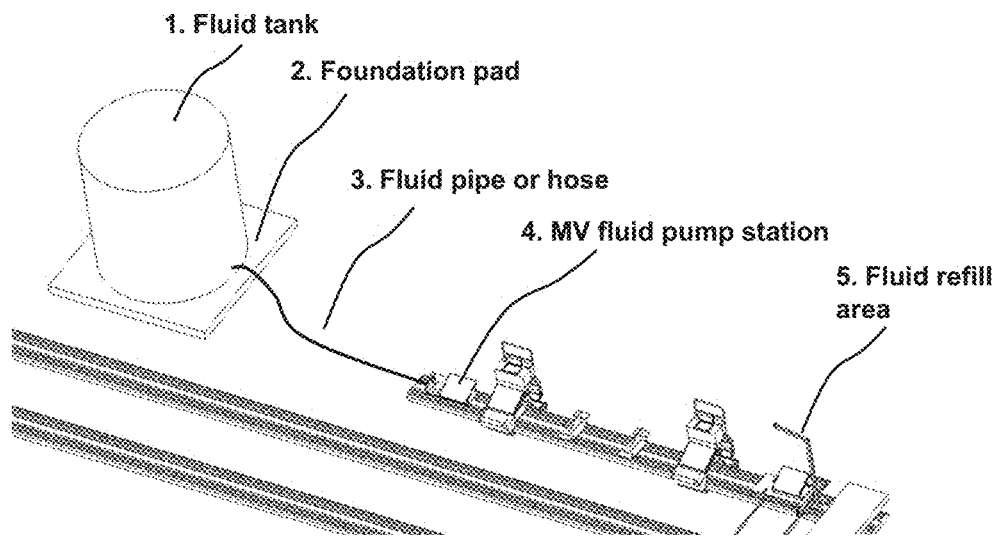
FIGS. 31-43 schematically illustrate additional alternative configurations.
Figure 32:
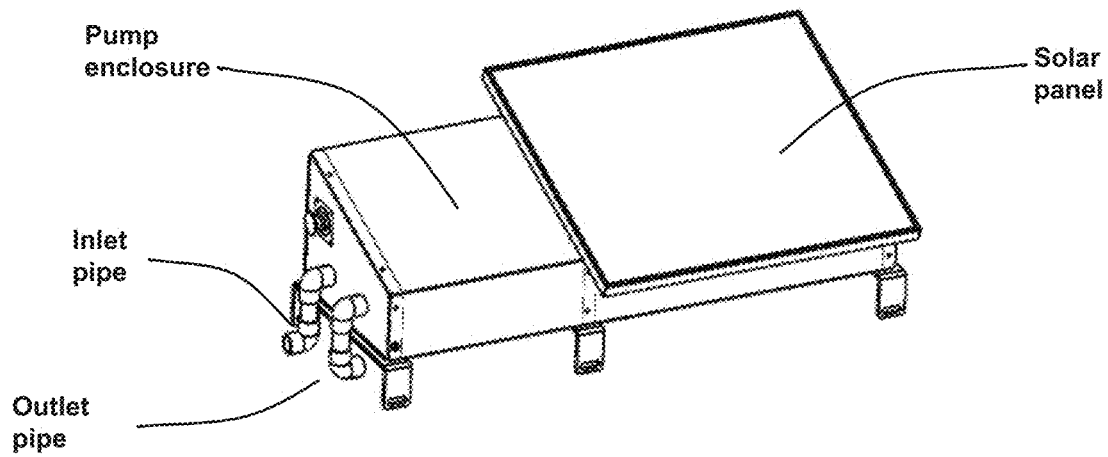

Another exemplary configuration is illustrated in FIG. 31, which schematically illustrates an example of an arrangement of a maintenance vehicle (MV) fluid tank, pad, and pump station. Fluid tank (1) can be on-site for MV auto-refill. The fluid can be water, cleaning solution, herbicide, coating material, or other substance. Fluid tank foundation (2), which also can be referred to as a foundation pad, can be or include a gravel pad, concrete pad, or other type. Fluid pipe or hose (3) connects fluid tank (1) to MV fluid refill infrastructure. Pipe/hose can run in a groove in the track. MV fluid pump station (4) can include a pump that can be powered by a battery that is charged by a solar panel. The pump can pump fluid between the tank and the auto-refill area. At fluid refill area (5) the MV returns to this area to have its tank filled with fluid. Another exemplary configuration is illustrated in FIG. 32, which schematically illustrates a fluid pump station (4) that moves fluid between the fluid tank (1) and water refill area (5). The fluid pump station can include a solar panel, pump enclosure, inlet pipe, and outlet pipe.

At the fluid refill area, e.g., area (5) in FIG. 31 or area 114 in FIG. 17, the MV can park itself under a fluid refill arm, e.g., arms 1704 and/or 1702. The flow of fluid is triggered and fluid flows into the MV fluid tank until full. A pipe or hose carries fluid to the top of the fluid refill arm. When the MV is parked under the arm, fluid can flow directly into the spot fluid tank.

In some configurations, the MV tank lid can include an actuator on the MV that can open the lid of the fluid tank as the vehicle approaches the fluid refill area. An actuator on the fluid refill arm can engage with and open the MV fluid tank lid when the MV is in position in the fluid refill area. Communication between the MV and fluid refill controller/ arm can be wireless. A gasket can be provided around the opening to the MV fluid tank.

Figure 18:
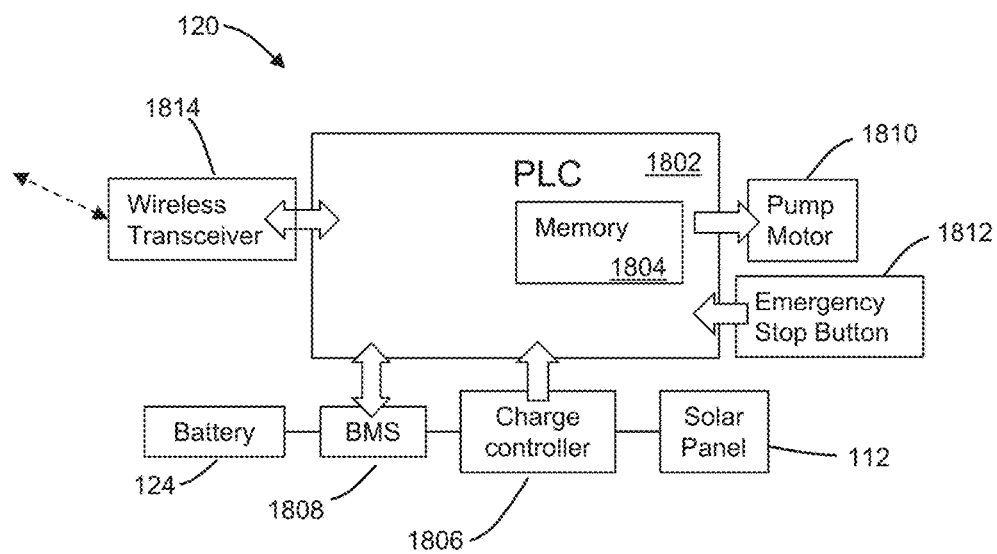
FIG. 18 schematically illustrates an electronic control system of a pump, according to some examples.

FIG. 18 schematically illustrates an electronic control system 120 of a pump 118 such as schematically illustrated in FIG. 1. System 120 can include a PLC 1802 as the main controller of the pump system, and this PLC can include memory 1804 to store data. System 120 can include a solar panel 122 configured so as to power the pump 118 and the controller 1802, and a battery 124 configured for energy storage. System 120 can include a charge controller 1806 configured to keep the battery charged. System 120 can include a battery management system (BMS) 1808 configured so as to provide further control of the battery and provide data to the PLC 1802, such as battery state of charge. The pump 118 can alternatively be powered by a generator or by locally provided AC power. System 120 can include a pump motor 1810 configured so as to drive the pump 118. System 120 can include an emergency stop button 1812 configured so as to enable on-site staff to stop the pump in event of an undesirable situation. System 120 can include a wireless transceiver 1814 configured so as to allow commands to be sent to the PLC 1802 and to allow data to be transmitted from the PLC.

Figure 19:
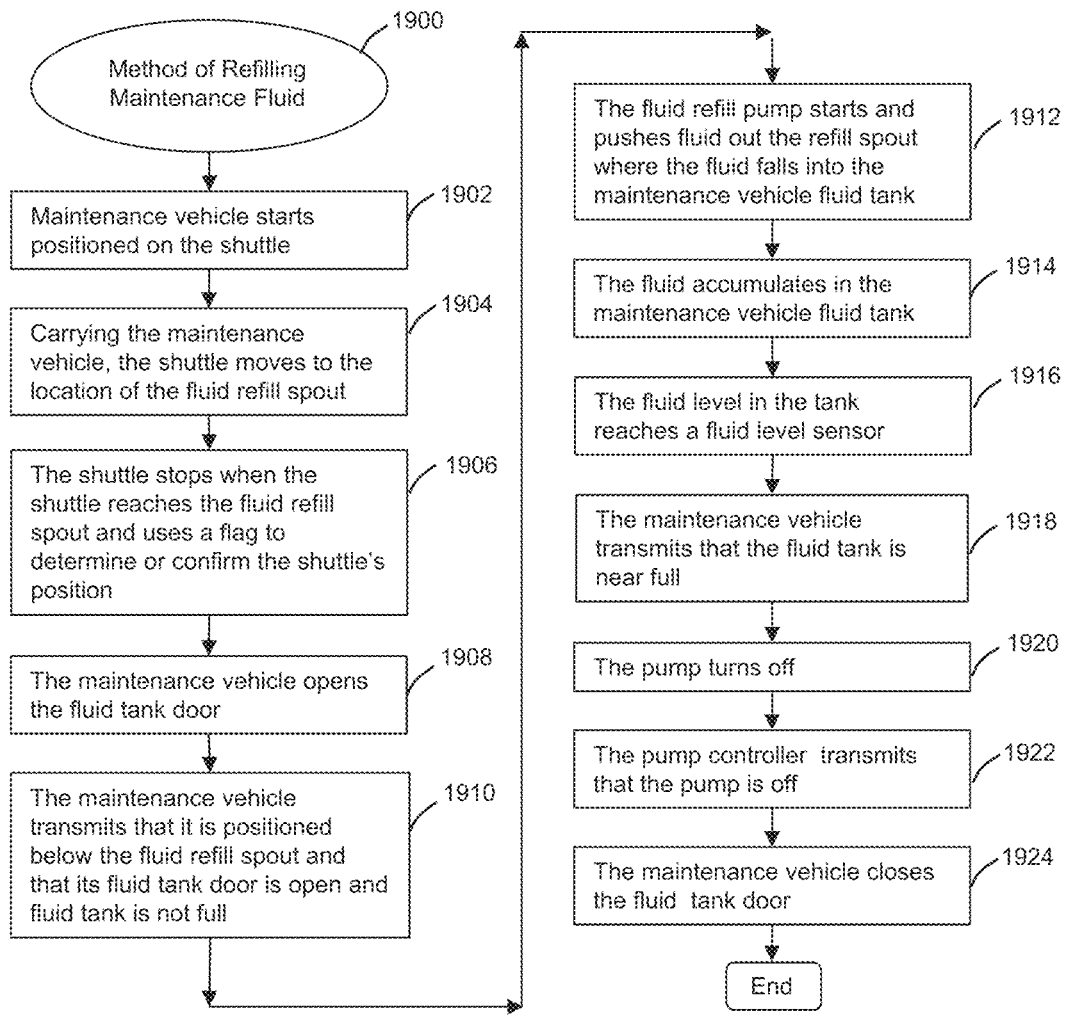
FIG. 19 illustrates a flow of operations in an exemplary method for refilling maintenance fluid into a maintenance vehicle, according to some examples.

FIG. 19 illustrates a flow of operations in an exemplary method for refilling maintenance fluid into a maintenance vehicle 106. In method 1900 illustrated in FIG. 19, the maintenance vehicle 106 starts positioned on the shuttle 110 (operation 1902). In method 1900, carrying the maintenance vehicle, the shuttle moves to the location of a fluid refill spout (operation 1904), e.g., a location such as described herein with reference to FIG. 17. In method 1900, the shuttle stops when the shuttle reaches the fluid refill spout and uses a flag there to determine or confirm the shuttle's position (operation 1906). The shuttle control system also transmits that it is positioned at the fluid refill spout to the control systems of the gateway, the maintenance vehicle, and the pump. In method 1900, the maintenance vehicle control system receives this transmission from the shuttle control system and opens the fluid tank door (operation 1908). In method 1900, the maintenance vehicle control system transmits to the control systems of the gateway, shuttle vehicle, and pump that the maintenance vehicle is positioned below the fluid refill spout and that the fluid tank door of the maintenance vehicle is open (operation 1910) and that the maintenance vehicle's fluid tank is not full. In method 1900, responsive to such transmission, the fluid refill pump starts and pushes fluid out the refill spout where the fluid falls into the maintenance vehicle fluid tank (operation 1912). In method 1900, the fluid accumulates in the maintenance vehicle fluid tank (operation 1914). In method 1900, the fluid level in the tank reaches a fluid level sensor (operation 1916). In method 1900, the maintenance vehicle control system transmits to the control systems of the pump, gateway, and shuttle that the fluid tank is near full (operation 1918). In method 1900, responsive to such transmission, the pump turns off (operation 1920). In method 1900, the pump controller transmits to the other controllers that the pump is off (operation 1922). In method 1900, the maintenance vehicle closes the fluid tank door and transmits to the other controllers that it has done so, after receiving transmission that the pump is off (operation 1924). After the shuttle controller receives transmissions that the maintenance vehicle fluid tank is near full, that the pump is off, and that the maintenance fluid tank door is closed, the shuttle vehicle can optionally transport the maintenance vehicle to the same track 104 or another track 104 so as to perform maintenance operations on the solar panels of the corresponding row associated with that track.

Figure 20:
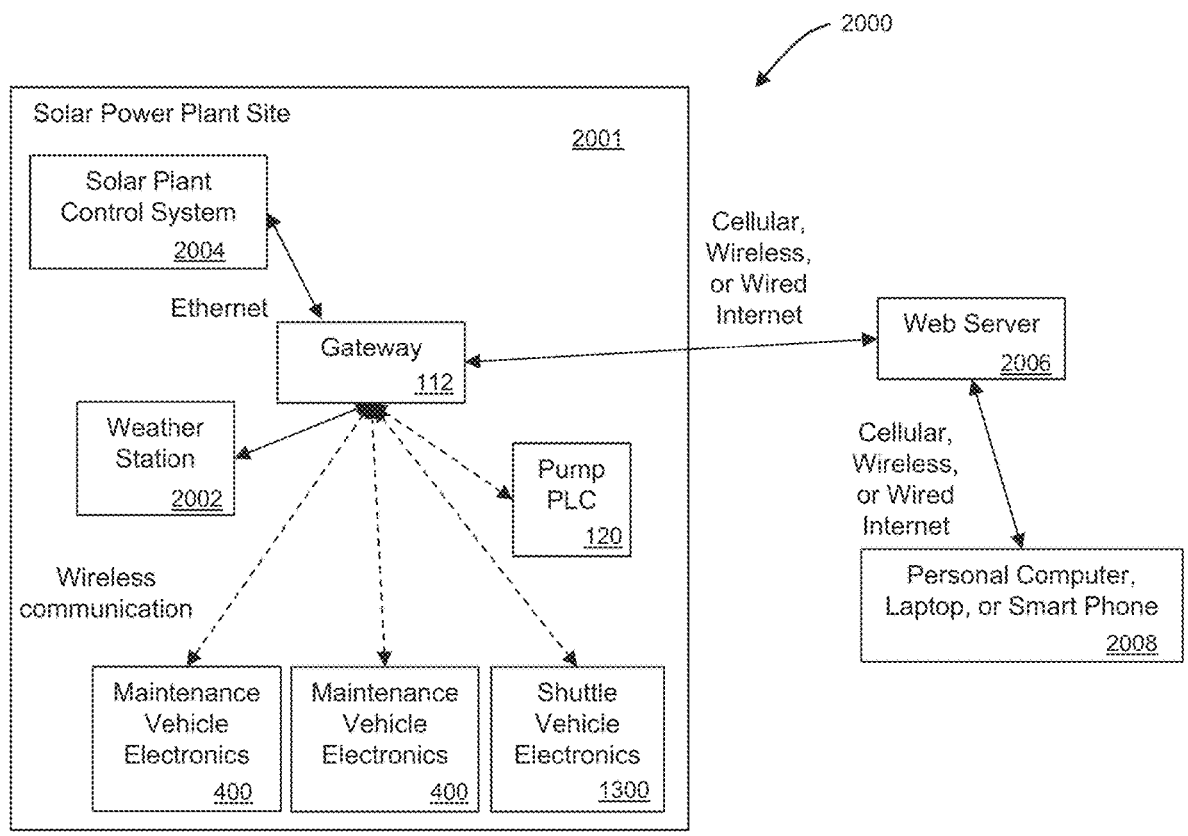
FIG. 20 schematically illustrates components of an exemplary configuration of a remote management system, according to some examples.

FIG. 20 schematically illustrates components of an exemplary configuration of a remote management system 2000 for use in controlling certain aspects of a solar plant maintenance system. For example, in some configurations provided herein, the remote management system 2000 allows an operator to observe and control certain aspects of the solar plant maintenance system via an internet connected device 2008, such as schematically illustrated in FIG. 20. Portion 2001 of the system located at the solar power plant site can include the control systems (electronics) 400 of one or more respective maintenance vehicles 106, the control systems (electronics) 1300 of one or more shuttle vehicles 110, the fluid refill pump controller (PLC) 120, a weather station 2002, the gateway 112, and a control system for the solar plant 2004 that can include a master PLC. Weather stations can be included in solar power plant systems to measure irradiance, wind speeds, rain, and other weather factors. Weather station data could be used to direct maintenance processes in a variety of ways. For example, observations of rain events can be used to change the solar panel cleaning schedules. In another example, a very high wind event can, once the wind calmed down, trigger a diagnostic or observation maintenance process to check for damage. The solar plant control system 2004 can control the electrical operation of the solar plant, for example controlling interconnection with the electric grid or the inverter load and also controls any solar tracker operation of the plant. In some configurations, the gateway 112 can be configured so as to communicate wirelessly with the respective control systems of the maintenance vehicles, shuttle vehicles, pump, and potentially also the weather station. The gateway 112 optionally can be located near the pump or the weather station and/or communicate via wired connection with the pump controller 120 and/or with the weather station 2002. The gateway 112 can include a PLC that is configured so as to communicate with the vehicle controllers 400, 1300 and the master PLC of the solar power plant control system 2004. The gateway 112 can include a wireless transceiver to communicate with suitable ones of the on-site elements of the system 2000, and/or gateway 112 can include a modem, such as a cellular modem or satellite modem, or another device configured so as to provide remote access over the internet. A web server 2006 can be included as part of the remote management system 2000, and the gateway 112 can be configured so as to transmit data to the web server where such data can be stored. A personal computer, laptop computer, or smart phone 2008 can be used to access the web server to download data or to upload changes to the system's programming. With this tool, an operator or manager can do a variety of tasks. For example, these tasks can include observing what the maintenance system is doing to check to ensure proper operation. Additionally, or alternatively, these tasks can include looking at, downloading, and/or processing data recorded by the maintenance system. Additionally, or alternatively, these tasks can include diagnostics of the maintenance system components to ensure proper operation. The computer can enable changing what the maintenance process does, for example, changing its process schedule, rate, fluid flow rate, etc. A graphical user interface can be used to facilitate operation for the user.

Figure 21:
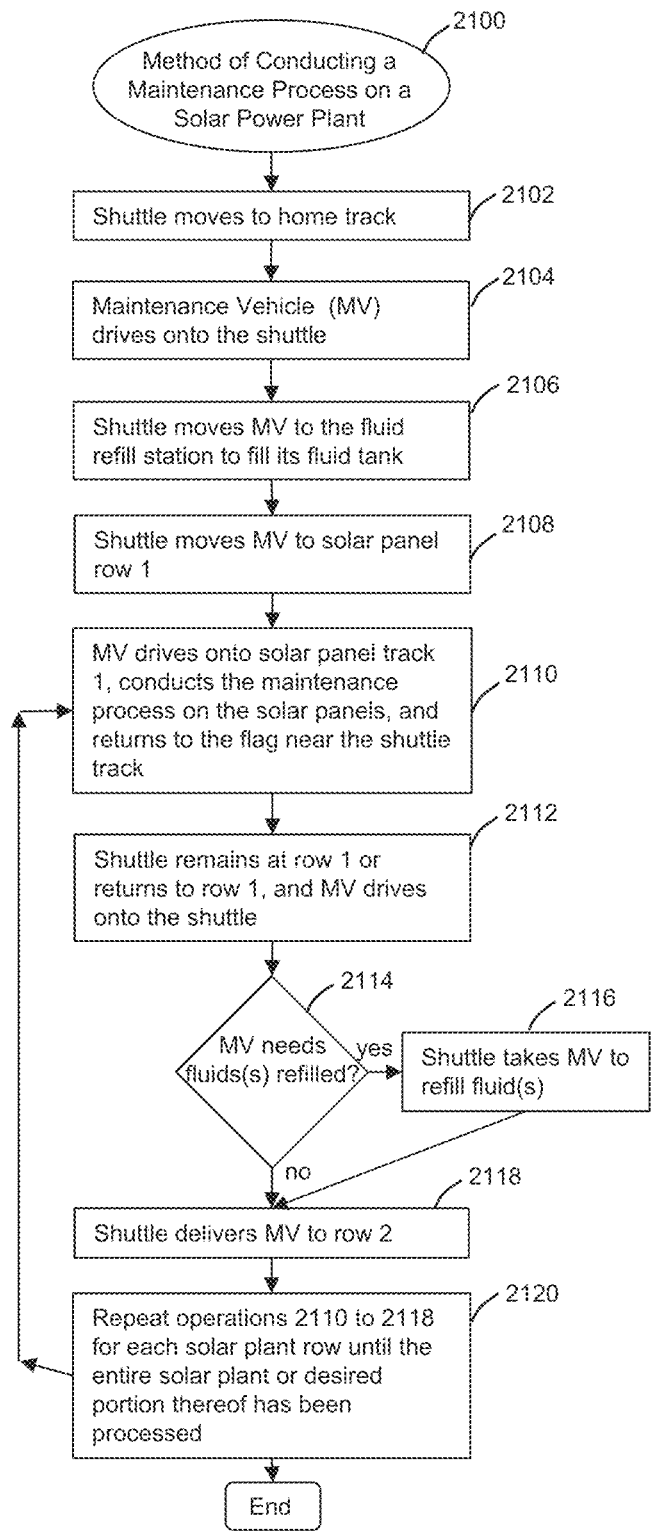
FIG. 21 illustrates a flow of operations in an exemplary method for conducting a maintenance process on a solar power plant, according to some examples.

FIG. 21 illustrates a flow of operations in an exemplary method for conducting a maintenance process on a solar power plant, e.g., according to the system illustrated in FIG. 1. In method 2100 illustrated in FIG. 21, the shuttle moves to a home track (operation 2102); the home track can be configured similarly as home track 128 described herein with reference to FIG. 1, and the shuttle can move to the track using a method such as described herein with reference to FIG. 14. In method 2100, the maintenance vehicle (MV) drives from the home track onto the shuttle (operation 2104), e.g., in a manner such as described herein with reference to FIG. 15. In method 2100 illustrated in FIG. 21, the shuttle moves the maintenance vehicle to the fluid refill station to fill the maintenance vehicle's fluid tank, e.g., in a manner such as described herein with reference to FIG. 19 (operation 2106). In method 2100 illustrated in FIG. 21, the shuttle moves the maintenance vehicle to a first solar panel row (operation 2108), e.g., in a manner such as described herein with reference to FIG. 16. In method 2100 illustrated in FIG. 21, the maintenance vehicle drives onto the first solar panel row track, conducts a maintenance process on the solar panels, and returns to the flag near the shuttle track (operation 2110), e.g., in a manner such as described herein with reference to FIGS. 9 and 16. While the maintenance vehicle is conducting a process, the shuttle vehicle can optionally move an additional maintenance vehicle to conduct a maintenance process on a different row. In method 2100, the shuttle either remains at the row the maintenance vehicle is on or, if it moves to handle a different maintenance vehicle, returns to the row of the first maintenance vehicle. When the shuttle confirms through wireless transmission that it is at the row the maintenance vehicle is with its ramp down, the maintenance vehicle drives onto the shuttle (operation 2112), e.g., in a manner such as described herein with reference to FIG. 15.

In method 2100, it can be determined whether the maintenance vehicle needs fluid refilled via level sensors 418 on the fluid refill tank, noted in FIG. 4 and with a signal transmission by the maintenance vehicle control system (operation 2114). In method 2100, based upon it being determined that the maintenance vehicle needs fluid(s) refilled, the shuttle takes the maintenance vehicle to refill the fluid(s) (operation 2116), e.g., in a manner such as described herein with reference to FIG. 19. In method 2100, based upon the fluid level sensors 418 and the control system in the maintenance vehicle determining whether the tank needs fluid(s) refilled or based upon the shuttle having taken the maintenance vehicle to refill the fluid(s), the shuttle delivers the maintenance vehicle to a second solar panel row track (operation 2118), e.g., in a manner such as described herein with reference to FIG. 16. In method 2100, operations 2110 to 2118 can be repeated for each solar plant row until the entire solar plant, or a desired portion thereof, has been processed (operation 2120). The control systems of the gateway, pump, maintenance vehicle, and shuttle all can follow a computer program that directs their coordinated operations for how to proceed in conducting the maintenance process. With regards to method 2100 as well as the methods described herein with reference to FIGS. 23, 26, 27, 28, and 30, it should be noted that the control system estimates how many rows it can process with a full tank of consumable fluid. Refilling the maintenance vehicle's fluid tank can be planned ahead of time. The check on fluid level can be used as a check to correct against the planned schedule.

Figure 22:
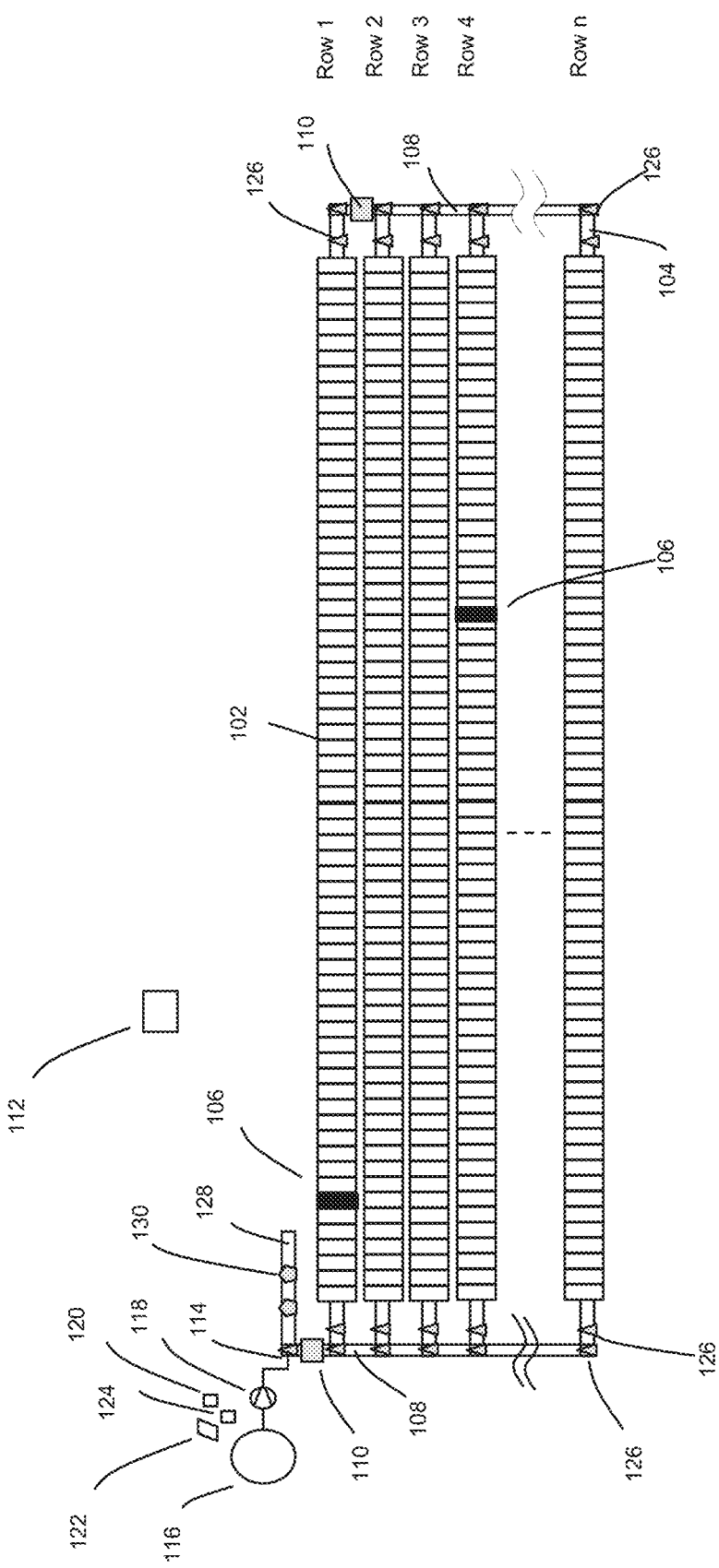
FIG. 22 schematically illustrates an alternative configuration of a maintenance system, according to some examples.

FIG. 22 schematically illustrates an alternative configuration of a maintenance system. The configuration illustrated in FIG. 22 includes a plurality of solar panel rows 1, 2, 3, 4, ... n, each row including a maintenance vehicle track 104, and two shuttle tracks 108 respectively located at each end of the solar panel tracks. One shuttle 110 operates on each shuttle track 108. One or more maintenance vehicles 106 can operate in the exemplary system configuration illustrated in FIG. 22. Additionally, the system illustrated in FIG. 22 can include home track 128 with one or more vehicle locks 130, a fluid refill system 114, and a gateway 112 which respectively can be configured similarly as in the configuration in FIG. 1. As noted herein, in the configuration in FIG. 1, the system can be configured such that each maintenance vehicle 106 can conduct a process while traveling in one direction along the row of solar panels as well as subsequently to travel along that same row in the other direction, optionally without doing a process in that direction. In the configuration in FIG. 22, the system can be configured such that the maintenance vehicle 106 can conduct a maintenance process while moving in both directions. For example, the system illustrated in FIG. 22 can be configured such that a shuttle 110 delivers a maintenance vehicle 106 at a first end of a first row. The maintenance vehicle 106 conducts a process on the solar panels 102 as it moves along the first row. At the second end of the first row, the maintenance vehicle can be picked up by the second shuttle 110 and delivered to a second row, e.g., the next row. At this second row, the maintenance vehicle 106 can process the solar panels 102 while moving in a direction opposite to that in which it moved along the first row. In such a manner, the maintenance vehicle 106 can zig zag back and forth along each row of the solar plant and conduct the maintenance process as it goes.

Figure 23:
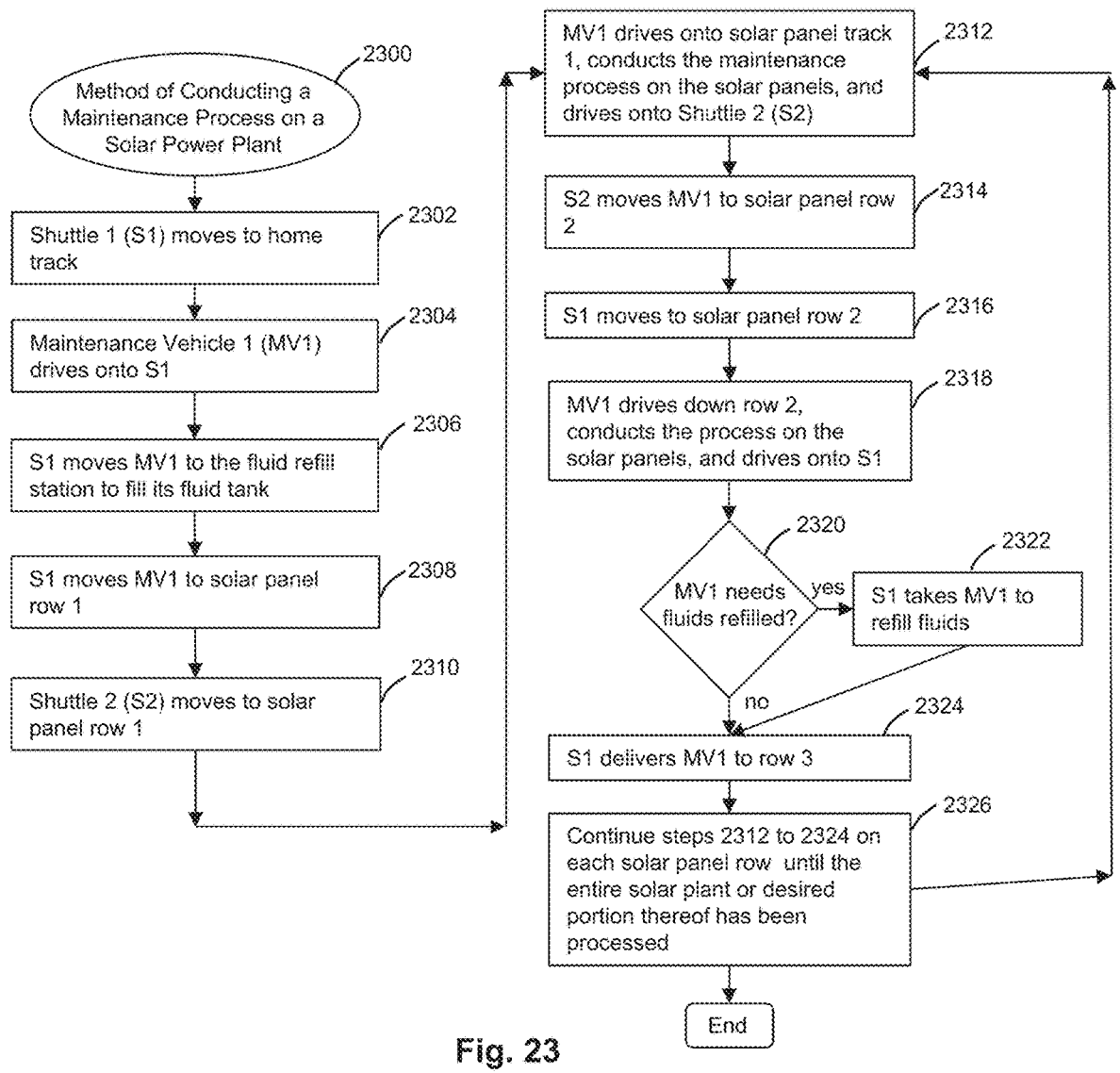
FIG. 23 illustrates a flow of operations in an exemplary method for conducting a maintenance process on a solar power plant, according to some examples.

FIG. 23 illustrates a flow of operations in an exemplary method for conducting a maintenance process on a solar power plant, e.g., using the system illustrated in FIG. 22. In method 2300 illustrated in FIG. 23, a first shuttle (S1) moves to a home track (operation 2302); the home track can be configured similarly as home track 128 described herein with reference to FIG. 1, and the shuttle can move to the track using a method such as described herein with reference to FIG. 14. In method 2300, a maintenance vehicle (MV1) drives from the home track onto the first shuttle (operation 2304), e.g., in a manner such as described herein with reference to FIG. 15. In method 2300 illustrated in FIG. 23, the first shuttle moves the maintenance vehicle to the fluid refill station to fill the maintenance vehicle's fluid tank, e.g., in a manner such as described herein with reference to FIG. 19 (operation 2306). In method 2300 illustrated in FIG. 23, the first shuttle moves the maintenance vehicle to a first solar panel row (operation 2308), e.g., in a manner such as described herein with reference to FIG. 16. In method 2300, a second shuttle (S2) moves to the other end of the first solar panel row (operation 2310), e.g., using a method such as described herein with reference to FIG. 16. In method 2300, the maintenance vehicle drives onto the first solar panel row track, conducts a maintenance process on the solar panels, and then drives onto the second shuttle (operation 2312), e.g., in a manner such as described herein with reference to FIGS. 9 and 16. In method 2300, the second shuttle moves the maintenance vehicle to a first end of a second solar panel row (operation 2314), and the first shuttle moves to the second end of the second solar panel row (operation 2316), e.g., in a manner such as described herein with reference to FIG. 16. In method 2300, the maintenance vehicle drives onto the second solar panel row track, conducts a maintenance process on the solar panels, and then drives onto the first shuttle (operation 2318), e.g., in a manner such as described herein with reference to FIGS. 9 and 16.

In method 2300, the maintenance vehicle control system, using the fluid tank level sensors, can determine whether the maintenance vehicle needs fluid refilled (operation 2320)

and communicate this to the control systems of the gateway, shuttle vehicle, and pump. In method 2300, based upon it being determined that the maintenance vehicle needs fluid(s) refilled, the first shuttle takes the maintenance vehicle to refill the fluid(s) (operation 2322), e.g., in a manner such as described herein with reference to FIG. 19. In method 2300, based upon it being determined that the maintenance vehicle does not need fluid(s) refilled or based upon the first shuttle having taken the maintenance vehicle to refill the fluid(s), the first shuttle delivers the maintenance vehicle to a third solar panel row track (operation 2324), e.g., in a manner such as described herein with reference to FIG. 16. In method 2300, operations 2312 to 2324 can be repeated for each solar plant row until the entire solar plant, or a desired portion thereof, has been processed (operation 2326).

Figure 24:
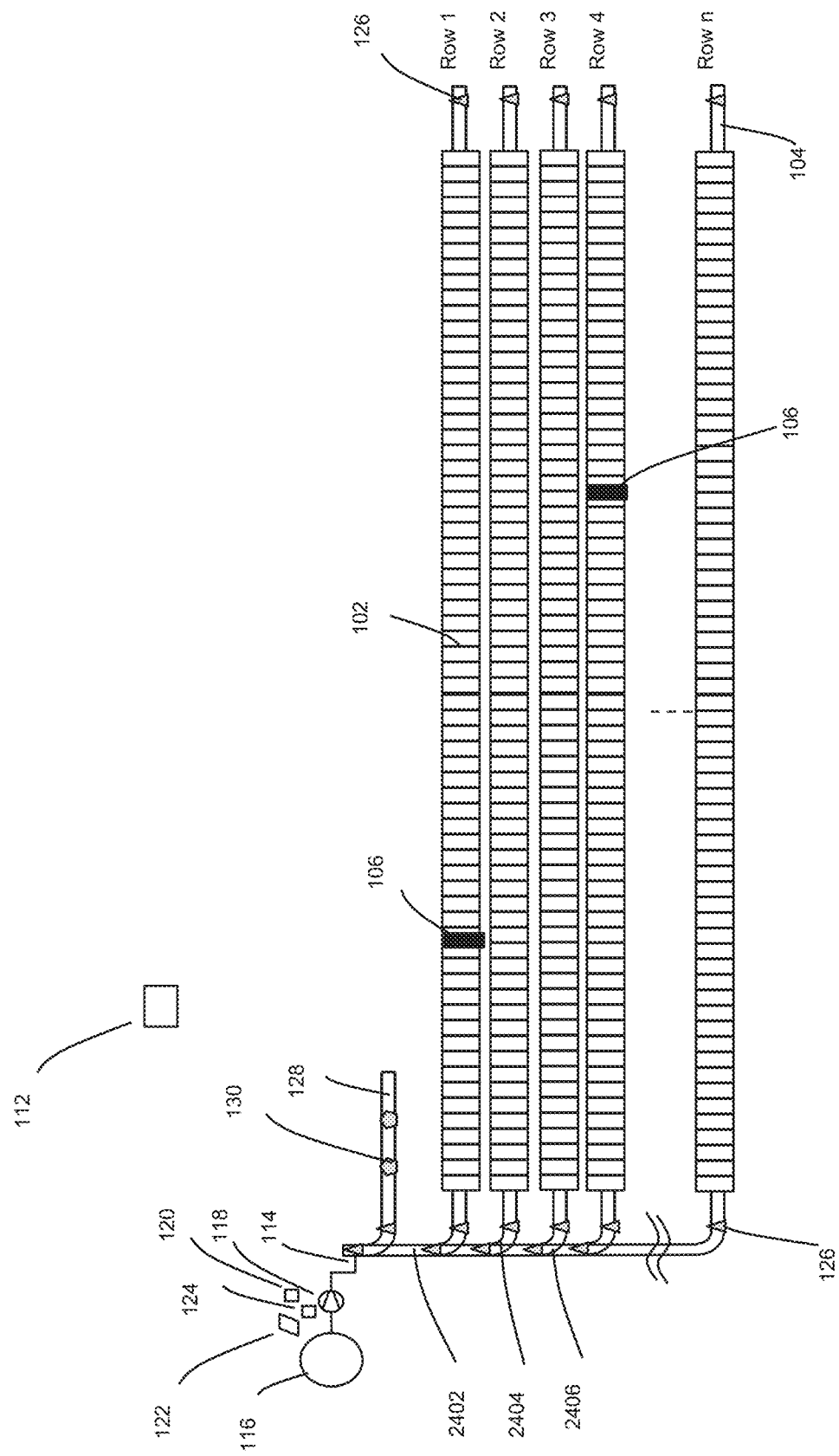
FIG. 24 schematically illustrates a plan view of an alternative configuration of a solar plant maintenance system, according to some examples.

FIG. 24 schematically illustrates a plan view of an alternative configuration of a solar plant maintenance system. The non-limiting system configuration illustrated in FIG. 24 can include a plurality of rows of solar panels 102 with respective maintenance vehicle tracks 104 that maintenance vehicles 106 can traverse, similarly as in FIG. 1. The non-limiting system configuration illustrated in FIG. 24 also can include a home track 128 with optional vehicle lock 130, a fluid refill system 114, and a gateway and communications system 112, which can be configured similarly as described herein with reference to FIG. 1. In the configuration illustrated in FIG. 24, the system components and associated method can be configured such that a maintenance vehicle 106 moves from row to row without a shuttle vehicle. In this exemplary configuration, each of the solar panel rows 104 and the home track 128 intersect with a transfer track 2402. Furthermore, this transfer track can include or be composed of the same material and can be made in the same dimensions as the solar panel tracks 104 so the maintenance vehicles 106 can drive on it. The solar panel tracks 104 can be configured such that each track forms a gentle curve 2404 at an end so that the maintenance vehicle 106 can travel around the curve from a solar panel track 104 to the transfer track 2402. At the junction of the curve 2404 and the transfer track 2402, a switch 2406 can be provided in the track that is configured similarly to a railroad track switch. The switch 2406 can be set in a through position to allow a maintenance vehicle 106 to travel straight down the transfer track 2402 bypassing the curve 2404. The switch can be changed to a divergent position to allow a maintenance vehicle 106 to travel from the curve 2404 at the end of the solar panel track 104 to the transfer track 2402 and vice versa. Each switch 2406 can be automatically controlled between the through position and the divergent position via wired or wireless communication with the gateway 112 and powered electrically, such as by electric cables or by solar panels and batteries. In various configurations, more than one switch 2406 can be actuated by the same mechanism or each switch can be actuated by individual mechanisms. Alternatively, the switches 2406 can be thrown manually by an operator. Alternatively, a switch 2406 can be actuated by the maintenance vehicle 106 before that vehicle traverses the switch.

Continuing with FIG. 24, flags 126 can be located at each end of the solar panel row tracks 104. These flags can be located at the end away from the transfer track 2402 so that the maintenance vehicle 106 can determine or confirm that the vehicle is at the end of the row and can stop the process and reverse direction. Flags 126 can be located at the end of tracks 104 nearer to the transfer track 2402 such that track switches 2406 can be set correctly for the desired movement of the maintenance vehicles 106 in advance of the maintenance vehicle's arrival. For example, based upon a switch 2406 not being in the correct position when a maintenance vehicle 106 reaches the flag 126, the vehicle can wait there until the switch is set.

Continuing with FIG. 24, in some configurations, all of the curves 2404 can be oriented the same direction as one another such that when a maintenance vehicle 106 moves from one solar panel row 104 to another one, the vehicle retains the same orientation. In configurations in which the solar panels 102 are all tilted and oriented in the same direction as one another, e.g., tilted toward the equator, and in which the maintenance vehicle 106 is configured so as to match this tilt of the solar panels 102, then the arrangement of curves 2404 can allow the maintenance vehicle's tilt and orientation to be properly matched up with that of the solar panels 102 at all times.

Figures 25A, 25B:
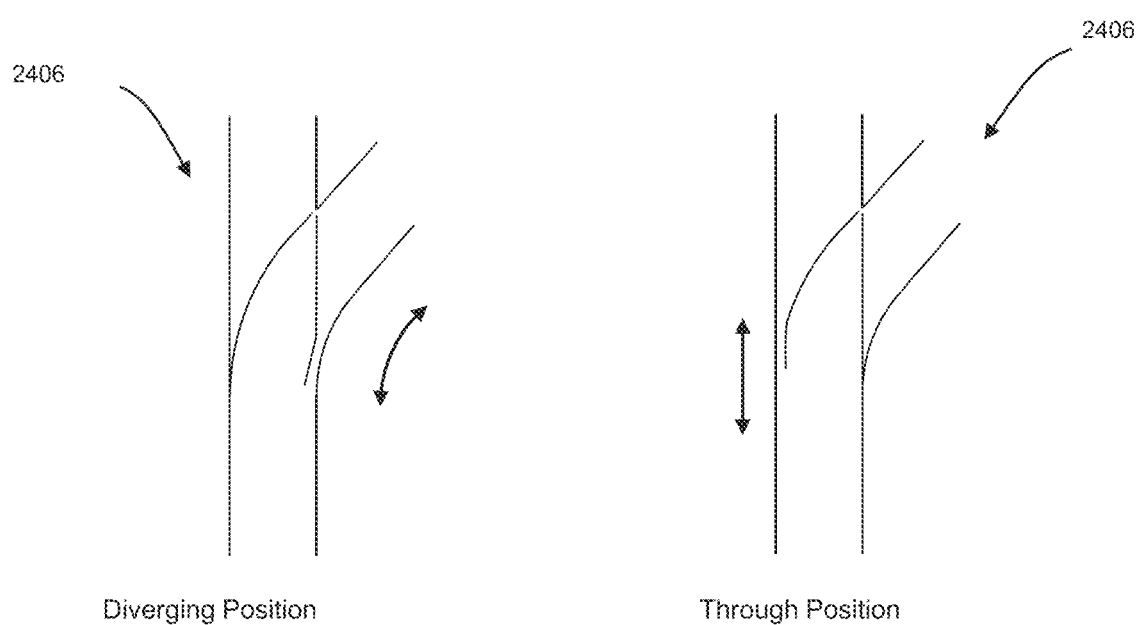
FIGS. 25A and 25B schematically illustrate plan views of an exemplary track switch, according to some examples.

FIGS. 25A and 25B schematically illustrate plan views of an exemplary track switch 2406 that can be used in a system such as illustrated in FIG. 24. In FIG. 25A, the switch 2406 can be configured such that a maintenance vehicle 106 can move from the straight track to the curve (diverging position). In FIG. 25B, the switch 2406 can be configured such that a maintenance vehicle 106 can move along the straight track and bypass the curve (through position).

Figure 26:
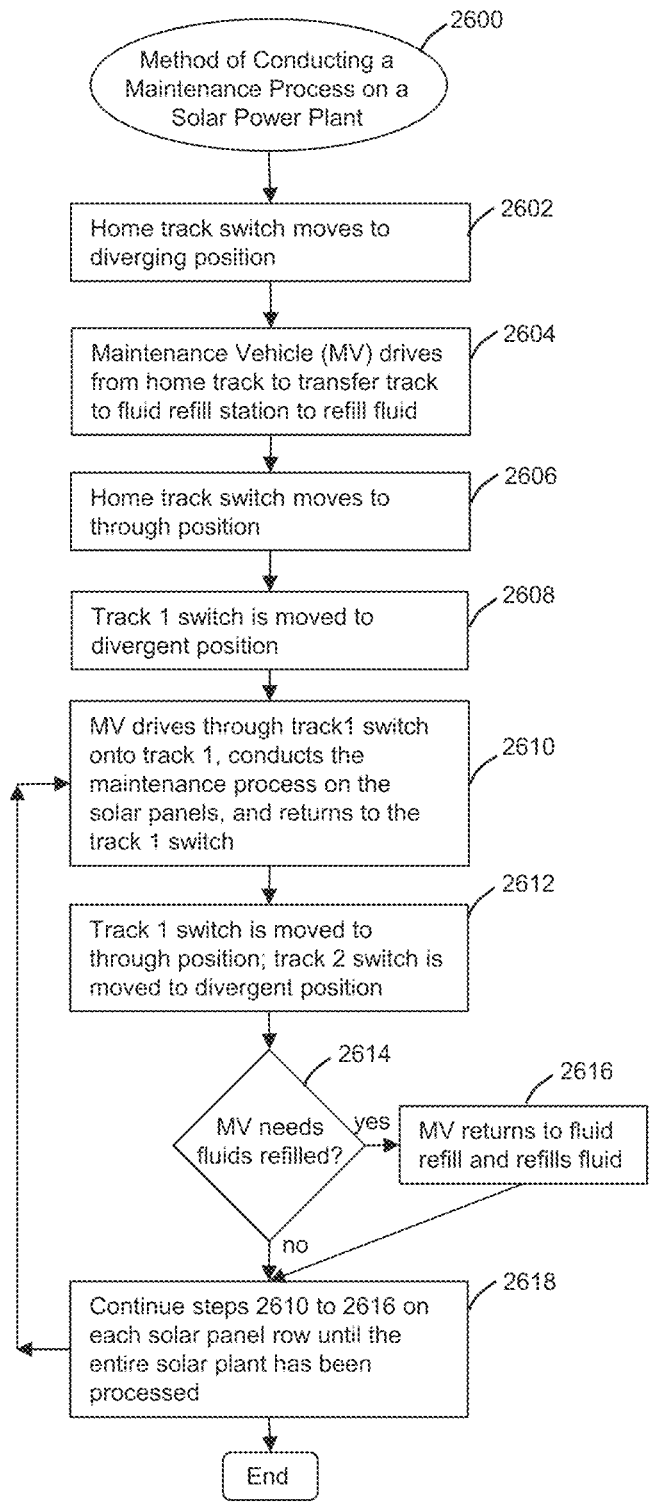
FIG. 26 illustrates a flow of operations in an exemplary method for conducting a maintenance process on a solar power plant, according to some examples.

FIG. 26 illustrates a flow of operations in an exemplary method for conducting a maintenance process on a solar power plant, e.g., using the system illustrated in FIG. 24. In method 2600 illustrated in FIG. 26, a home track switch 2406 moves to a diverging position (operation 2602); the home track can be configured similarly as home track 128 described herein with reference to FIG. 1, and the diverging position can be configured similarly as illustrated in FIG. 25A. In method 2600, the maintenance vehicle (MV) drives from the home track to the transfer track to the fluid refill station 114 to refill fluid (operation 2604), e.g., in a similar manner such as described herein with reference to FIG. 19, but without the additional operations of the shuttle. In method 2600 illustrated in FIG. 26, the home track switch 2406 moves to a through position (operation 2606), which can be configured similarly as illustrated in FIG. 25B. The switch 2406 of a first solar panel row can be moved to a divergent position (operation 2608), which can be configured similarly as illustrated in FIG. 25B. In method 2600 illustrated in FIG. 26, the maintenance vehicle drives through the switch of the first solar panel row track and onto that track, conducts a maintenance process on the solar panels, and returns to that switch (operation 2610), e.g., in a similar manner such as described herein with reference to FIG. 9. In method 2600 illustrated in FIG. 26, the switch of the first solar panel row track is moved to the through position, and the switch of a second solar panel row track is moved to a divergent position (operation 2612).

In method 2600, the maintenance vehicle control system, using the fluid tank level sensors, can determine whether the maintenance vehicle needs fluid refilled (operation 2614). In method 2600, based upon it being determined that the maintenance vehicle needs fluid(s) refilled, the maintenance vehicle returns to the fluid refill station 114 to refill the fluid(s) (operation 2616), e.g., in a manner similar to that described herein with reference to FIG. 19 without the additional operations of the shuttle. In method 2600, based upon it being determined that the maintenance vehicle does not need fluid(s) refilled or based upon the fluid(s) having been refilled, operations 2610 to 2616 can be repeated for each solar plant row until the entire solar plant, or a desired portion thereof, has been processed (operation 2618). With regards to method 2600, it should be noted that the control system estimates how many rows it can process with a full tank of consumable fluid. Refilling the maintenance vehicle's fluid tank can be planned ahead of time. The check on fluid level can be used as a check to correct against the planned schedule.

Figure 27:
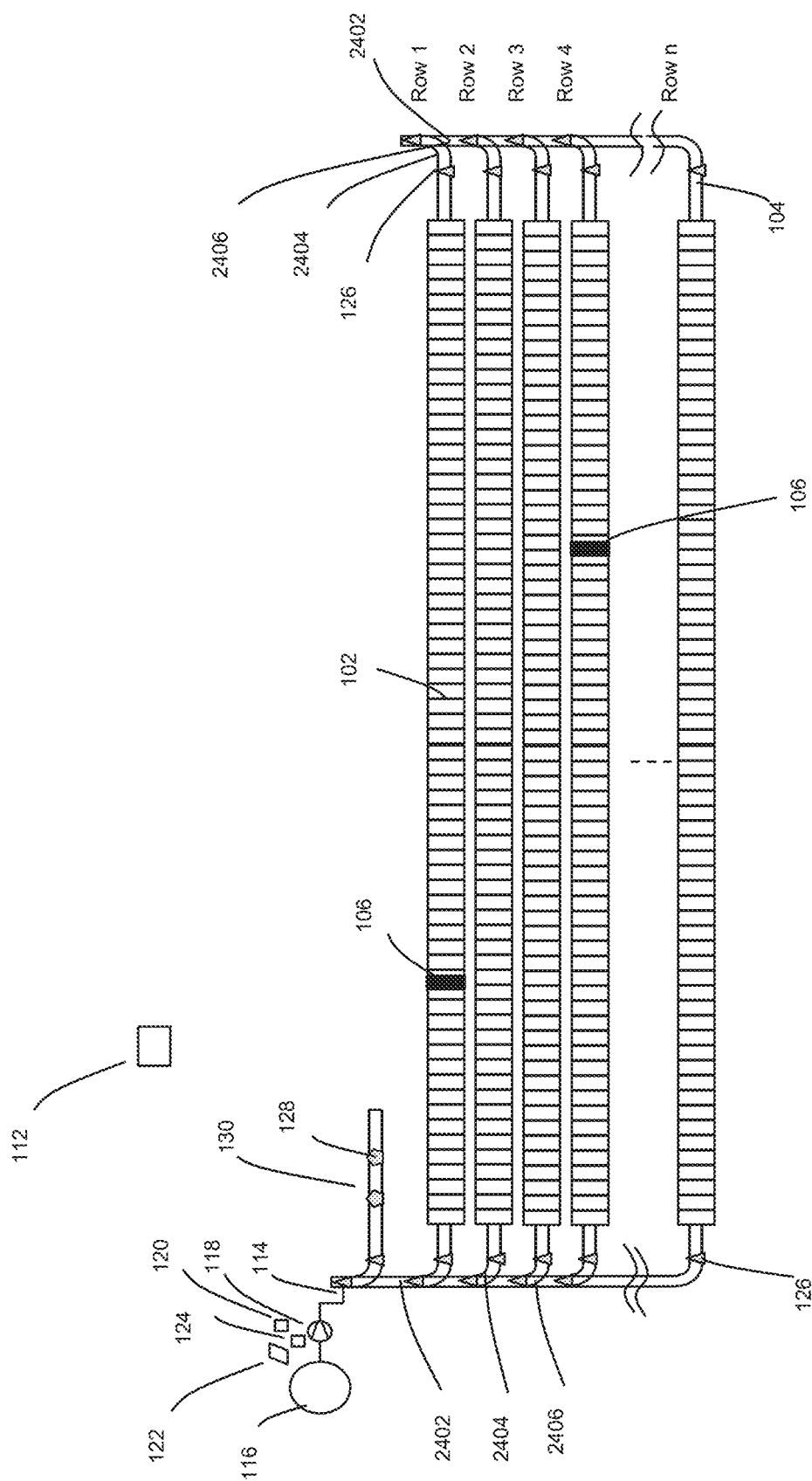
FIG. 27 schematically illustrates a plan view of an alternative maintenance system configuration, according to some examples.

FIG. 27 schematically illustrates a plan view of an alternative maintenance system configuration that also uses track switches and is configured similarly to that illustrated in FIG. 24 except that the system includes two transfer tracks 2402, each at either end of the rows of solar panels. In this configuration, a maintenance vehicle 106 can conduct a maintenance process moving from left to right along one row, move from one row to the next row at the right end transfer track and then conduct a maintenance process from right to left on the next row. Such a configuration can removes the need for a maintenance vehicle 106 to travel in reverse over the solar panels without necessarily conducting a maintenance process.

Figure 28:
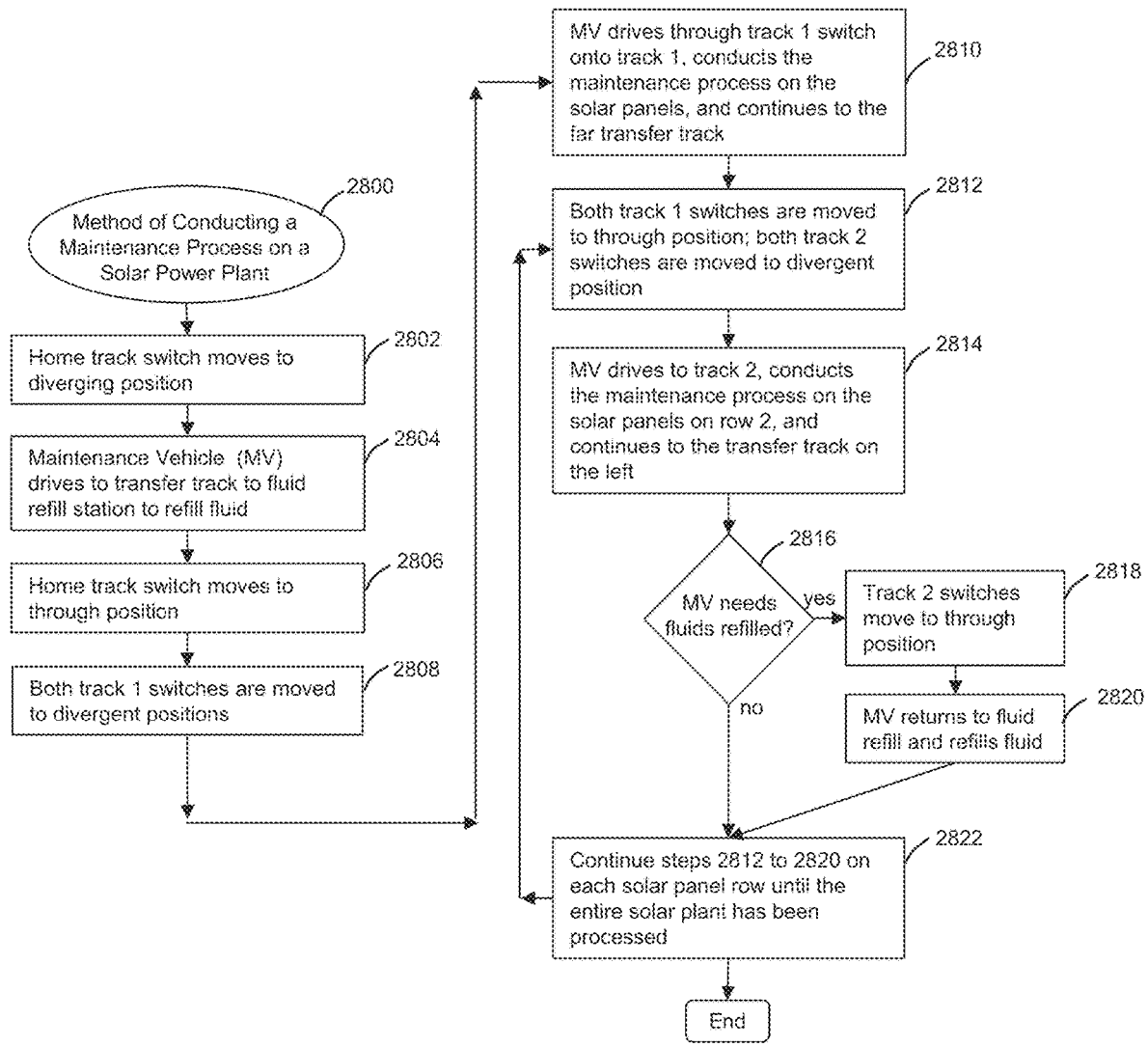
FIG. 28 illustrates a flow of operations in an exemplary method for conducting a maintenance process on a solar power plant, according to some examples.

FIG. 28 illustrates a flow of operations in an exemplary method for conducting a maintenance process on a solar power plant, e.g., using a system such as illustrated in FIG. 27. In method 2800 illustrated in FIG. 28, a home track switch 2406 moves to a diverging position (operation 2802); the home track can be configured similarly as home track 128 described herein with reference to FIG. 1, and the diverging position can be configured similarly as illustrated in FIG. 25A. In method 2800, the maintenance vehicle (MV) drives from the home track to the transfer track to the fluid refill station 114 to refill fluid (operation 2804), e.g., in a similar manner such as described herein with reference to FIG. 19, but without the additional operations of the shuttle. In method 2800 illustrated in FIG. 28, the home track switch 2406 moves to a through position (operation 2806), which can be configured similarly as illustrated in FIG. 25B. Both of the switches 2406 of a first solar panel row can be moved to a divergent position (operation 2808), which can be configured similarly as illustrated in FIG. 25B. In method 2800 illustrated in FIG. 28, the maintenance vehicle drives through the switch of the first solar panel row track and onto that track, conducts a maintenance process on the solar panels, and continues on to the far switch of that track (operation 2810), e.g., in a similar manner such as described herein with reference to FIG. 9. In method 2800 illustrated in FIG. 28, both of the switches of the first solar panel row track are moved to the through position, and both of the switches of a second solar panel row track are moved to a divergent position (operation 2812). The maintenance vehicle drives to the second solar panel row track, conducts the maintenance process on the solar panels of that track, and continues to the transfer track on the other side of that track (operation 2814).

In method 2800, it can be determined whether the maintenance vehicle needs fluid refilled (operation 2816). In method 2800, based upon it being determined that the maintenance vehicle needs fluid(s) refilled, the maintenance vehicle returns to the fluid refill station 114 to refill the fluid(s). For example, the second track's switches can move to the through position (operation 2818) and the maintenance vehicle can return to the fluid refill station 114 (operation 2820), e.g., in a manner similar to that described herein with reference to FIG. 19 without the additional operations of the shuttle. In method 2800, based upon it being determined that the maintenance vehicle does not need fluid(s) refilled or based upon the fluid(s) having been refilled, operations 2812 to 2820 can be repeated for each solar plant row until the entire solar plant, or a desired portion thereof, has been processed (operation 2822).

Figure 29:
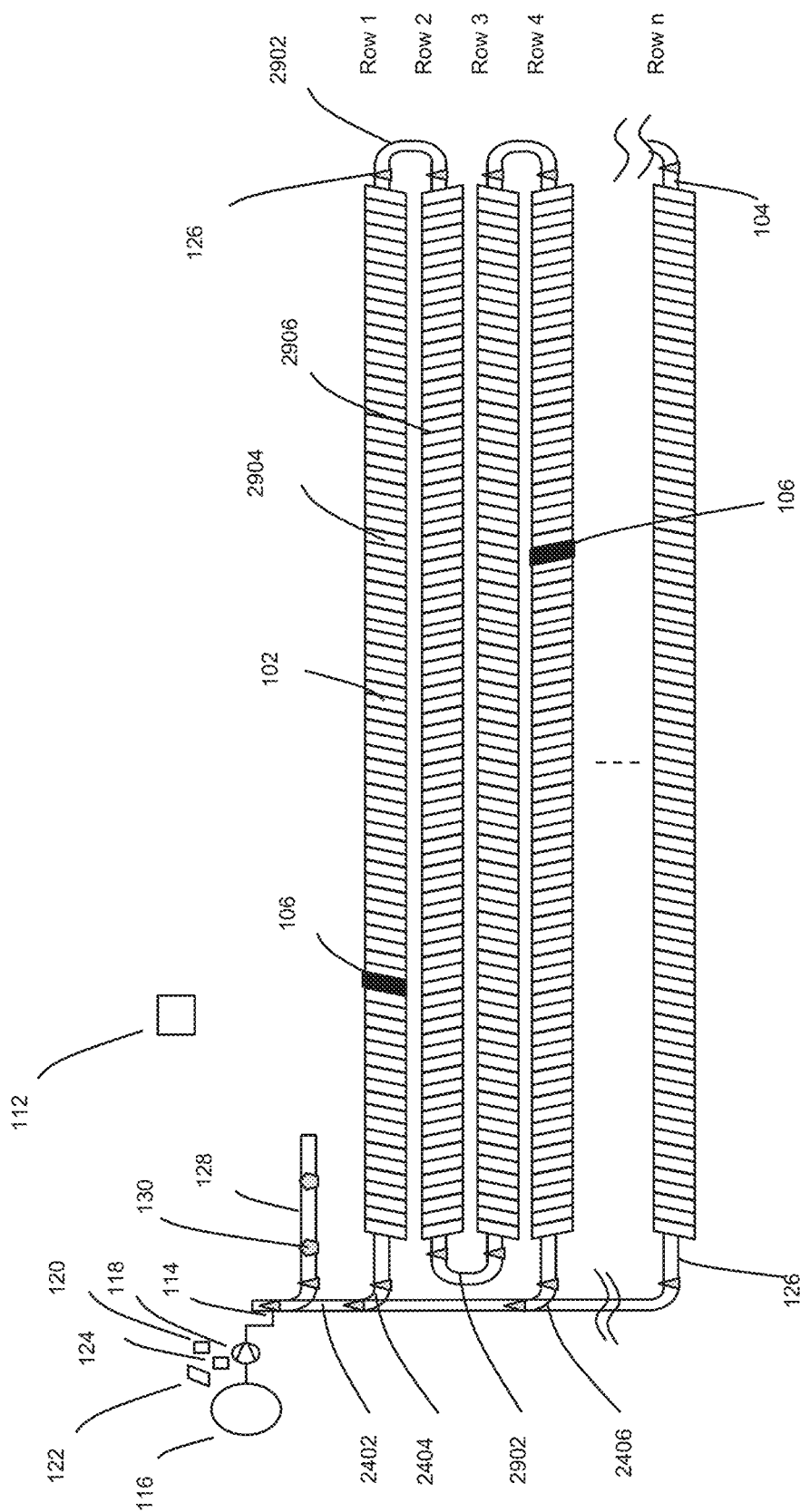
FIG. 29 schematically illustrates a plan view of yet another alternative maintenance system configuration, according to some examples.

FIG. 29 schematically illustrates a plan view of yet another alternative maintenance system configuration. The configuration of FIG. 29 includes track switches 2406 similarly as in FIGS. 24 and 27 to allow maintenance vehicles 106 to move from solar panel tracks 104 onto a transfer track 2402. The configuration schematically illustrated in FIG. 29 reduces the number of switches 2406 compared with the configurations in FIGS. 24 and 27 by using track U-turns 2902 to move the maintenance vehicle 106 from one row to another row.

In some configurations, the maintenance vehicle 106 works properly when the vehicle is angled at the same angle as the solar panels 102 in the transverse direction to the solar panel track 104. For example, based upon the track being aligned east to west and based upon the solar panels all being tilted toward the south at 30°, then, for certain maintenance processes, the maintenance vehicle can be configured for this 30° tilt. The track switching and curves can be configured so as to keep the maintenance vehicle angled toward the south. The U-turn track design in the configuration in FIG. 29 can result in the maintenance vehicle facing south on some rows 2904 and facing north on other rows 2906. The system alternatively can include alternating rows facing east and west or facing any other two directions whose angles are 180° apart. Such a configuration can be used based upon the maintenance vehicle functioning properly regardless of solar panel angle, and/or based upon the tilt of the solar panels alternated pointing opposite directions every other row (e.g., such as illustrated in FIG. 29), and/or based upon the solar panels being mounted on a solar tracker that can adjust the angle of the panels on a row-by-row basis, e.g., so as to match a tilt for the maintenance machine.

Figure 30:
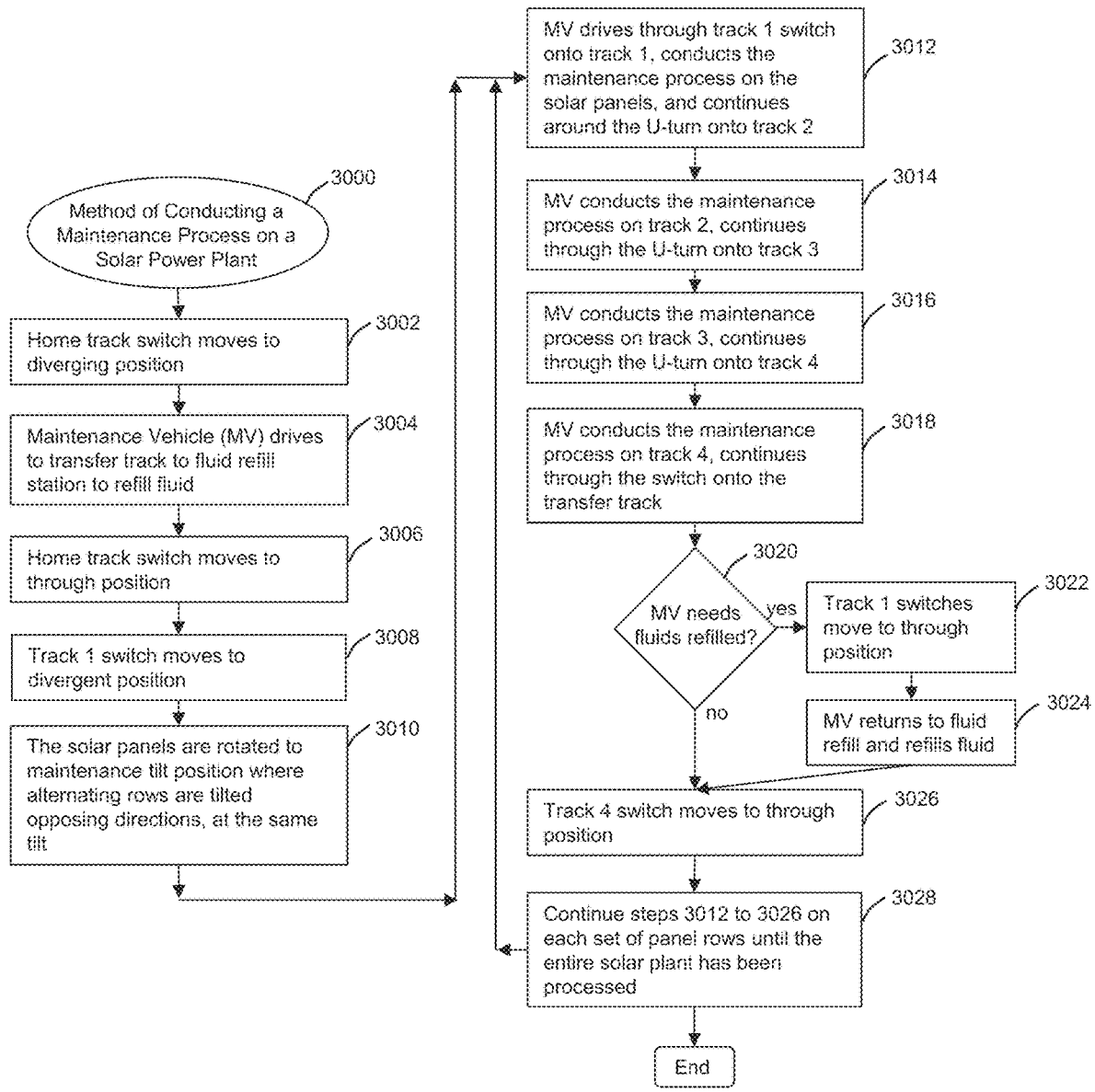
FIG. 30 illustrates a flow of operations in an exemplary method for conducting a maintenance process on a solar power plant, according to some examples.

FIG. 30 illustrates a flow of operations in an exemplary method for conducting a maintenance process on a solar power plant, e.g., using a system such as illustrated in FIG. 29. In method 3000 illustrated in FIG. 30, the solar panels can be mounted on a solar tracker that positions the panels appropriately for the maintenance process. In method 3000 illustrated in FIG. 30, a home track switch 2406 moves to a diverging position (operation 3002); the home track can be configured similarly as home track 130 described herein with reference to FIG. 1, and the diverging position can be configured similarly as illustrated in FIG. 25A. In method 3000, the maintenance vehicle (MV) drives from the home track to the transfer track to the fluid refill station 114 to refill fluid (operation 3004), e.g., in a similar manner such as described herein with reference to FIG. 19, but without the additional operations of the shuttle. In method 3000 illustrated in FIG. 30, the home track switch 2406 moves to a through position (operation 3006), which can be configured similarly as illustrated in FIG. 25B. The switch 2406 of a first solar panel row can be moved to a divergent position (operation 3008), which can be configured similarly as illustrated in FIG. 25B. In method 3000 illustrated in FIG. 30, the solar panels can be rotated to a maintenance tilt position in which alternating rows are tilted in opposing directions, at the same tilt angle as one another (operation 3010). For example, solar plant control system 2004 described herein with reference to FIG. 20 can be configured so as to control rotation of the solar panels.

In method 3000 illustrated in FIG. 30, the maintenance vehicle drives through the switch of the first solar panel row track and onto that track, conducts a maintenance process on the solar panels in a manner such as described herein with reference to FIG. 9, and continues around the U-turn onto a second solar panel row track (operation 3012). The maintenance vehicle conducts the maintenance process on the solar panels of the second track in a manner such as described herein with reference to FIG. 9, and continues around the U-turn onto a third solar panel row track (operation 3014). The maintenance vehicle conducts the maintenance process on the solar panels of the third track in a manner such as described herein with reference to FIG. 9, and continues around the U-turn onto a fourth solar panel row track (operation 3016). The maintenance vehicle conducts the maintenance process on the solar panels of the fourth track in a manner such as described herein with reference to FIG. 9, and continues around the U-turn onto a transfer track (operation 3018).

In method 3000, it can be determined whether the maintenance vehicle needs fluid refilled (operation 3020). In method 3000, based upon it being determined that the maintenance vehicle needs fluid(s) refilled, the maintenance vehicle returns to the fluid refill station 114 to refill the fluid(s). For example, the first track's switch can move to the through position (operation 3022) and the maintenance vehicle can return to the fluid refill station 114 (operation 3024), e.g., in a manner similar to that described herein with reference to FIG. 19 without the additional operations of the shuttle. In method 3000, based upon it being determined that the maintenance vehicle does not need fluid(s) refilled or based upon the fluid(s) having been refilled, the switch of the fourth track can move to the through position (operation 3026). In method 3000, operations 3012 to 3020 can be repeated for each solar plant row until the entire solar plant, or a desired portion thereof, has been processed (operation 3028).

Figure 39A:
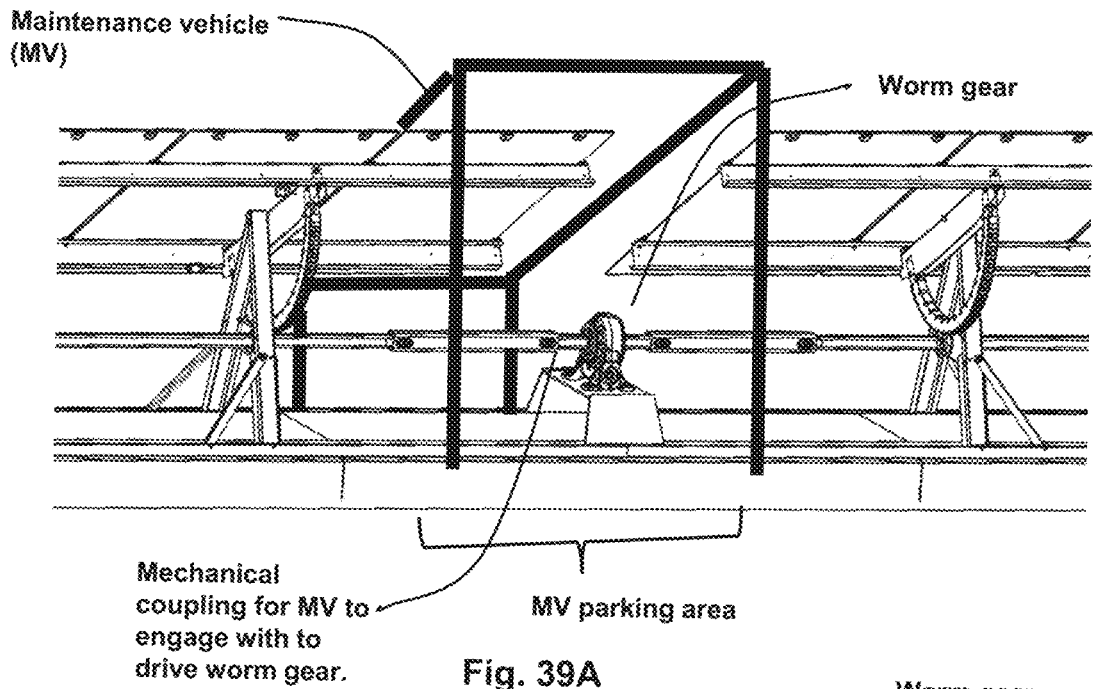
Figure 39B:
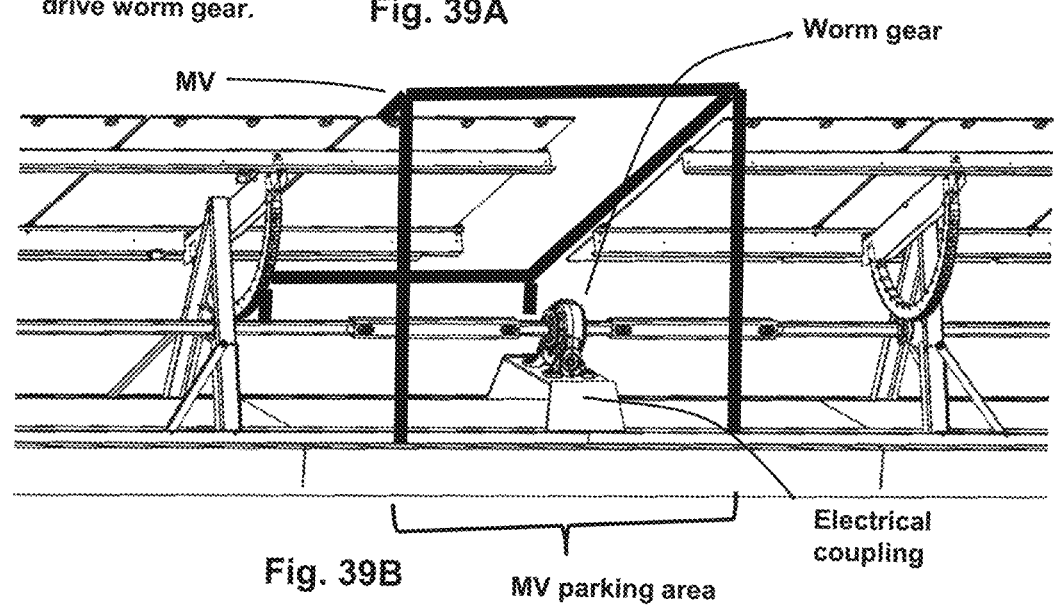
Figure 39C:
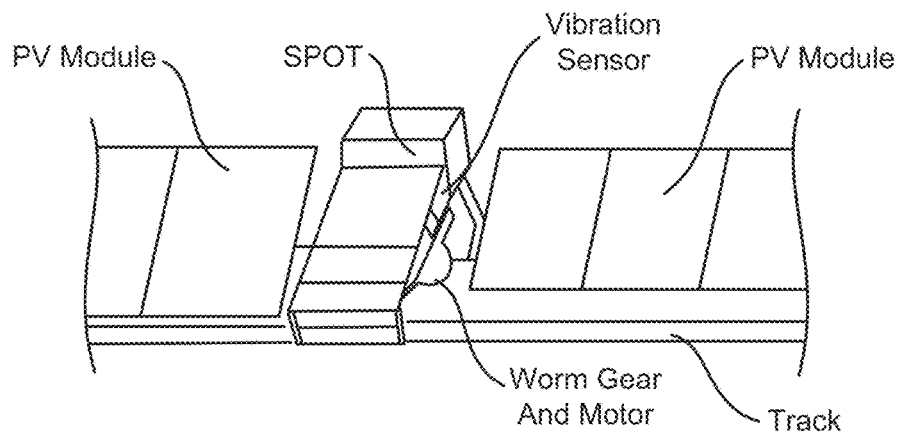

Additionally exemplary configurations are schematically illustrated in FIGS. 39A-39C. For example, the MV (shown in outline in FIGS. 39A-39B) can be configured to drive a worm gear. For example, such as shown in FIG. 39A, in a MV parking area that can be disposed between tables of solar panels, a mechanical coupling can be provided for the MV to engage with, and drive, a worm gear that is coupled to the drive shafts of the tables of solar panels. For example, rather than having a motor on tracker for a row of tables of solar panels to drive the worm gear, the MV can be equipped with a motor to drive the worm gear. The MV can park over the worm gear such that a drive shaft and coupling on the MV engage with a coupling on the worm gear. A motor on the MV then can drive the worm gear to rotate the panels on the row. The solar panel and batteries on the MV will or can provide power for both the MV and the rotation of the tracker. In this configuration, the MV's home base will be or can be in the center of a tracker row according to certain options. Such as shown in FIG. 39B, an electrical coupling can be provided between the MV and the motor to drive the worm gear. For example, the MV can power the worm gear motor. For example, the MV can be configured to park over the worm gear and provide power to the worm gear motor. When in position, electrical contacts on the MV will or can engage with electrical contacts that are connected to the worm gear motor. In this configuration, the MV's home base will or can be in the center of a tracker row according to certain options. In another example, alternatively, the MV can park over the worm gear and motor and charge the motor's batteries. Such as shown in FIG. 39C, for example, according to some embodiments, in a configuration in which the MV parks over the motor that drives the tracker worm gear, the MV can be equipped with a sensor to detect motor vibration. For example, this automated inspection of the worm gear can bring down maintenance costs for the system. In another example, the vibration sensor on the MV can proactively sense the need for service and thereby reduce or minimize system downtime.

In one exemplary configuration, a method of locating a maintenance vehicle in a solar power field is provided. The method can include driving the maintenance vehicle on a track of the solar panel field, a plurality of flags being coupled to the track at spaced locations along the track. Each flag can include an identification (ID) tag and a contact target or a non-contact target. The maintenance vehicle can include an ID tag reader and a sensor configured to detect the contact target or the non-contact target. The method also can include driving the maintenance vehicle along the track to a position adjacent to a flag of the plurality of flags, reading by the ID tag reader the ID tag of that flag, and sensing by the sensor the contact target or the non-contact target. The method also can include, based on the reading and the sensing, identifying a unique location of the maintenance vehicle in the solar power field. Non-limiting examples of such a method are provided, for example, with reference to FIGS. 1-9 and 33.

In another exemplary configuration, a system for locating a maintenance vehicle in a solar power field is provided. The system can include a track on which the maintenance vehicle drives; and a plurality of flags being coupled to the track at spaced locations along the track. Each flag can include a identification (ID) tag and a contact target or a non-contact target. An ID tag reader and a sensor each can be located on the maintenance vehicle and configured to detect the contact target or the non-contact target. The maintenance vehicle can be configured to: drive along the track to a position adjacent to a flag of the plurality of flags; read by the ID tag reader the ID tag of that flag; sense by the sensor the contact target or the non-contact target; and based on the reading and the sensing, identify a unique location of the maintenance vehicle in the solar power field. Non-limiting examples of such a system are provided, for example, with reference to FIGS. 1-9 and 33.

In another exemplary configuration, a method of constraining movement of a maintenance vehicle in a solar power field is provided. The method can include driving the maintenance vehicle along a track of the solar panel field. The maintenance vehicle can include drive wheels and guide wheels. The track can include first and second rails. Each of the first and second rails can include a top surface and a side surface. The top surface receives at least one of the drive wheels and supports the weight of the vehicle; and the side surface receives at least one of the guide wheels and inhibits derailment of the maintenance vehicle. Non-limiting examples of such a method are provided, for example, with reference to FIGS. 1-4.

In another exemplary configuration, a system for constraining movement of a maintenance vehicle in a solar power field is provided. The system can include a track on which the maintenance vehicle drives, and the maintenance vehicle can include drive wheels and guide wheels. The track can include first and second rails. Each of the first and second rails can include a top surface and a side surface. The top surface can be configured to receive at least one of the drive wheels and to support the weight of the vehicle; and the side surface can be configured to receive at least one of the guide wheels and to inhibit derailment of the maintenance vehicle. Non-limiting examples of such a system are provided, for example, with reference to FIGS. 1-4.

In another exemplary configuration, a method of moving a maintenance vehicle from a first track to a second track of a solar power field is provided. The method can include driving the maintenance vehicle along the first track of the solar panel field toward a shuttle track, the shuttle track intersecting the first track and the second track. The method also can include driving a shuttle vehicle along the shuttle track to the first track. The method also can include deploying by the shuttle vehicle a ramp onto the first track. The method also can include driving the maintenance vehicle onto the ramp. The method also can include retracting by the shuttle vehicle the ramp. The method also can include driving the shuttle vehicle to the second track. The method also can include deploying by the shuttle vehicle the ramp onto the second track. The method also can include driving the maintenance vehicle down the ramp onto the second track. Non-limiting examples of such a method are provided, for example, with reference to FIGS. 1-4 and 11A-23.

In another exemplary configuration, a system for moving a maintenance vehicle from a first track to a second track of a solar power field is provided. The system can include a shuttle track intersecting the first track and the second track, the maintenance vehicle can be configured to drive along the first track of the solar panel field toward the shuttle track; and a shuttle vehicle. The shuttle vehicle can be configured to drive along the shuttle track to the first track; deploy a ramp onto the first track; retract the ramp; drive to the second track; and deploy the ramp onto the second track. The maintenance vehicle can be configured to drive onto the ramp from the first track responsive to the shuttle vehicle deploying the ramp onto the first track; and drive off of the ramp to the second track responsive to the shuttle vehicle deploying the ramp onto the second track. Non-limiting examples of such a system are provided, for example, with reference to FIGS. 1-4 and 11A-23.

In another exemplary configuration, a method of securing a vehicle in a solar power field is provided. The method can include mounting a vehicle lock on a track of the solar panel field. The vehicle can include drive wheels. The track can include first and second rails, each of the first and second rails can include a top surface receiving at least one of the drive wheels and supporting the weight of the vehicle. The vehicle lock can include first and second overhangs that protrude above the top surface. The method can include driving the vehicle along the track and over the vehicle lock. The method also can include stopping the vehicle over the vehicle lock with portions of the vehicle respectively under the overhangs. Non-limiting examples of such a method are provided, for example, with reference to FIGS. 10A-10B and 34A-34B.

Under yet another aspect, a system for securing a vehicle in a solar power field is provided. The system can include a vehicle lock mounted on a track of the solar panel field. The vehicle includes drive wheels; and the track can include first and second rails. Each of the first and second rails can include a top surface receiving at least one of the drive wheels and supporting the weight of the vehicle. The vehicle lock can include first and second overhangs that protrude above the top surface. The vehicle can be configured so as to drive along the track and over the vehicle lock. The vehicle can be configured so as to stop over the vehicle lock with portions of the vehicle respectively under the overhangs. Non-limiting examples of such a system are provided, for example, with reference to FIGS. 10A-10B and 34A-34B.

In another exemplary configuration, a method of maintaining a solar power field is provided. The method can include automatically driving the maintenance vehicle on a first track of the solar power field, a solar array being coupled to the first track. The method also can include automatically maintaining, by the maintenance vehicle during the driving, the solar array, the maintaining can include depositing a fluid at the solar array. The method also can include automatically determining, by the maintenance vehicle during the maintaining, that the maintenance vehicle requires refill of the fluid. The method also can include, responsive to the determining, automatically driving a first shuttle vehicle toward the first track on a first shuttle track of the solar power field that intersects the first track and driving the maintenance vehicle toward the first shuttle track. The method also can include automatically driving the maintenance vehicle onto the first shuttle vehicle. The method also can include automatically transporting the maintenance vehicle by the first shuttle vehicle to a refill station disposed along the first shuttle track. The method also can include automatically refilling the fluid into the maintenance vehicle while the maintenance vehicle is on the first shuttle vehicle. The method also can include, responsive to the refilling, automatically transporting the maintenance vehicle by the first shuttle vehicle to a second track. The method also can include automatically driving the maintenance vehicle off of the first shuttle vehicle at the second track. Non-limiting examples of such a method are provided, for example, with reference to FIGS. 1-9 and 11A-23.

In another exemplary configuration, a system for maintaining a solar power field is provided. The system can include a maintenance vehicle; a first shuttle vehicle; a first shuttle track; and a refill station disposed along the first shuttle track. The maintenance vehicle can be configured to automatically drive on a first track of the solar power field, a solar array being coupled to the first track. The maintenance vehicle can be configured to automatically maintain the solar array during the driving, the maintaining can include depositing a fluid at the solar array. The maintenance vehicle can be configured to automatically determine, during the maintaining, that the maintenance vehicle requires refill of the fluid. The first shuttle vehicle can be configured to automatically drive, responsive to the determining, toward the first track on the first shuttle track of the solar power field, the first shuttle track intersects the first track. The maintenance vehicle can be configured to automatically drive, responsive to the determining, toward the first shuttle track. The maintenance vehicle can be configured to automatically drive onto the first shuttle vehicle. The first shuttle vehicle can be configured to automatically transport the maintenance vehicle to the refill station. The refill station can be configured to automatically refill the fluid into the maintenance vehicle while the maintenance vehicle is on the first shuttle vehicle. The first shuttle vehicle can be configured to automatically transport the maintenance vehicle to a second track responsive to the refilling. The maintenance vehicle can be configured to automatically drive off of the first shuttle vehicle at the second track. Non-limiting examples of such a method are provided, for example, with reference to FIGS. 1-9 and 11A-23.

In another exemplary configuration, a method of maintaining a solar power field is provided. The method can include automatically driving the maintenance vehicle on a first track of the solar power field, a solar array being coupled to the first track. The method also can include automatically maintaining, by the maintenance vehicle during the driving, the solar array, the maintaining can include depositing a fluid at the solar array. The method also can include automatically determining, by the maintenance vehicle during the maintaining, that the maintenance vehicle requires refill of the fluid. The method also can include, responsive to the determining, automatically driving the maintenance vehicle to a refill station disposed along a first transfer track, the first transfer track can be coupled to the first track via a first switch. The method also can include automatically refilling the fluid into the maintenance vehicle. The method also can include, responsive to the refilling, automatically driving the maintenance vehicle to a second track, the first transfer track can be coupled to the second track via a second switch. Non-limiting examples of such a method are provided, for example, with reference to FIGS. 24-30.

In another exemplary configuration, a system for maintaining a solar power field is provided. The system can include a maintenance vehicle; a first transfer track; a first switch; a second switch; and a refill station. The maintenance vehicle can be configured to automatically drive on a first track of the solar power field, a solar array being coupled to the first track. The maintenance vehicle can be configured to automatically maintain, during the driving, the solar array, and the maintaining can include depositing a fluid at the solar array. The maintenance vehicle can be configured to automatically determine, during the maintaining, that the maintenance vehicle requires refill of the fluid. The maintenance vehicle can be configured to, responsive to the determining, automatically drive to a refill station disposed along the first transfer track, the first transfer track can be coupled to the first track via the first switch. The refill station can be configured to automatically refill the fluid into the maintenance vehicle. The maintenance vehicle can be configured to, responsive to the refilling, automatically drive to a second track, the first transfer track can be coupled to the second track via the second switch. Non-limiting examples of such a system are provided, for example, with reference to FIGS. 24-30.

While various illustrative embodiments of the invention are described herein, it will be apparent to one skilled in the art that various changes and modifications may be made therein without departing from the invention. For example, the present systems and methods are not limited to use with photovoltaic modules, and instead can be applied to solar collectors including any type of solar module (e.g., a module such as used with a concentrated solar power system, such as a parabolic trough or heliostat), or to maintaining any other type of structure. All such changes and modifications that fall within the true spirit and scope of the invention are encompassed by the following claims.

What is claimed:

1. A method of locating a maintenance vehicle in a solar power field, the method comprising:
   driving the maintenance vehicle on a track of the solar panel field, a plurality of flags being coupled to the track at spaced locations along the track,
   each flag comprising an identification (ID) tag and a contact target or a non-contact target,
   the maintenance vehicle comprising an ID tag reader and a sensor configured to detect the contact target or the non-contact target;
   driving the maintenance vehicle along the track to a position adjacent to a flag of the plurality of flags;
   reading by the ID tag reader the ID tag of that flag;
   sensing by the sensor the contact target or the non-contact target;
   based on the reading and the sensing, identifying a unique location of the maintenance vehicle in the solar power field; and
   transmitting, by the maintenance vehicle, signals including the unique location to a shuttle vehicle to control a position of the maintenance vehicle in relation to the shuttle vehicle,
   wherein at least one flag in the plurality of flags comprises the contact target, wherein the contact target comprises an upright structure, and wherein the sensor comprises a trigger arm configured to rotate upon impact with the upright structure and to trigger a signal based upon the rotation.

2. The method of claim 1, wherein:
   the maintenance vehicle comprises drive wheels and guide wheels;
   the track comprises first and second rails;
   each of the first and second rails comprises a top surface and a side surface;
   the top surface receives at least one of the drive wheels and supports the weight of the maintenance vehicle; and
   the side surface receives at least one of the guide wheels and inhibits derailment of the maintenance vehicle.

3. The method of claim 1, wherein at least one flag in the plurality of flags comprises the non-contact target, wherein the non-contact target comprises a magnet, and wherein the sensor comprises a proximity sensor configured to trigger a signal based upon the sensor being immediately adjacent to the magnet.

4. The method of claim 1, wherein identifying the unique location comprises using a look-up table of ID tag numbers to determine an approximate location of the maintenance vehicle in the solar power field and using a look-up table of an accurate location of the contact or non-contact target associated with the ID tag.

5. The method of claim 1, further comprising:
   sensing a vehicle lock flag on a vehicle lock mounted on the track and configured to inhibit tipping of the maintenance vehicle from the track; and
   stopping the maintenance vehicle over the vehicle lock upon sensing the vehicle lock flag.

6. The method of claim 1, further comprising:
   automatically reversing a direction of travel of the maintenance vehicle upon sensing a stop flag a predetermined distance from an end of the track.

7. The method of claim 1, further comprising:
   driving the shuttle vehicle on a shuttle track that intersects the track; and
   transporting, on the shuttle vehicle, the maintenance vehicle to and from the track, wherein the maintenance vehicle drives onto the shuttle vehicle and stops upon sensing a stop flag on the shuttle vehicle.

8. The method of claim 7, further comprising:
   stopping, upon sensing a second stop flag coupled to the track, the maintenance vehicle at an intersection of the shuttle track and the track.

9. A system for locating a maintenance vehicle in a solar power field, the system comprising:
   a track on which the maintenance vehicle drives;
   a plurality of flags being coupled to the track at spaced locations along the track,
   wherein a first subset of the flags each comprise an identification (ID) tag and a contact target and a second subset of the flags each comprise an ID tag and a non-contact target;
   an ID tag reader and a sensor each located on the maintenance vehicle and configured to detect the contact target or the non-contact target;
   wherein the maintenance vehicle is configured to:
      drive along the track to a position adjacent to a flag of the plurality of flags;
      read by the ID tag reader the ID tag of that flag;

sense by the sensor the contact target or the non-contact target; and based on the reading and the sensing, identify a unique location of the maintenance vehicle in the solar power field, and wherein at least one flag in the plurality of flags comprises the contact target, wherein the contact target comprises an upright structure, and wherein the sensor comprises a trigger arm configured to rotate upon impact with the upright structure and to trigger a signal based upon the rotation.

10. The system of claim 9, wherein:

the maintenance vehicle comprises drive wheels and guide wheels;

the track comprises first and second rails;

each of the first and second rails comprises a top surface and a side surface;

the top surface is configured to receive at least one of the drive wheels and to support the weight of the maintenance vehicle; and the side surface is configured to receive at least one of the guide wheels and to inhibit derailment of the maintenance vehicle.

11. The system of claim 9, wherein the non-contact target comprises a magnet, and wherein the sensor comprises a proximity sensor configured to trigger a signal based upon the sensor being immediately adjacent to the magnet.

12. The system of claim 9, wherein identifying the unique location comprises using a look-up table of ID tag numbers to determine an approximate location of the maintenance vehicle in the solar power field and using a look-up table of an accurate location of the contact or non-contact target associated with the ID tag.

13. The system of claim 9, further comprising:

a vehicle lock mounted on the track and configured to inhibit tipping of the maintenance vehicle from the track, wherein the vehicle lock further comprises a vehicle lock flag, and wherein the maintenance vehicle is configured so as to stop over the vehicle lock based on sensing the vehicle lock flag.

14. The system of claim 9, wherein the maintenance vehicle automatically reverses its direction of travel upon sensing a stop flag within a predetermined distance from an end of the track.

15. The system of claim 9, further comprising:

a shuttle track that intersects the track, wherein the shuttle vehicle is configured to transport the maintenance vehicle to and from the track, and wherein the maintenance vehicle drives from the track onto the shuttle vehicle and stops upon sensing a first stop flag on the shuttle vehicle.

16. The system of claim 15, wherein the shuttle vehicle stops at an intersection of the shuttle track and the track upon sensing a second stop flag coupled to the track.

17. A system for locating a maintenance vehicle in a solar power field, the system comprising:

a track on which the maintenance vehicle drives;

a plurality of flags being coupled to the track at spaced locations along the track, each flag comprising an identification (ID) tag and a contact target or a non-contact target, an ID tag reader and a sensor each located on the maintenance vehicle and configured to detect the contact target or the non-contact target;

wherein the maintenance vehicle is configured to:

drive along the track to a position adjacent to a flag of the plurality of flags;

read by the ID tag reader the ID tag of that flag;

sense by the sensor the contact target or the non-contact target;

based on the reading and the sensing, identify a unique location of the maintenance vehicle in the solar power field; and transmit signals including the unique location to a shuttle vehicle to control a position of the maintenance vehicle in relation to the shuttle vehicle, and wherein at least one flag in the plurality of flags comprises the contact target, wherein the contact target comprises an upright structure, and wherein the sensor comprises a trigger arm configured to rotate upon impact with the upright structure and to trigger a signal based upon the rotation.

18. The system of claim 17, wherein at least one flag in the plurality of flags comprises the non-contact target, wherein the non-contact target comprises a magnet, and wherein the sensor comprises a proximity sensor configured to trigger a signal based upon the sensor being immediately adjacent to the magnet.

* * * * *